United States Patent [19]
Kutsumi et al.

[11] Patent Number: 5,495,413
[45] Date of Patent: Feb. 27, 1996

[54] TRANSLATION MACHINE HAVING A FUNCTION OF DERIVING TWO OR MORE SYNTAXES FROM ONE ORIGINAL SENTENCE AND GIVING PRECEDENCE TO A SELECTED ONE OF THE SYNTAXES

[75] Inventors: Takeshi Kutsumi, Yamato-Koriyama; Yoji Fukumochi, Ikoma; Hitoshi Suzuki, Nara; Shuzo Kugimiya, Nara; Tokuyuki Hirai, Nara; Ichiko Sata, Nara, all of Japan

[73] Assignee: Sharp Kabushiki Kaisha, Osaka, Japan

[21] Appl. No.: 124,989

[22] Filed: Sep. 21, 1993

[30] Foreign Application Priority Data

Sep. 25, 1992 [JP] Japan .................................. 4-256091
Dec. 24, 1992 [JP] Japan .................................. 4-343703
Dec. 25, 1992 [JP] Japan .................................. 4-345828

[51] Int. Cl.$^6$ ............................................ G06F 17/28
[52] U.S. Cl. ............................ 364/419.04; 364/419.08
[58] Field of Search .................... 364/419.02, 419.04, 364/419.05, 419.08

[56] References Cited

U.S. PATENT DOCUMENTS 5,005,127 4/1991 Kugimiya et al. .................. 364/419.05
5,088,039 2/1992 Kugimiya et al. .................. 364/419.04

FOREIGN PATENT DOCUMENTS 1-220063 9/1989 Japan .
3-150666 6/1991 Japan .
4-112366 4/1992 Japan .

*Primary Examiner*—Gail O. Hayes
*Assistant Examiner*—J. H. Dixon
*Attorney, Agent, or Firm*—David G. Conlin; Kevin J. Fournier

[57] ABSTRACT

A translation machine is arranged to derive two or more syntaxes from one original sentence, determine which of the syntaxes is the most approximate according to a syntax priority rule given by a user or a manufacturer and output a translated sentence based on the most approximate syntax. The translation machine includes a memory, a translating module and a main CPU as main components. The memory serves to store a partial structure of each syntax and a syntax priority rule containing a numerical value indicating a priority of the partial structure and an incidental condition of the syntax. The translating module serves to collide the syntax priority rule stored in the memory with the syntax of the original sentence and giving a proper evaluating value to the syntax of the original sentence. The main CPU serves to output the translated sentences on the syntaxes derived from the original sentence according to their larger evaluating values.

9 Claims, 67 Drawing Sheets

| bought | films | for | the | camera | and | tapes | for | the | VTR |
|--------|-------|-----|-----|--------|-----|-------|-----|-----|-----|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | | | PREPOSITION PHRASE | | |
| VERB | NOUN PHRASE | PREPOSITION PHRASE | | | | | PREPOSITION PHRASE | | |
| VERB | NOUN PHRASE | | | | | | PREPOSITION PHRASE | | |
| VERB PHRASE (BOUGHT FILMS (FOR THE CAMERA AND TAPES), FOR THE VTR) | | | | | | | | | |

Fig. 5

EXAMPLE ( This is a pen.)
BUFFER A ---- BUFFER FOR ORIGINAL SENTENCE

| t | h | i | s | | | | |
|---|---|---|---|---|---|---|---|
| i | s | | | | | | |
| a | | | | | | | |
| p | e | n | | | | | |
| | | | | | | | |

Fig. 6

BUFFER B ---- PART OF BUFFER FOR RESULT OF DICTIONARY LOOKUP PROCESS

| word | | | |
|---|---|---|---|
| this --- | PRONOUN | INDICATIVE ADJECTIVE | |
| is --- | VERB | | |
| a --- | ARTICLE | | |
| pen --- | NOUN | | |

BUFFER C — BUFFER FOR RESULT OF SYNTACTIC ANALYZING PROCESS

BUFFER D --- BUFFER FOR RESULT OF TREE CONVERTING PROCESS

Fig. 9

BUFFER E ----- BUFFER FOR OUTPUT SENTENCE

| KORE HA PEN DEARU |

Fig. 11a

| bought | films | for | the | camera | and | tapes | for | the | VTR |
|--------|-------|-----|-----|--------|-----|-------|-----|-----|-----|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | | | PREPOSITION PHRASE | | |
| VERB | NOUN PHRASE | PREPOSITION PHRASE | | | | | PREPOSITION PHRASE | | |
| VERB | NOUN PHRASE | | | | | | PREPOSITION PHRASE | | |
| VERB PHRASE (BOUGHT FILMS (FOR THE CAMERA AND TAPES), FOR THE VTR) | | | | | | | | | |

Fig. 11b

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB PHRASE | | PREPOSITION | NOUN PHRASE | | EQUIVALENT CONJUNCTION | NOUN PHRASE | PREPOSITION | NOUN PHRASE | |
| VERB PHRASE | | PREPOSITION | NOUN PHRASE | | | | PREPOSITION PHRASE | | |
| VERB PHRASE | | PREPOSITION PHRASE | | | | | PREPOSITION PHRASE | | |
| VERB PHRASE | | | | | | | PREPOSITION PHRASE | | |
| VERB PHRASE (FOR THE VTR, BOUGHT FILMS FOR (THE CAMERA AND TAPES)) | | | | | | | | | |

Fig. 11c

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION PHRASE | | | EQUIVALENT CONJUNCTION | NOUN PHRASE | PREPOSITION PHRASE | | |
| VERB | NOUN PHRASE | | | | EQUIVALENT CONJUNCTION | NOUN PHRASE | | | |
| VERB | NOUN PHRASE | | | | | | | | |
| VERB PHRASE(FOR THE VTR, BOUGHT(FILMS FOR THE CAMERA) AND TAPES) | | | | | | | | | |

Fig.11d

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB PHRASE | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB PHRASE | PREPOSITION | NOUN PHRASE | EQUIVALENT CONJUNCTION | NOUN PHRASE | PREPOSITION | NOUN PHRASE | | | |
| VERB PHRASE | PREPOSITION | NOUN PHRASE | PREPOSITION PHRASE | | | | | | |
| VERB PHRASE | PREPOSITION | NOUN PHRASE | | | | | | | |
| VERB PHRASE | PREPOSITION PHRASE | | | | | | | | |
| VERB PHRASE (BOUGHT FILMS FOR (THE CAMERA AND TAPES) FOR THE VTR) | | | | | | | | | |

Fig. 11e

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | | | PREPOSITION PHRASE | | |
| VERB | NOUN PHRASE | PREPOSITION | PREPOSITION PHRASE | | | | | | |
| VERB | NOUN PHRASE | | | | | | | | |
| VERB PHRASE (BOUGHT FILMS, FOR (THE CAMERA AND TAPES) FOR THE VTR) | | | | | | | | | |

Fig. 11f

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | | | PREPOSITION PHRASE | | |
| VERB | NOUN PHRASE | PREPOSITION | PREPOSITION PHRASE | | NOUN PHRASE | | | | |
| VERB | NOUN PHRASE | PREPOSITION PHRASE | | | | | | | |
| VERB | NOUN PHRASE | | | | | | | | |
| VERB PHRASE (BOUGHT FILMS FOR (THE CAMERA AND TAPES) FOR THE VTR) | | | | | | | | | |

Fig. 11g

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION PHRASE | | | EQUIVALENT CONJUNCTION | NOUN PHRASE | PREPOSITION PHRASE | | |
| VERB | NOUN PHRASE | | | | EQUIVALENT CONJUNCTION | NOUN PHRASE | | | |
| VERB | NOUN PHRASE | | | | | | | | |

VERB PHRASE (BOUGHT(FILMS FOR THE CAMERA) AND (TAPES FOR THE VTR)))

Fig. 11h

| bought | films | for | the | camera | and | tapes | for | the | VTR |
|--------|-------|-----|-----|--------|-----|-------|-----|-----|-----|
| ⑧ VERB | NOUN | PREPOSITION | ARTICLE | NOUN | EQUIVALENT CONJUNCTION | NOUN | PREPOSITION | ARTICLE | NOUN |
| VERB PHRASE | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB PHRASE | NOUN PHRASE | PREPOSITION | NOUN PHRASE | | EQUIVALENT CONJUNCTION | NOUN PHRASE | PREPOSITION | NOUN PHRASE | |
| VERB PHRASE | NOUN PHRASE | PREPOSITION | NOUN PHRASE | | | | PREPOSITION PHRASE | | |
| VERB PHRASE | NOUN PHRASE | PREPOSITION PHRASE | | | | | PREPOSITION PHRASE | | |
| VERB PHRASE | | | | | | | PREPOSITION PHRASE | | |
| VERB PHRASE (BOUGH FILMS FOR (THE CAMERA AND TAPES) FOR THE VTR) | | | | | | | | | |

Fig. 111

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB PHRASE | | PREPOSITION | | NOUN PHRASE | EQUIVALENT CONJUNCTION | NOUN PHRASE | PREPOSITION | | NOUN PHRASE |
| VERB PHRASE | | PREPOSITION | | NOUN PHRASE | EQUIVALENT CONJUNCTION | NOUN PHRASE | PREPOSITION PHRASE | | |
| VERB PHRASE | | PREPOSITION | | NOUN PHRASE | EQUIVALENT CONJUNCTION | NOUN PHRASE | | | |
| VERB PHRASE | | PREPOSITION PHRASE | | | | NOUN PHRASE | | | |
| VERB PHRASE | | | | | | PREPOSITION PHRASE | | | |
| VERB PHRASE (BOUGHT FILMS FOR THE CAMERA AND (TAPES FOR THE VTR)) | | | | | | | | | |

Fig. 11j

| bought | films | for | the | camera | and | tapes | for | the | VTR |
|--------|-------|-----|-----|--------|-----|-------|-----|-----|-----|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | EQUIVALENT CONJUNCTION | NOUN PHRASE | PREPOSITION PHRASE | | |
| VERB | NOUN PHRASE | PREPOSITION | NOUN PHRASE | | EQUIVALENT CONJUNCTION | NOUN PHRASE | | | |
| VERB | NOUN PHRASE | PREPOSITION PHRASE | | | NOUN PHRASE | | | | |
| VERB | NOUN PHRASE | | | | PREPOSITION PHRASE | | | | |
| VERB PHRASE (BOUGHT FILMS FOR THE CAMERA AND (TAPES FOR THE VTR)) | | | | | | | | | |

Fig. 11k

| bought | films | for | the | camera | and | tapes | for | the | VTR |
|--------|-------|-----|-----|--------|-----|-------|-----|-----|-----|
| VERB | NOUN | PREPOSITION | ARTICLE | NOUN | EQUIVALENT CONJUNCTION | NOUN | PREPOSITION | ARTICLE | NOUN |
| VERB | NOUN PHRASE | PREPOSITION | ARTICLE | NOUN PHRASE | EQUIVALENT CONJUNCTION | NOUN PHRASE | PREPOSITION | ARTICLE | NOUN PHRASE |
| VERB | NOUN PHRASE | PREPOSITION | NOUN PHRASE | | EQUIVALENT CONJUNCTION | NOUN PHRASE | PREPOSITION | NOUN PHRASE | |
| VERB | NOUN PHRASE | PREPOSITION | NOUN PHRASE | | EQUIVALENT CONJUNCTION | NOUN PHRASE | PREPOSITION PHRASE | | |
| VERB | NOUN PHRASE | PREPOSITION | NOUN PHRASE | | EQUIVALENT CONJUNCTION | NOUN PHRASE | | | |
| VERB | NOUN PHRASE | PREPOSITION PHRASE | | | NOUN PHRASE | | | | |
| VERB | NOUN PHRASE | | | | | | | | |
| VERB | NOUN PHRASE | | | | | | | | |
| VERB PHRASE (BOUGHT FILMS (FOR THE CAMERA AND(TAPES FOR THE VTR))) | | | | | | | | | |

A ( B + C )

A ( B ( C + D ) + E + F )

| C | D | E | F |
|---|---|---|---|
| B || E | F |
| A ||||

Fig. 17

| NOUN PHRASE | PREPOSITION | * | EQUIVALENT CONJUNCTION | NOUN PHRASE | PREPOSITION | * |
|---|---|---|---|---|---|---|
| NOUN PHRASE | PREPOSITION | | EQUIVALENT CONJUNCTION | NOUN PHRASE | PREPOSITION | |
| NOUN PHRASE | | | EQUIVALENT CONJUNCTION | NOUN PHRASE | | |
| NOUN PHRASE | | | | | | |
| 2.0 | | | | | | |

Fig. 24

| | bought | films | for | the | camera | and | tapes | for | the | VTR |
|---|---|---|---|---|---|---|---|---|---|---|
| 1 | VERB | NOUN | PREPOSITION | ARTICLE | NOUN | EQUIVALENT CONJUNCTION | NOUN | PREPOSITION | ARTICLE | NOUN |
| | VERB | NOUN PHRASE (1) 1.0<br>1<br>1.0 | PREPOSITION | ARTICLE | NOUN PHRASE (2) 1.0<br>1<br>1.0 | EQUIVALENT CONJUNCTION | NOUN PHRASE (3) 1.0<br>1<br>1.0 | PREPOSITION | ARTICLE | NOUN PHRASE (4) 1.0<br>1<br>1.0 |
| | VERB | NOUN PHRASE | PREPOSITION | NOUN PHRASE (5) 1.0<br>2.0<br>2<br>1.0 | | EQUIVALENT CONJUNCTION | NOUN PHRASE 1.0<br>2.0<br>2<br>1.0 | PREPOSITION | NOUN PHRASE (6) | |
| | VERB | NOUN PHRASE | PREPOSITION | NOUN PHRASE (1) | | | NOUN PHRASE 1.0<br>4.0<br>4<br>1.0 | PREPOSITION PHRASE (8) 1.0<br>3.0<br>3<br>1.0 | | |
| | VERB | NOUN (9) | PREPOSITION PHRASE | | | | NOUN PHRASE 1.0<br>5.0<br>5<br>1.0 | PREPOSITION PHRASE | | |
| | VERB | NOUN PHRASE (10) | NOUN PHRASE | | | | 1.0<br>7.0<br>7<br>1.0 | PREPOSITION PHRASE | | |
| | VERB PHRASE (11) | | | | | | | | | 1.0<br>11.0<br>11<br>1.0 |

Fig. 26

| bought | films | for | the | camera | and | tapes | for | the | VTR |
|---|---|---|---|---|---|---|---|---|---|
| VERB | NOUN | PREPOSITION | ARTICLE | NOUN | EQUIVALENT CONJUNCTION | NOUN | PREPOSITION | ARTICLE | NOUN |
| VERB | NOUN PHRASE (1) 1.0 / 1 / 1.0 | PREPOSITION | ARTICLE | NOUN PHRASE (2) 1.0 / 1 / 1.0 | EQUIVALENT CONJUNCTION | NOUN PHRASE (3) 1.0 / 1 / 1.0 | PREPOSITION | ARTICLE | NOUN PHRASE (4) 1.0 / 1 / 1.0 |
| VERB | NOUN PHRASE | PREPOSITION | NOUN PHRASE (5) 1.0 / 2.0 / 2 / 1.0 | | EQUIVALENT CONJUNCTION | NOUN PHRASE | PREPOSITION | NOUN PHRASE (6) 1.0 / 2.0 / 2 / 1.0 | |
| VERB | NOUN PHRASE | PREPOSITION PHRASE (7) 1.0 / 3.0 / 3 / 1.0 | | | EQUIVALENT CONJUNCTION | NOUN PHRASE | PREPOSITION PHRASE (8) 1.0 / 3.0 / 3 / 1.0 | | |
| VERB | NOUN PHRASE (9) 1.0 / 5.0 / 5 / 1.0 | | | | EQUIVALENT CONJUNCTION | NOUN PHRASE (10) 1.0 / 5.0 / 5 / 1.0 | | | |
| VERB | NOUN PHRASE (11) 2.0 / 22.0 / 11 / 2.0 | | | | | | | | |
| VERB PHRASE (12) 1.0 / 23.0 / 12 / 1.917 | | | | | | | | | |

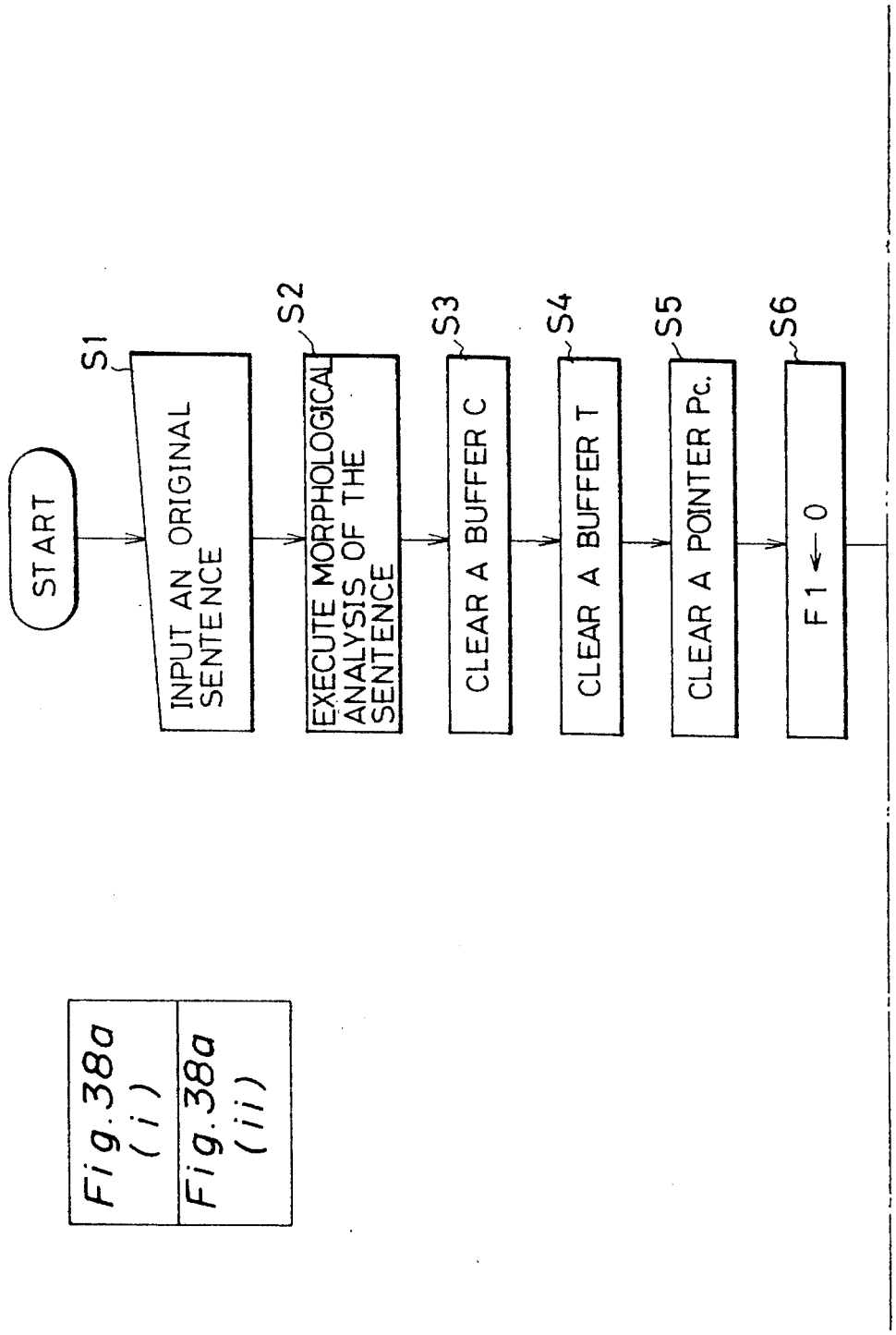

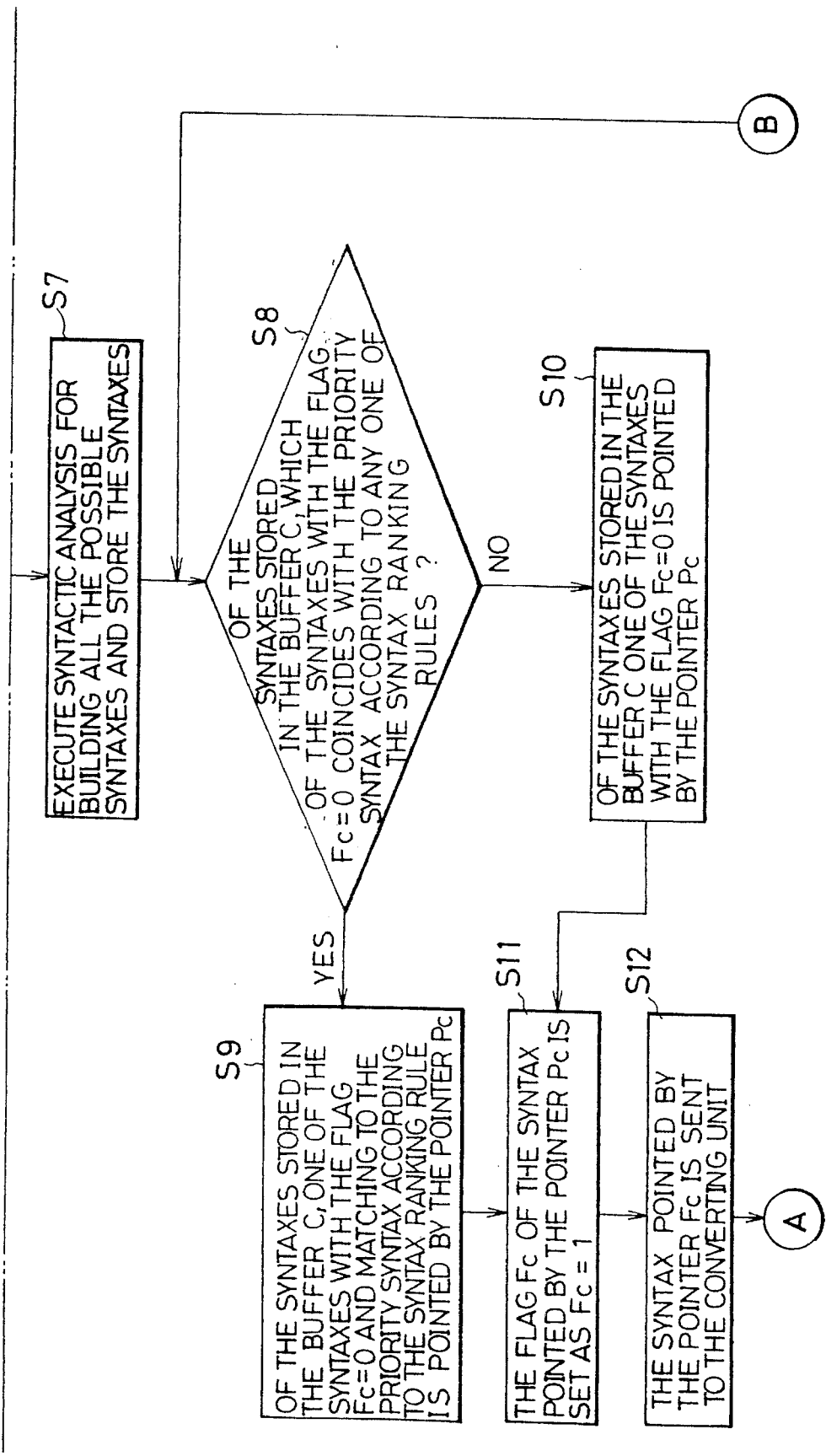
Fig. 38a (ii)

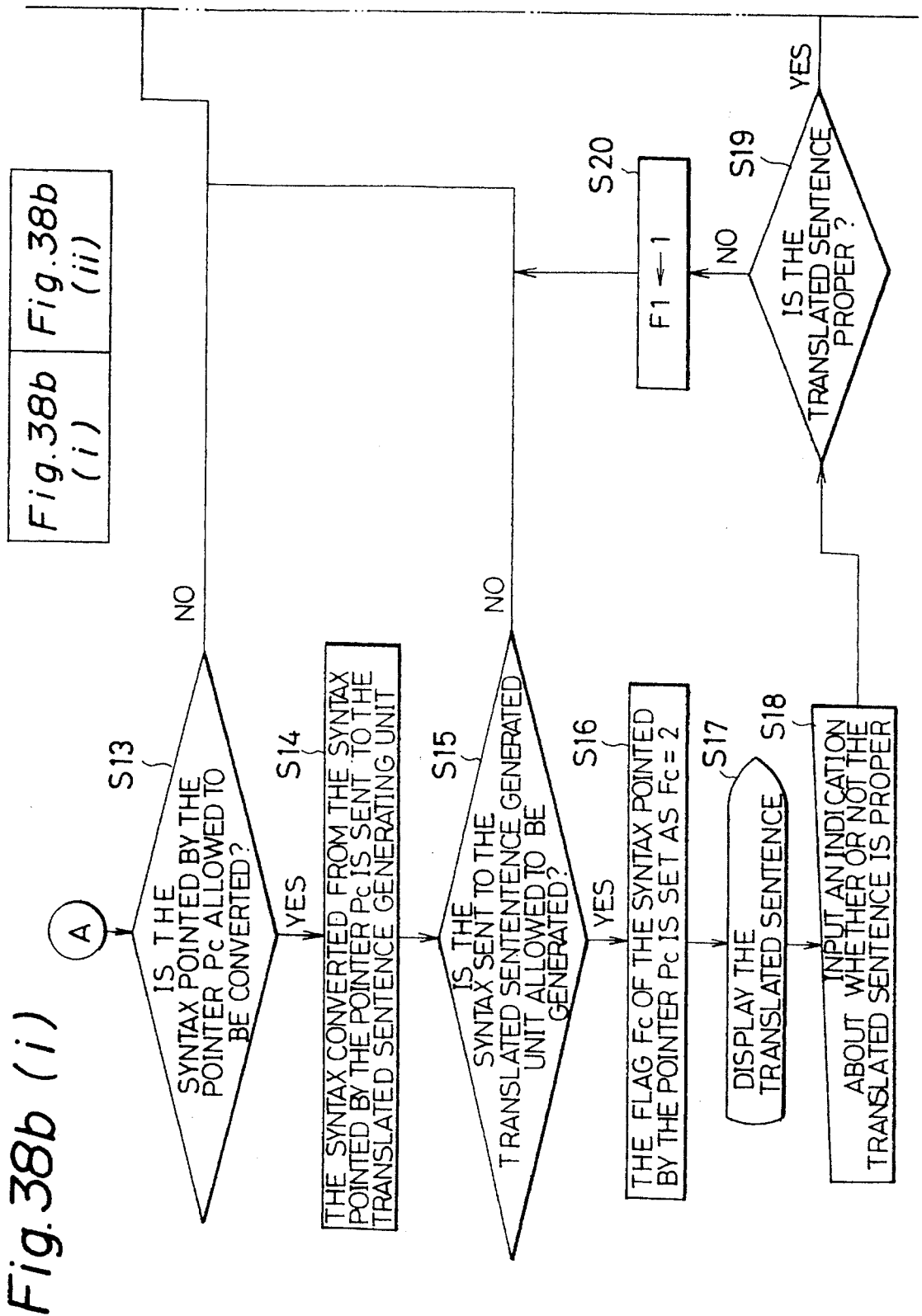

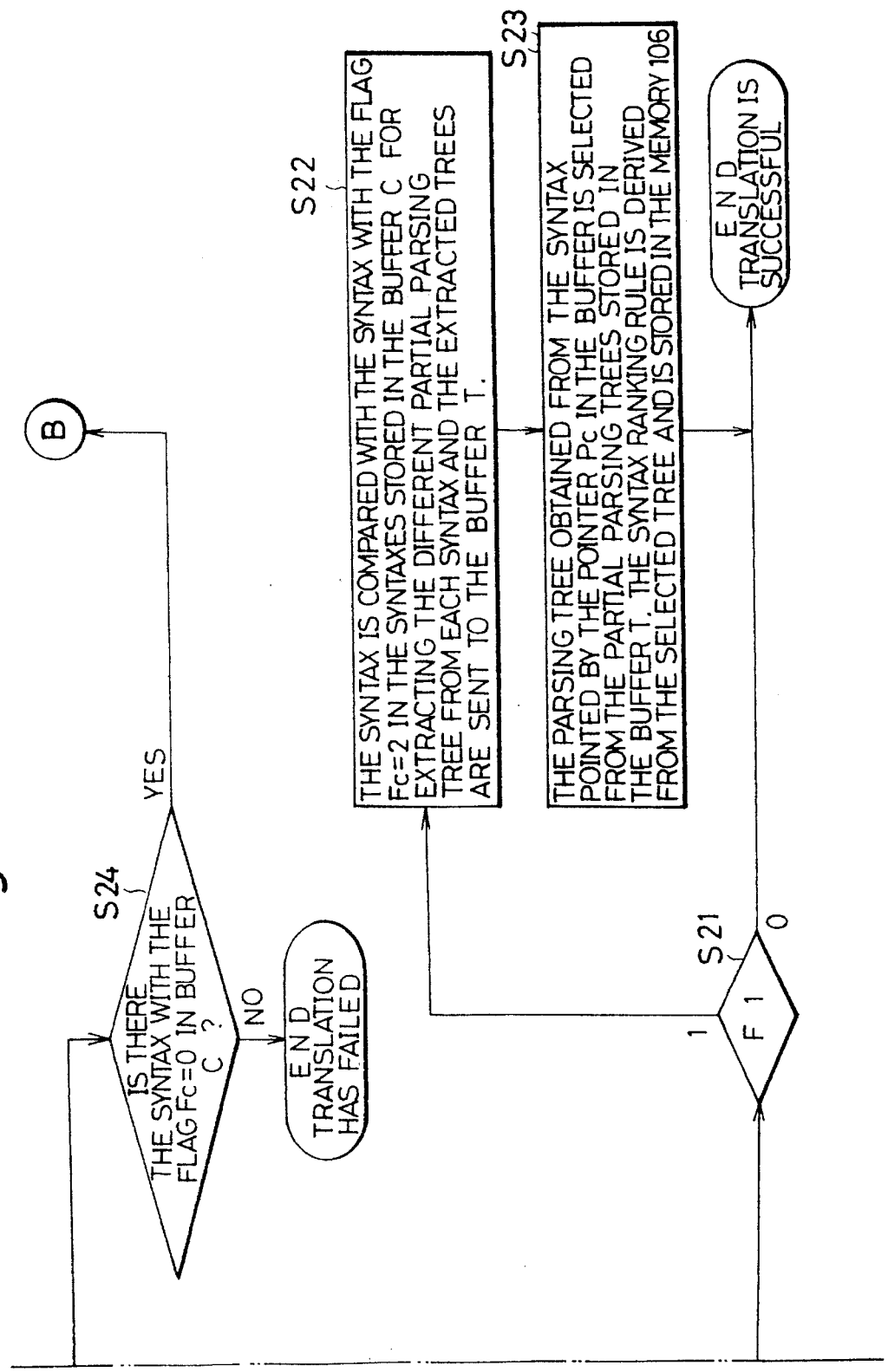
Fig. 38b(ii)

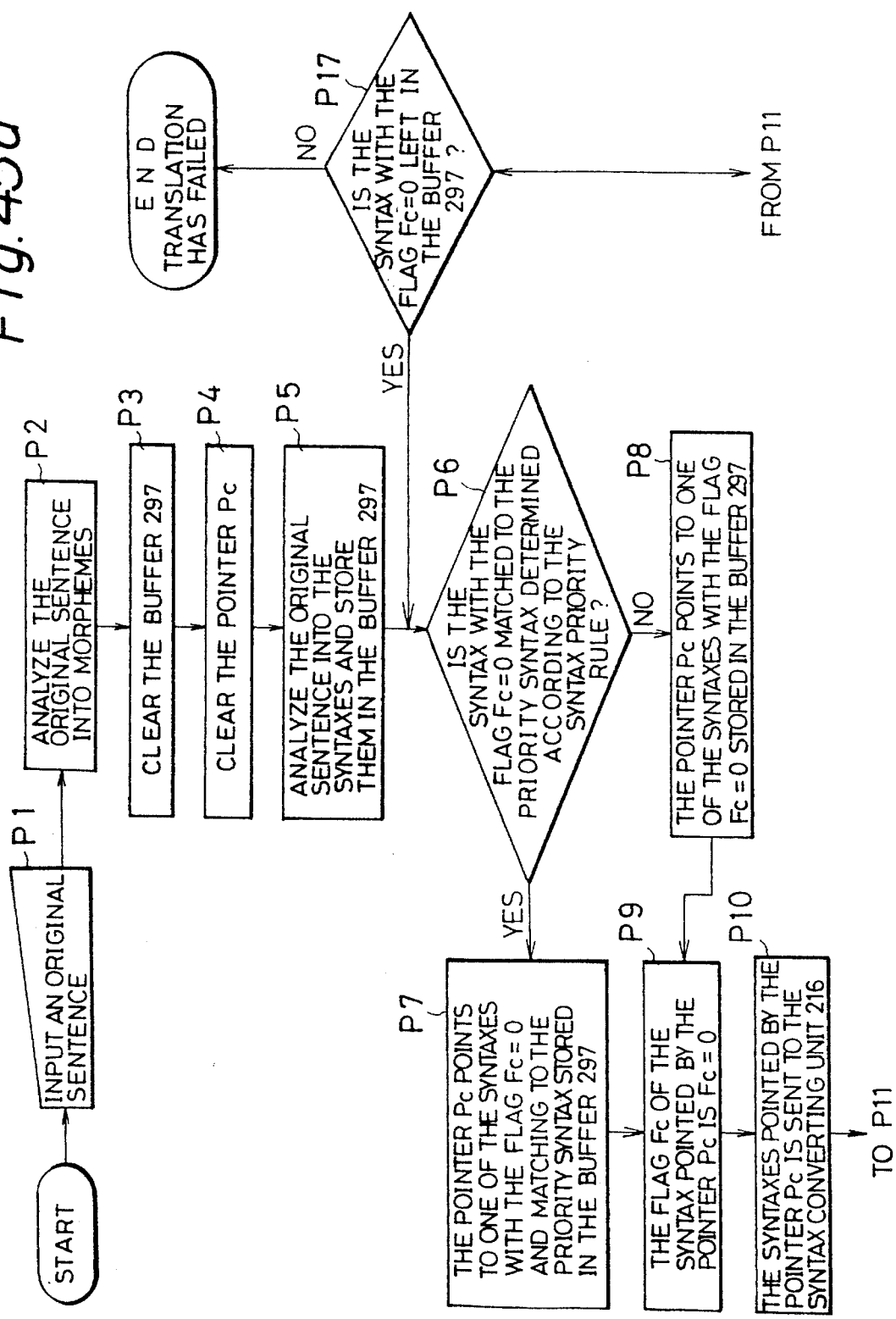

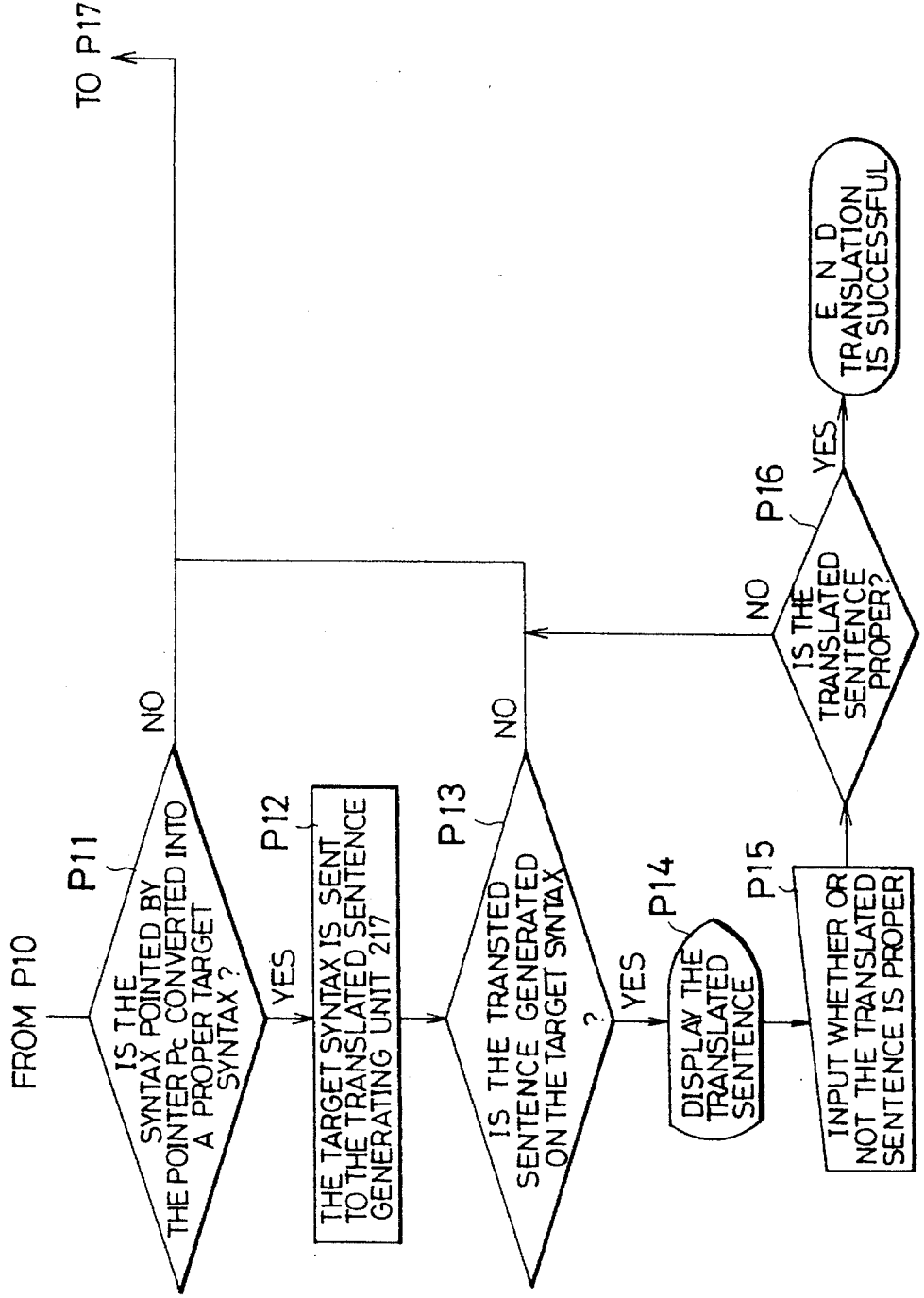

TRANSLATION MACHINE HAVING A FUNCTION OF DERIVING TWO OR MORE SYNTAXES FROM ONE ORIGINAL SENTENCE AND GIVING PRECEDENCE TO A SELECTED ONE OF THE SYNTAXES

BACKGROUND OF THE INVENTION

1. Field of the Invention

The present invention relates to a translation machine which is capable of building two or more syntaxes of a target language from one inputted sentence of a source language, and more particularly to a translation machine which provides a capability of learning a syntax priority for indicating which of the syntaxes is closer to the desired syntax of a source language.

2. Description of the Related Art

A translation machine known by the inventors is, in general, arranged to have an input unit such as a keyboard for inputting an object sentence of a source language, a translating module for executing an actual translation of the inputted sentence, a central processing unit (main CPU) for controlling the translation module, and a main memory for storing dictionaries such as a main dictionary and a user dictionary, grammatical rules, and tree-structure converting rules. The inputted object sentence is sent to the translating module under the control of the main CPU and is translated into the target sentence by referring to the dictionaries, the grammatical rules and the tree-structure converting rules.

This translation machine analyzes the syntax based on the parts of speech obtained as a result of analyzing the morphemes of the object sentence and by referring to the dictionaries and the grammatical rules and, in many cases, builds two or more syntaxes for one object sentence. Hence, for one object sentence, two or more translated sentences may be normally generated.

On the other hand, as a realistic problem, the translation machine has the following outputting types for the translated sentence.

(a) For one original sentence, just one translated sentence is outputted.

(b) For one original sentence, just one translated sentence is outputted, however, another translated sentence may be serially outputted by a user's operation of the keyboard.

(c) For one original sentence, two or more translated sentences are outputted at one time.

If the translation machine uses the output type of (a), the translated sentence appearing for the first is required to be the best of the translated sentences.

If the translation machine uses such a user interface as outputting two or more translated sentences for one original sentence such as the output types (b) and (c), more desirable translated sentences are required to be outputted in sequence. If the used user interface is the type (b), the most desirable one of the translated sentences to be generated by the translation machine should be outputted at first. Then, more desirable ones should be outputted in sequence.

If the user interface is the type (c), more desirable translated sentences should be outputted on the display in sequence. For example, more desirable translated sentences should appear from the upper to lower locations on the display.

For this purpose, if two or more syntaxes, that is, translated sentences may be derived from one original sentence, it is necessary to define the priority range of the translated sentences by comparing the translated sentences with each other in light of the translation level.

If the user interface is the type (a), only the translated sentence on the top priority in the defined priority range appears.

Hence, to define the priority range, the following methods have been known.

(1) Semantic Analysis
(2) Modifying Relation
(3) Describing Sequence of Grammatical Rules
(4) Scoring of Grammatical Rules For method (1), semantic analysis, the concrete method is arranged to write information about a semantic category in a word dictionary and prevent use of such a syntax as having the modified words with different semantic categories when defining the modification between the words in analyzing the syntax.

For method (2), modifying relation, this method is a kind of semantic analysis and is arranged to specify a word to be modified with another word and describe it in the dictionary. When defining the modification between the words in analyzing the syntax, if a certain syntax has a different word to be modified from the description of the dictionary, this syntax is not used.

For method (3), describing sequence of grammatical rules, the "grammatical rules" are the rules for analyzing the syntax indicated in table 2 (to be described later).

By adjusting the describing sequence of the grammatical rules in the dictionary, it is possible to change how easily each of the grammatical rules may apply to the translation. This results in controlling the easiness with which one or more specific syntaxes may be generated to a certain extent. The easiness with which the syntax is generated may be considered to be a basis on which the priority is defined for the syntax.

For method (4), scoring of grammatical rules, by scoring each of the grammatical rules, the total score or the average score of the used grammatical rules is used.

When two or more syntaxes may be built for one original sentence, the methods for defining the priority between these syntaxes have been described. However, these methods have the following shortcomings.

At first, the semantic analysis including a check for a modifying relation is considered. The semantic analysis is a significant process. It is effective to determine that an incorrect syntax is not used on the basis of the semantic analysis. In general, however, the semantic analysis in the translation machine requires a complicated process and a long execution time. Because many syntaxes are normally derived from the original sentence, it is not realistic to execute semantic analysis in light of the long processing time, which would be required. In the case of using the semantic analysis, it is preferable to define which of the syntaxes should take precedence at a previous stage using a simpler method (simpler than semantic analysis.

Further, the known translation machine employs the method for using the grammatical rules indicated in table 2 (to be described later) for defining the priority range of the syntaxes. However, each of the grammatical rules for syntactic analysis is for only a part of the overall syntax. Hence, if a priority coefficient is given to such a grammatical rule, the value derived on the coefficient does not correctly reflect the priority syntax if viewed as an overall sentence or a large part of the sentence. This is also a shortcoming.

The translation machine known by the inventors is, in general, arranged to allow a user to partially change the operation of the machine for achieving a personalized user interface. The contents which can be changed are as follows;

(a) A new word or idiom in the dictionary provided in the translation machine can be registered.

(b) Under a specified incidental condition, a translated part of a word or idiom is outputted.

(c) Controlling the level of completely at which the syntactic analysis is executed.

As mentioned above, in the known translation machine, the user may change only the translated part of a word or idiom or adjust the general operation of a certain process in the translating process. In general, when translating a longer original sentence with a larger scaled syntax, by totally grasping the syntax, a human translator (not using a machine) knows from experience the general syntax of the original sentence.

Hence, by extracting experience rules depending on only the form of the syntax and systematizing them, in the machine translation, these experience rules may be powerful information for defining the priority one of the syntaxes derived from one original sentence.

However, since the known translation machine does not use the foregoing experience information, if the user having excellent grammatical skill desires the translation machine to select his or her desired syntax for obtaining a better translated sentence, his or her desire is not directly reflected when using the known translation machine.

That is, the known translation machine allows the user to partially change the translating operation. However, the user's possible adjustment is limited to the word or idiom level or the general trend of a part of the translating process. The user cannot choose a specific syntax to be used by the machine.

SUMMARY OF THE INVENTION

The present invention provides a translation machine arranged on a syntax priority learning system, which is capable of generally deriving one or more syntaxes of an original sentence to be translated and executing the translating process based on the fitness information about each syntax.

The present invention also provides a translation machine which is capable of defining which of the syntaxes is correct based on the purely grammatical information when the syntaxes are competing in the translating process.

According to a first aspect of the present invention, a translation machine having a capability of deriving two or more syntaxes from an original sentence, includes: storing means for storing a syntax priority rule including a partial structure of each syntax, a numerical value indicating a priority of the partial structure, and an incidental condition of the syntax; colliding and estimating means for colliding the syntax priority rule stored in the storing means with the syntactic structure of the original sentence and estimating the syntactic structure; and control means for outputting a translated sentence created on the syntactic structure in the precedence order of the estimation.

According to a second aspect of the present invention, a translation machine arranged to have a morphological analyzing unit for dividing an inputted sentence into morphemes by using a dictionary and obtaining parts of speech about the morphemes, a syntactic analyzing unit for analyzing the syntax of a morpheme train divided by the morphological analyzing unit by using the dictionary and grammatical rules, a converting unit for converting the structure of the syntax obtained by the syntactic analyzing unit into a syntactic structure of a target language, and a translated sentence generating unit for generating a translated sentence according to the syntactic structure of the target language obtained by the converting unit and provide a function of learning a syntax priority, includes: converting means for obtaining all or some of syntactic structures if two or more syntaxes may be derived from the inputted original sentence; syntax storing means for storing all the syntactic structures derived by the converting means at one time; selecting means for selecting one or more proper or improper syntactic structures from the syntactic structures stored in the syntax storing means, based on the user's will; means for converting the overall one sentence or a part of the sentence specified by the user or a mechanism provided in the translation machine itself into a predetermined syntax priority rule about the syntactic structures stored in the syntax storing means, for generating a syntax priority rule based on the information indicating about whether or not the syntactic structure is selected by the user in the selecting means; priority storing means for recording parts of one or more syntaxes, and any pieces of syntax priority rules composed of an index indicating a specific desired one of the structures or a numerical value specified as the desired one; estimating means for giving any estimating value to each of the syntactic structures by referring to the information recorded in the priority storing means for each of the syntactic structures when analyzing the syntax or after a part or the overall of the syntactic structure is completed; and control means for comparing a translated sentence on the syntactic structure with a higher estimating value given by the estimating means with another translated sentence on the syntactic structure with a lower estimating value and outputting the former in the precedence order.

According to a third aspect of the present invention, a translation machine having a capability of deriving two or more syntaxes from an original sentence, includes: storing means for storing information standing for an index about fitness of a syntactic structure; input means for inputting, modifying and deleting the information to be stored in the storing means; and determining means for referring to the information stored in the storing means when obtaining two or more syntaxes from the original sentence and determining the precedence order of the syntaxes.

In the function of the translation machine according to the first aspect of the invention, the storing means serves to store the syntax priority rules including a partial structure of a syntax, a numerical value indicating a priority degree of the partial structure and the incidental condition of the syntax. The estimated values adding means serves to collide the syntax priority rules stored in the storing means with the syntactic structure of the inputted sentence and giving an estimating value to the syntactic structure. The control means serves to output the translated sentence generated on the syntactic structure according to the higher estimating values.

Hence, when deriving two or more syntactic structures from one original sentence, this translation machine enables to automatically define the fitting sequence among these syntactic structures and swiftly output the most approximate syntactic structure and the translated counterpart.

In the function of the translation machine according to the second aspect of the invention, when two or more syntactic structures may be built at a time or serially from one original sentence, to some extent, whether or not any of the syntactic structures is correct may be determined irrespective of the content of the sentence. That is, when the syntaxes are competing in translating one original sentence, in some forms of the syntaxes, whether or not the syntax is correct is allowed to be experientially determined only from the purely grammatical information without using the other information such as meaning information.

Hence, this translation machine operates to determine which of the competing syntaxes is the most approximate based on the fitness about the forms of the syntaxes after two or more syntactic structures are generated at one time or serially as a result of analyzing the syntax. The information required for obtaining this "fitness" is allowed to be derived by extracting the syntax to be rank first from the translated sentences selected by the user when executing the translation before and including the syntax as a rule.

This translation machine operates to output two or more translated sentences from one original sentence, one of which translated sentences is selected by a user. Of the two or more syntaxes on which the two or more translated sentences are generated, the syntax of the translated sentence selected by the user is determined as the most approximate and is included as a rule. The rule is stored in the priority storing means. And, when deriving two or more syntactic structures from one original sentence, by referring to the rules generated as described above in the past, it is possible to make sure that any one of the obtained syntaxes coincides with the syntax described in any one of the rules. If so, by placing the syntax coinciding with the rule on the priority or lowering the priority level of the syntactic structure, the priority (output sequence or location, etc.) on which tile translated sentence is outputted is defined on the syntactic structure.

With this operation, as the translation machine uses for a longer time, more knowledge based on the experience of a human translator is reflected on the fitness of a syntax. As a result, when deriving two or more syntaxes from one original sentence, the most approximate syntax is automatically defined from the derived syntaxes. Moreover, the most approximate syntax and the translated counterpart are swiftly outputted and the translated counterpart based on the unfit syntax is suppressed to be outputted.

In the function of the translation machine according to the third aspect of the invention, the storing means serves to store information standing for an index about fitness of the syntax. The input means serves to input the information rules to be stoned in the storing means, modify or delete them. The determining means serves to refer to the information stored in the stoning means when deriving two or more syntaxes from one original sentence and determine the ranking sequence of the syntaxes.

Hence, when deriving two or more syntaxes from one original sentence, the fitting sequence of the syntaxes is allowed to be automatically defined. As a result, the most approximate syntax and the translated sentence based on the syntax can be obtained.

Further objects and advantages of the present invention will be apparent from the following description of the preferred embodiments of the invention as illustrated in the accompanying drawings.

BRIEF DESCRIPTION OF THE DRAWINGS

FIG. 5 is an explanatory view showing the content of a buffer A shown in FIG. 4;

FIG. 6 is an explanatory view showing the content of a buffer B shown in FIG. 4;

FIG. 9 is an explanatory view showing the content of a buffer E shown in FIG. 4;

FIGS. 11a–k are views showing a storage form of the parsing tree translated in two or more ways in a buffer;

FIG. 17 is a view showing a tabular form of a parsing tree standing for a priority interpretation rule which may apply to the translation machine shown in FIG. 1;

FIG. 24 is an explanatory view showing a process for calculating a priority value in the translation machine shown in FIG. 1;

FIG. 38a(i) & (ii) is a flowchart showing a translating process executed in the translation machine according to the second embodiment;

FIG. 38b(i) & (ii) is a flowchart showing a succeeding translating process executed in the translation machine according to the second embodiment;

FIG. 45a is a flowchart showing an operation of the translation machine shown in FIG. 44;

FIG. 45b is a flowchart showing an operation of the translation machine shown in FIG. 44;

DESCRIPTION OF THE PREFERRED EMBODIMENTS

At first, the description will be oriented to a translation machine according to a first embodiment of the present invention. In this or later embodiments, it is assumed that a source language is English and a target language is Japanese.

Figure 1:
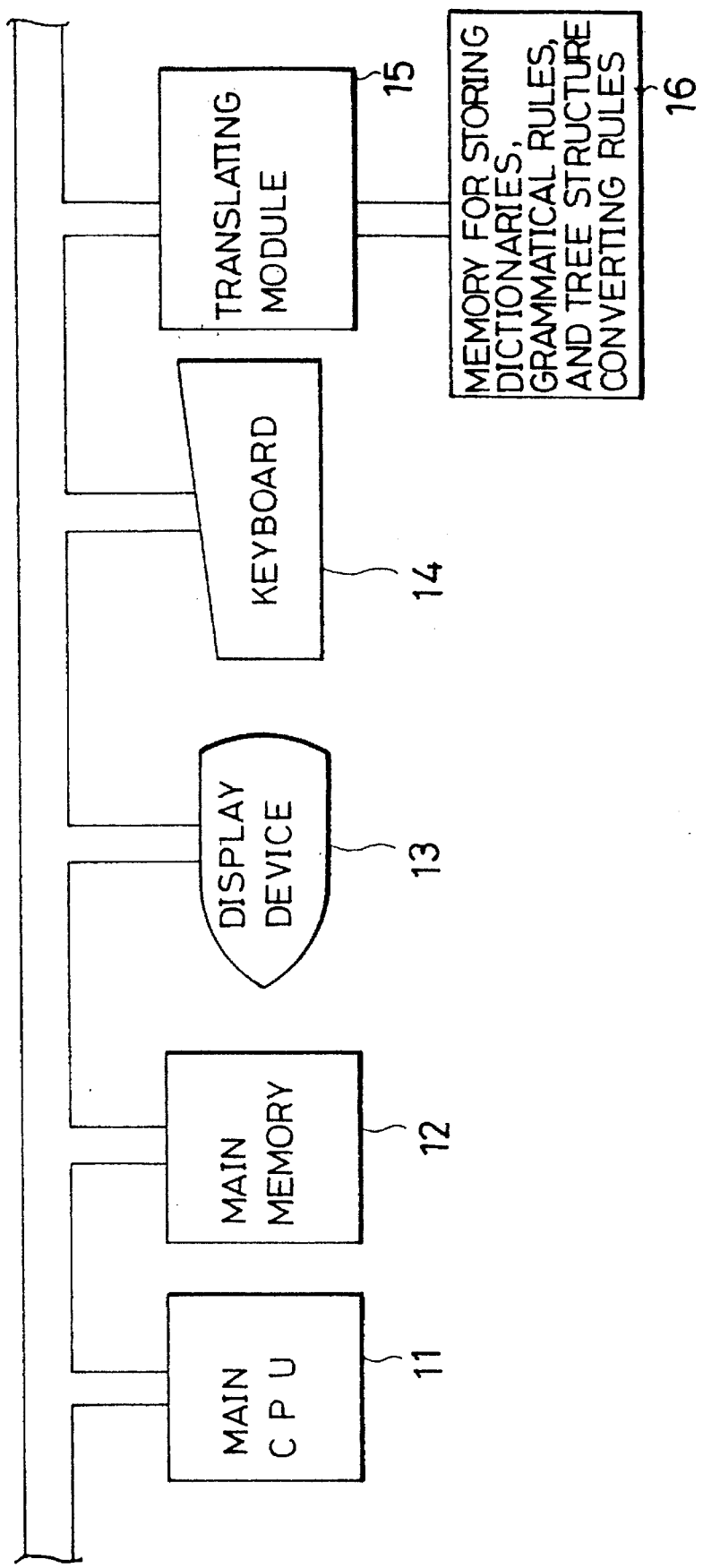
FIG. 1 is a block diagram showing a translation machine according to a first embodiment of the present invention.

FIG. 1 is a block diagram showing the translation machine according to the first embodiment. The translation machine shown in FIG. 1 is arranged to have a main CPU 11, a main memory 12, a display device 13, a keyboard 14, a Translating module 15, AND a memory 16 for storing dictionaries, grammatical rules, tree-structure converting rules and so forth.

The display device 13 may be a cathode-ray tube (CRT) or a liquid crystal display (LCD).

Next, the operation of the translation machine shown in FIG. 1 will be described.

The translating module 15 operates to receive a sentence described by a source language (referred to simply as a source language ), translate the source sentence into a sentence described by a target language (referred to simply as a target language), and output the target language.

The source language inputted from the keyboard 14 is sent to the translating module 15 under the control of the main CPU 11. The translating module 15 operates to translate the inputted source language into the target language in the below-described manner by using the dictionaries, the grammatical rules and the tree-structure converting rules. The translated result is temporarily stored in the main memory 12 and is displayed on the display device 13. The main memory 12 may be used as a register memory and a display buffer when executing various programs.

Figure 2:
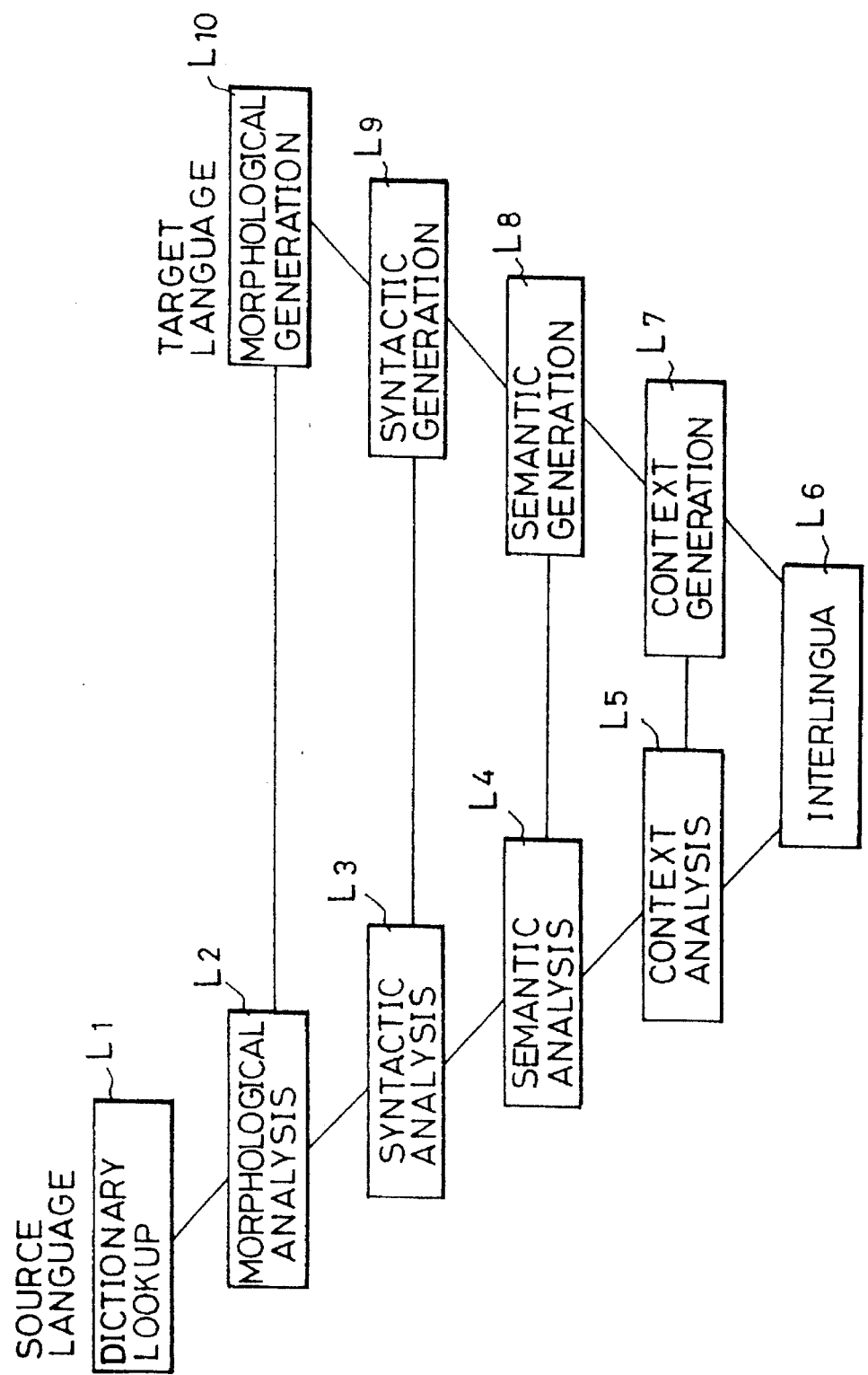
FIG. 2 is an explanatory view showing a translating process executed in the translation machine shown in FIG. 1.

The machine translation executed in the translating module 15 may be divided into the following analyzing stages as shown in FIG. 2.

As shown in FIG. 2, when the source language is entered into the translating module 15, the source language is analyzed serially in the order of a dictionary consulting stage at a level L1, a morphological analyzing stage at a level L2, a syntactic analyzing stage at a level L3, and so forth.

The machine translation is divided into two systems based on the analyzing level.

One system is arranged to analyze the source language up to the concept (referred to as an interlingua) independently of the source language and the target language and then generate the target language in the order of the concept to a context generating stage at a level L7, a semantic generating stage at a level LB, a syntactic generating stage at a level L9, and a morphological generating stage at a level L10. This system is referred to as a pivot system.

The other system is arranged to analyze the source language at any one of the morphological analyzing stage of the level L2, the syntactic analyzing stage of the level LB, the semantic analyzing stage of the level L4, and the content analyzing stage of the level L5 for obtaining an internal structure of the source language for the corresponding stage, convert the internal structure into the counterpart of the target language at the corresponding stage, and then generate the target language from the converted internal structure. This system is referred to as a transfer system.

Herein, the description will be oriented to each of the analyses L1 to L5 shown in FIG. 2.

At the dictionary consulting stage of the level L1 and the morphological analyzing stage of the level L2, the operation is executed to consult the dictionary stored in the memory 16 (see FIG. 1), divide the inputted sentence(s) into a morpheme train (word train), obtain the grammatical information like a part of speech and its translated counterpart about each word, and analyze each word for searching a tense, a person, and a number. At the syntactic analyzing stage of the level LB, the operation is executed to determine the syntax of the sentence (parsing tree) such as how the words are modified in the sentence. At the semantic analyzing stage of the level L4, the operation is executed to determine a correct one(s) of two or more analyzed syntaxes in light of the meaning. At the context analyzing stage of the level L5, the operation is executed to understand the topic of the sentence(s) and eliminate the omitted portion and the ambiguous portion from the sentence based on the topic.

In this embodiment, the translating module 15 is arranged to execute the analysis from the level L1 to at least the level L3, the syntactic analyzing stage. That is, the translating module 15 means a part shown in FIG. 3.

Figure 4:
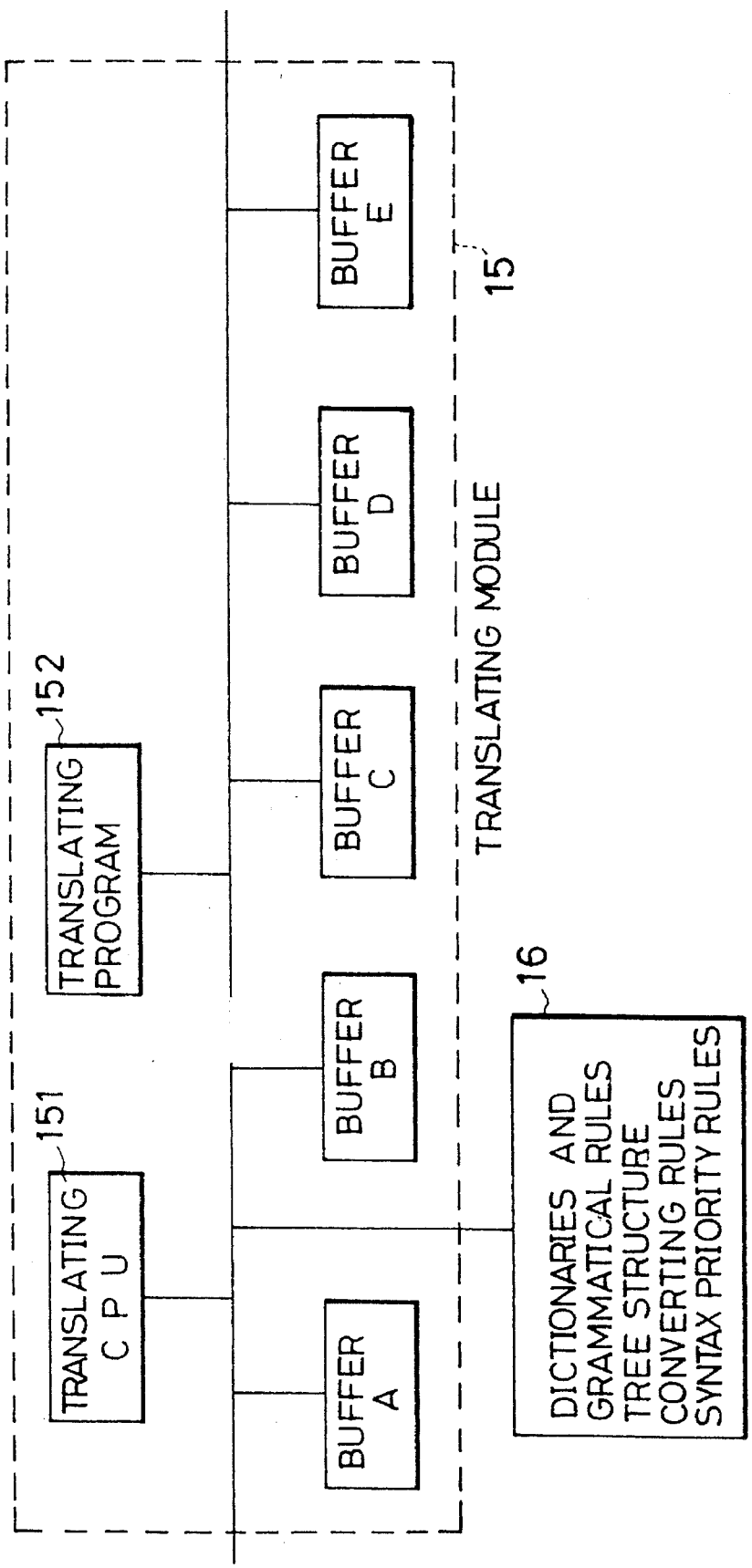
FIG. 4 is a block diagram showing an arrangement of the translating module shown in FIG. 3.

FIG. 4 is a block diagram showing an arrangement of the translating module 15. FIGS. 5 to 9 show the contents of the buffers A to E shown in FIG. 4 provided when the English sentence of "This is a pen." (original sentence 1) is translated into the Japanese sentence.

Later, the description will be oriented to the translation from English to Japanese as referring to FIGS. 3 to 9.

As shown in FIG. 5, the read original sentence is stored in the buffer A shown in FIG. 4. Under the control of the translating CPU 151 based on the translating program 152, the dictionary consulting and morphological analyzing unit shown in FIG. 3 operates to obtain information about a translated counterpart of each word composing the original sentence stored in the buffer A as referring to the dictionary shown in memory 16. The information is stored in the buffer B shown in FIG. 4.

For example, the information about a part of speech, which corresponds to part of the information, is stored as indicated in FIG. 6. The word "this" has two or more parts of speech. However, the syntactic analyzing unit 18 shown in FIG. 3 operates to uniquely define the part of speech of "this".

Figure 7:
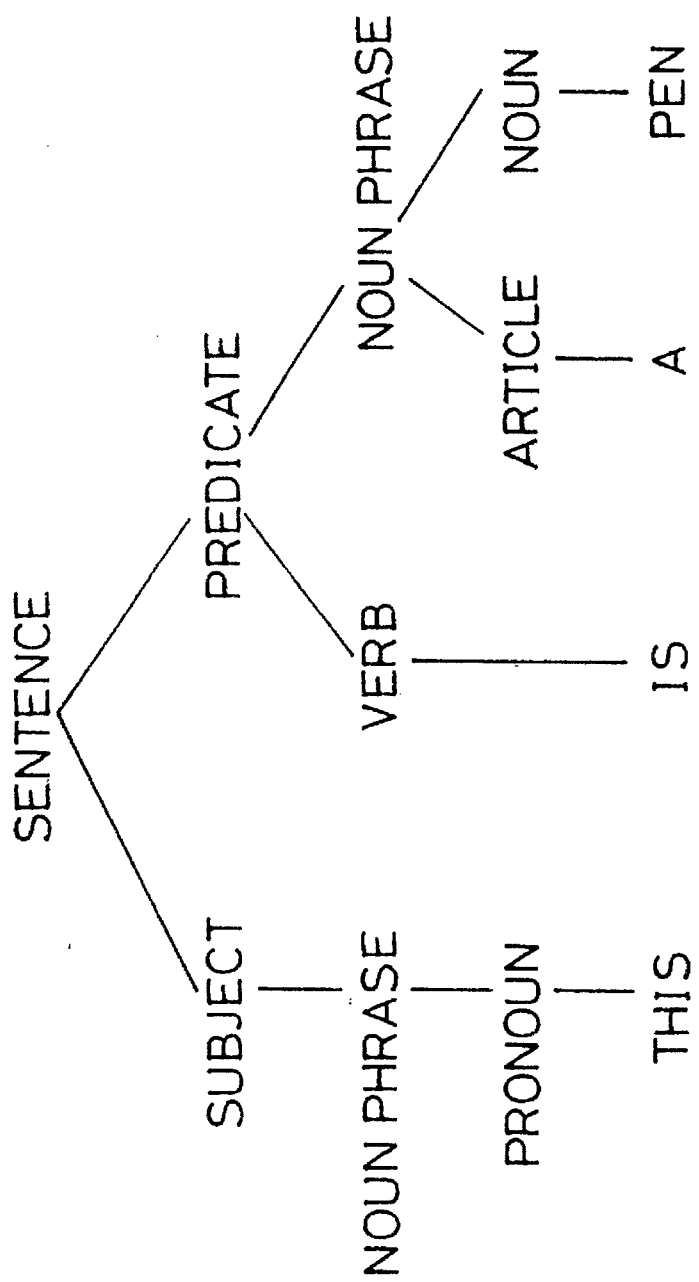
FIG. 7 is an explanatory view showing the content of a buffer C shown in FIG. 4.

The syntactic analyzing unit 18 operates to determine the parsing tree indicating how the words are modified as shown in FIG. 7 by referring to the dictionary and the grammatical rules stored in the memory 16. The parsing tree is stored in the buffer C shown in FIG. 4.

This parsing tree is determined as follows. That is, from the grammatical rules stored in the memory 16, the following rules are obtained.

Sentence→Subject+Predicate

Subject→Noun Phrase

Predicate→Verb+Noun Phrase

Noun Phrase→Pronoun

Noun Phrase→Article+Noun

For example, the first rule stands for "a sentence consists of a subject and a predicate".

Based on these rules, the parsing tree is determined. In the parsing tree shown in FIG. 7, the grammatical indexes ("Pronoun", "Verb", "Article", "Nouns" and so forth in FIG. 7) immediately above the actual words ("this", "is" and so forth in FIG. 7) are referred to as ╰terminal symbols". The grammatical indexes except them ("Sentence", "Subject", "Predicate", "Noun Phrase" and so forth in FIG. 7) are referred to as "non-terminal symbols". The terminal symbols are generally equivalent to the concepts referred to as "part of speech".

As mentioned above, the grammatical rule is required to have a non-terminal symbol at its left-hand (the left side located from an arrow).

Figure 8:
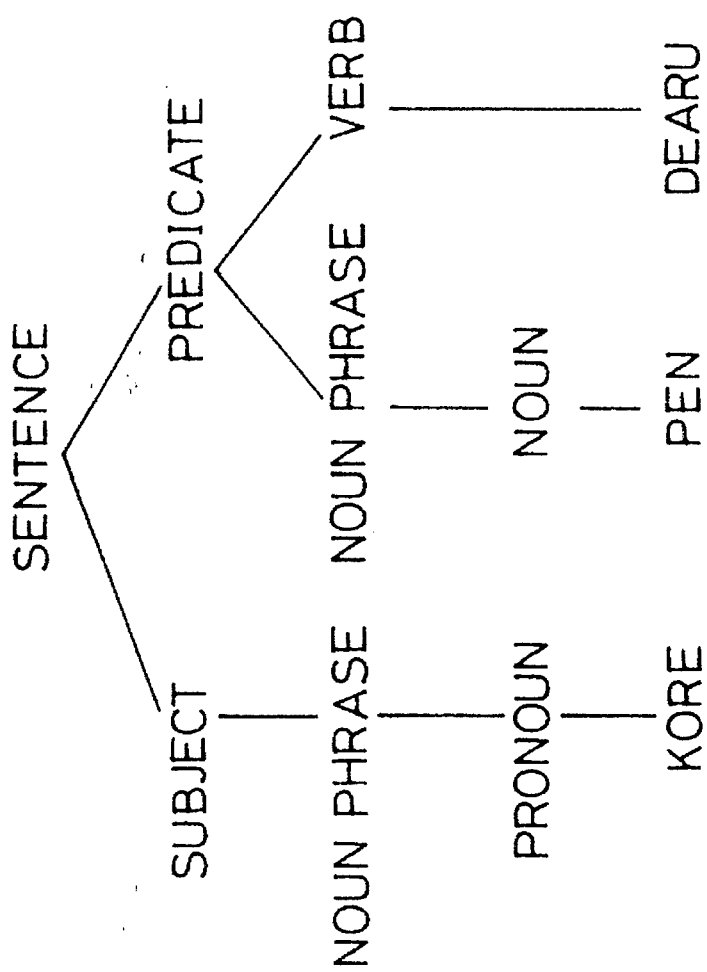
FIG. 8 is an explanatory view showing the content of a buffer D shown in FIG. 4.

The converting unit 19 (see FIG. 3) operates to convert the structure of the parsing tree (see FIG. 7) for the English sentence into the structure for the Japanese as shown in FIG. 8 based on tree structure converting rules. The obtained result is stored in the buffer D shown in FIG. 4.

The translated sentence generating unit 20 (see FIG. 3) operates to add a proper particle "ha" or a proper auxiliary verb to the obtained Japanese characters "Kote Pen De Aru" for completing the Japanese sentence as shown in FIG. 9. This Japanese sentence is stored in the buffer The Japanese sentence "Kote Ha Pen De Aru" is outputted from the translating module 15 and then is stored in the main memory 12 and displayed on the display device 13 at a time.

Next, the description will be oriented to the translating method used in the translation machine according to this embodiment as referring to FIGS. 10 to 28.

In this embodiment, "fitness of the syntax itself" is referred to as "syntax priority" and selection of a fit syntax based on the syntax priority is referred to as "interpretation of syntax priority" or simply "priority interpretation".

Next, the method for defining the syntax priority will be described.

The grammatical rules stored in the memory 16 (see FIG. 4) are listed in Table 2. Table 1 lists separation of the grammatical indexes used in the grammatical rules listed in Table 2 into the terminal symbols and the non-terminal symbols.

Table 1

End Indexes: Noun, Pronoun, Article, Preposition, Equivalent Conjunction, Verb, Period Non-end Indexes: Noun Phrase, Preposition Phrase, Verb Phrase, Main Clause Table 2

(r1) Noun Phrase→Noun
(r2) Noun Phrase→Pronoun
(r3) Noun Phrase→Article+Noun Phrase
(r4) Preposition Phrase→Preposition+Noun Phrase
(r5) Noun Phrase→Noun Phrase+Preposition Phrase
(r6) Noun Phrase→Noun Phrase+Equivalent Conjunction+Noun Phrase
(r7) Verb Phrase→Verb+Noun Phrase
(r8) Verb Phrase→Verb+Noun Phrase+Preposition Phrase
(r9) Verb Phrase→Verb+Preposition Phrase
(r10) Main Clause→Noun Phrase+Verb Phrase
(r11) Sentence→Main Clause+Period In such a translation machine, an original sentence "I bought films for the camera and tapes for the VTR. (Original Sentence 2)" is entered. This sentence is subject to the morphological analysis and then the syntactic analysis according to the grammatical rules listed in Table 2. The resulting parsing tree is made to be the tree shown in FIG. 10. For the original sentence 2, the parsing tree is not uniquely defined only by the grammatical rules listed in Table 2.

Figure 10:
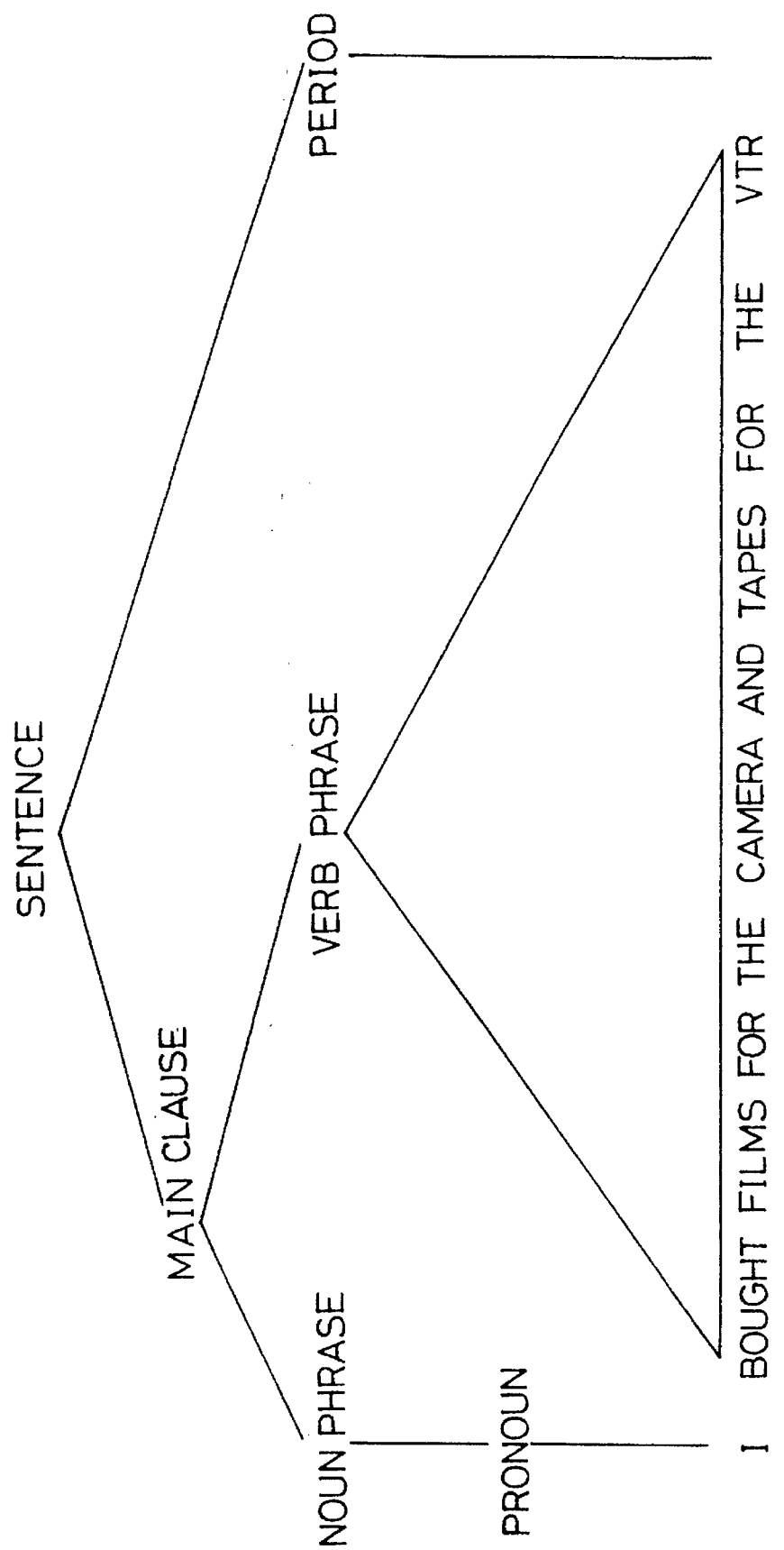
FIG. 10 is a view showing a parsing tree derived by the translation machine shown in FIG. 1.

The part of "bought films for the camera and tapes for the VTR (partial clause 3)" may be analyzed into two or more ways. As shown in FIG. 10, the partial clause in which two or more parsing trees may be derived is not represented in the form of the parsing tree but in the form of a triangle covering the corresponding part.

In the translation machine according to this embodiment, the parsing tree stored in the buffer C of FIG. 4 takes the form as shown in FIGS. 11a to 11k, which indicates only the part corresponding to the partial clause 3 in which the structure is not uniquely defined, of all the data about the parsing trees derived by syntax-analyzing the original sentence 2.

As will be understood from FIGS. 11a to 11k, if the partial clause 3 is syntax-analyzed according to the grammatical rules indicated by Table 2, the number of the resulting solutions is 11. The buffer C enables to store all the data about the eleven parsing trees at one time.

The priority about each of these eleven parsing trees is defined in light of the form of the parsing tree itself. This method for defining the priority is the syntax priority interpretation introduced by the invention. When executing the syntactic analysis based on the syntax priority interpretation, in addition to the grammatical rules listed in Table 2, the syntax priority rules listed in Table 3 are used.

TABLE 3

(y1) Noun Phrase (Noun Phrase (Noun Phrase + Preposition Phrase (Preposition + *) + Equivalent Conjunction + Noun Phrase (Noun Phrase + Preposition Phrase (Preposition + *)))
    Incidental Condition: The surface layer of the fifth element is equivalent to that of the eleventh element.
    —> Priority Magnification 2.0
(y2)
    —> Priority Magnification 1.5
(y3)
    —> Priority Magnification 3.0

The syntax priority rule is a rule in which if the group of indexes under one non-terminal symbol (this is a non-terminal symbol A) included in the parsing tree meet an incidental condition, a certain priority value is given to the non-terminal symbol (non-terminal symbol A) located at the vertex of the index group.

Each syntax priority rule includes a format indicated by (y1) of Table 3. The part before an arrow means the left hand of the rule, that is, "Noun Phrase (Noun Phrase (Noun Phrase+Preposition Phrase (Preposition+*))+Equivalent Conjunction+Noun Phrase (Noun Phrase+Preposition Phrase (Preposition Phrase+*))) Incidental Condition : The fifth element is equivalent to the eleventh element in the surface layer". The part after the arrow means the right hand of the rule, that is, "Priority Magnification 2.0".

In the left hand of the rule (y1) of Table 3, the item of "Incidental Condition" exists. In actuality, however, this item is not essential in the left hand of the syntax priority rule.

Then, the description will be oriented to the meaning of the left hand of the syntax priority rule.

The part except the "incidental condition" in the left hand stands for the form of a partial analyzing tree consisting of a certain non-terminal symbol and some non-terminal or terminal symbols located under the non-terminal symbol in the overall parsing tree.

How to stand for the form of the partial analyzing tree in this embodiment will be described as referring to FIGS. 12 to 15.

Figure 12:
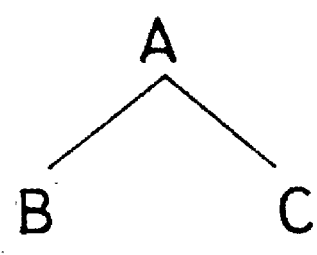
FIG. 12 is an explanatory view showing how to write a priority interpretation rule.
Figure 13:
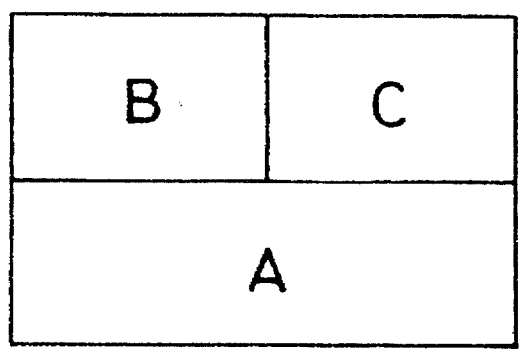
FIG. 13 is an explanatory view showing how to write a priority interpretation rule.

The index marked between a pair of parentheses "()" means an index at a lower node by one than the index located in the immediately left-hand of the parenthesis "(". For example, the rule indicated by A(B) means only the index B exists at a lower position by one than the index A. Further, a plus symbol "++ means an index located in the immediately left-hand of the plus symbol "+" and an index located in the immediately right-hand of the plus symbol shares an index at a lower position by one than these two indexes located in the left-hand and the right-hand of the plus symbol "+". For example, the rule of A(B+C) is, as shown in FIG. 12, means the indexes B and C exist at a lower position by one than the non-terminal symbol A. FIG. 13 shows the form of the partial parsing tree as shown in FIG. 12 given when the tree is stored in the buffer C shown in FIG. 4.

Figures 14, 15:
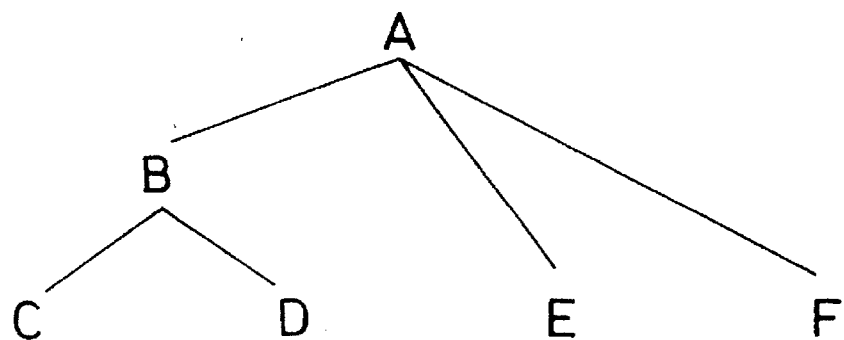
FIG. 14 is an explanatory view showing how to write a priority interpretation rule.
FIG. 15 is an explanatory view showing how to write a priority interpretation rule.

By using the parentheses "("and")" and the plus symbol "+", it is possible to represent the form of a parsing tree as a one-line range of end/non-terminal symbols however complicated the tree is. For example, the parsing tree shown in FIG. 14 is represented by A(B(C+D)+E+F). Further, FIG. 15 shows the form of the parsing tree as shown in FIG. 14 given when the tree is stored in the buffer C of FIG. 4.

Figure 16:
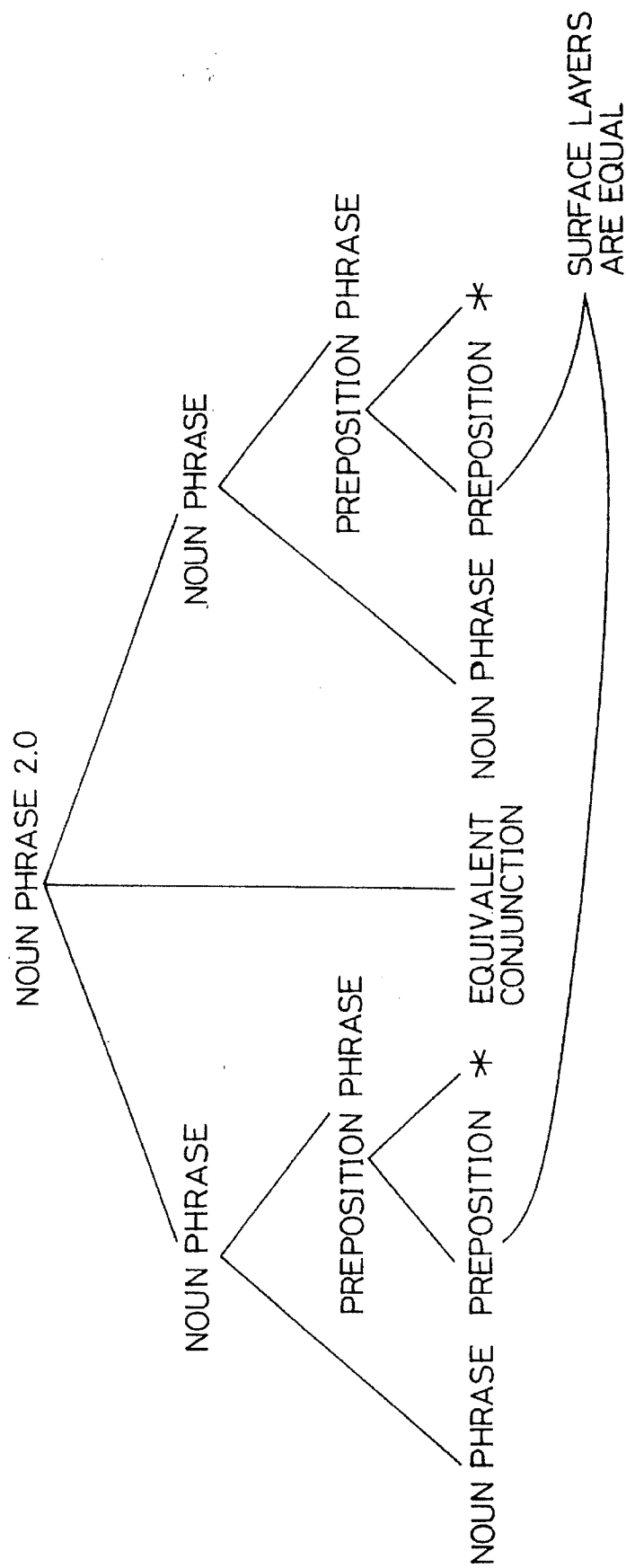
FIG. 16 is a view showing a parsing tree standing for a priority interpretation rule which may apply to the translation machine shown in FIG. 1.

It will be understood from the above description that the syntax priority rule (y1) of Table 3 indicates the parsing tree as shown in FIG. 16. FIG. 17 shows the form of the parsing tree shown in FIG. 16 given when it is stored in the buffer C shown in FIG. 4.

The syntax priority rule (y1) of Table 3 means experience rules on the English interpretation. For example, consider the following English partial clause.

"P of Q and R of S (partial clause 4)"

wherein P, Q, R and S stand for an actual English word or an English word train, respectively, it is assumed that P and R stand for a noun or a noun phrase. In the assumption, it is experientially known that the correct translation of the partial clause 4 is not such that "Q and R" modifies "P" and "S" modifies the overall "Q and R" modified by "P" or "S" modifies "Q and R" and "P" modifies the overall "Q and R" modified by "S" but such that "Q" modifies "P" and "S" modifies "R".

Figure 18:
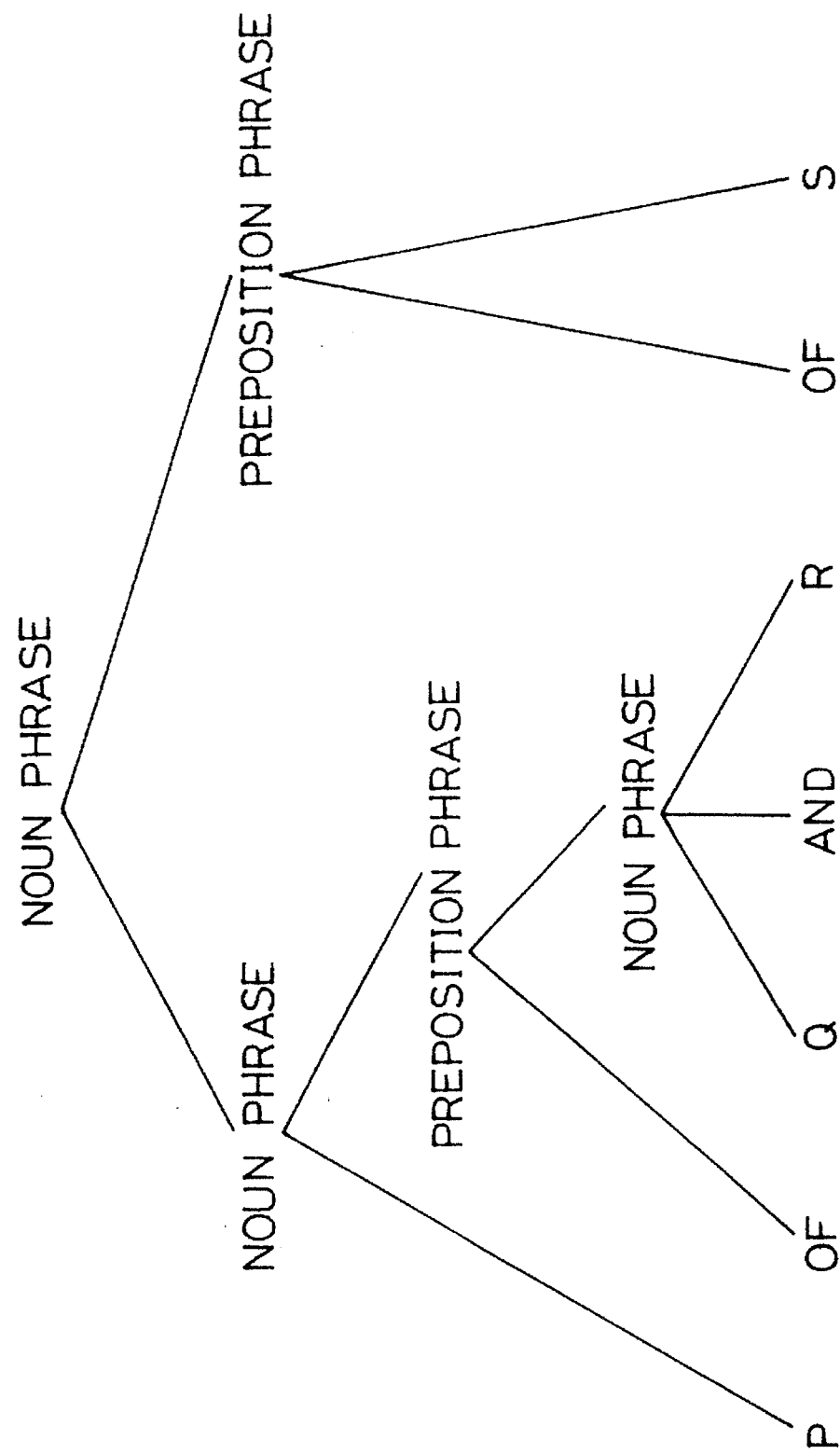
FIG. 18 is a view showing a parsing tree standing for a priority interpretation rule which may apply to the translation machine shown in FIG. 1 and another parsing tree competing therewith.
Figure 19:
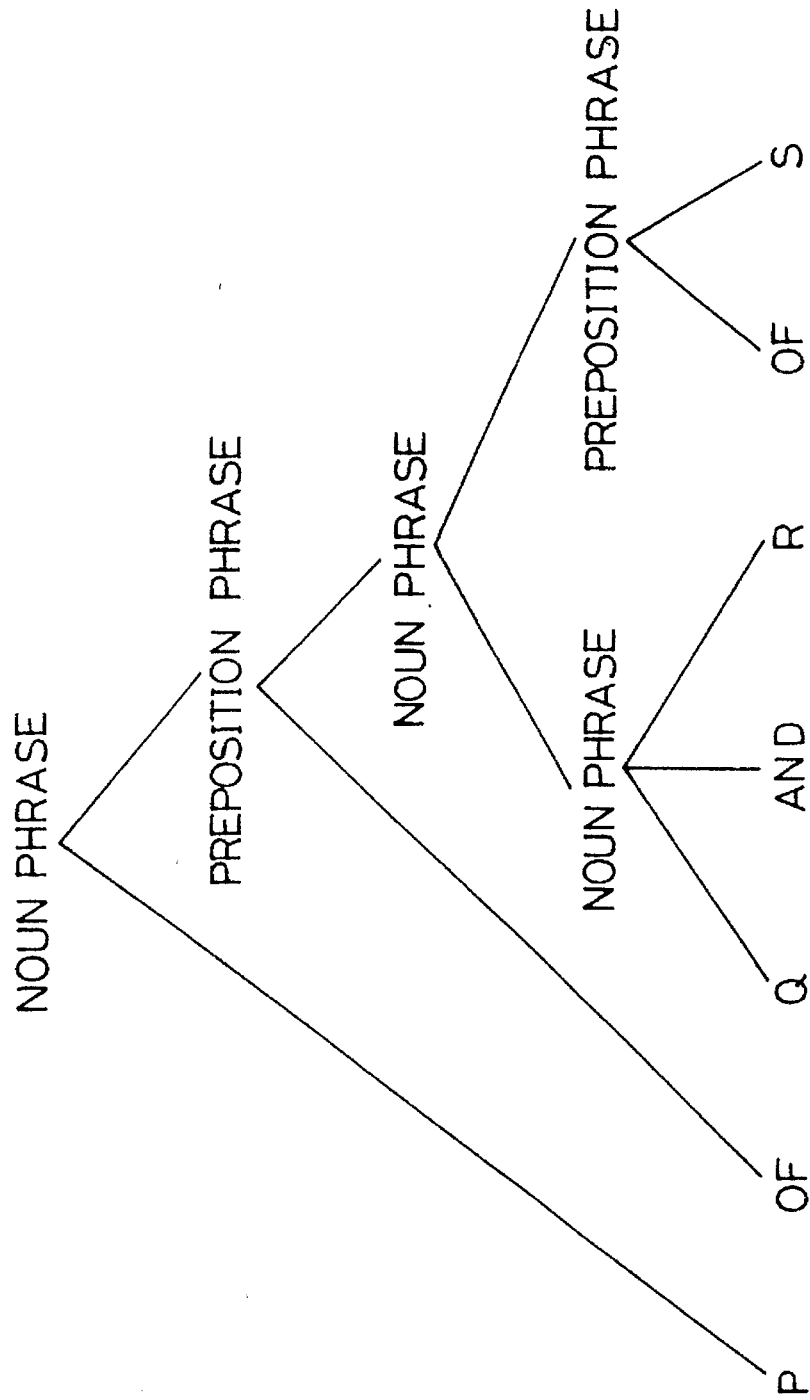
FIG. 19 is a view showing a parsing tree standing for a priority interpretation rule which may apply to the translation machine shown in FIG. 1 and another parsing tree competing therewith.
Figure 20:
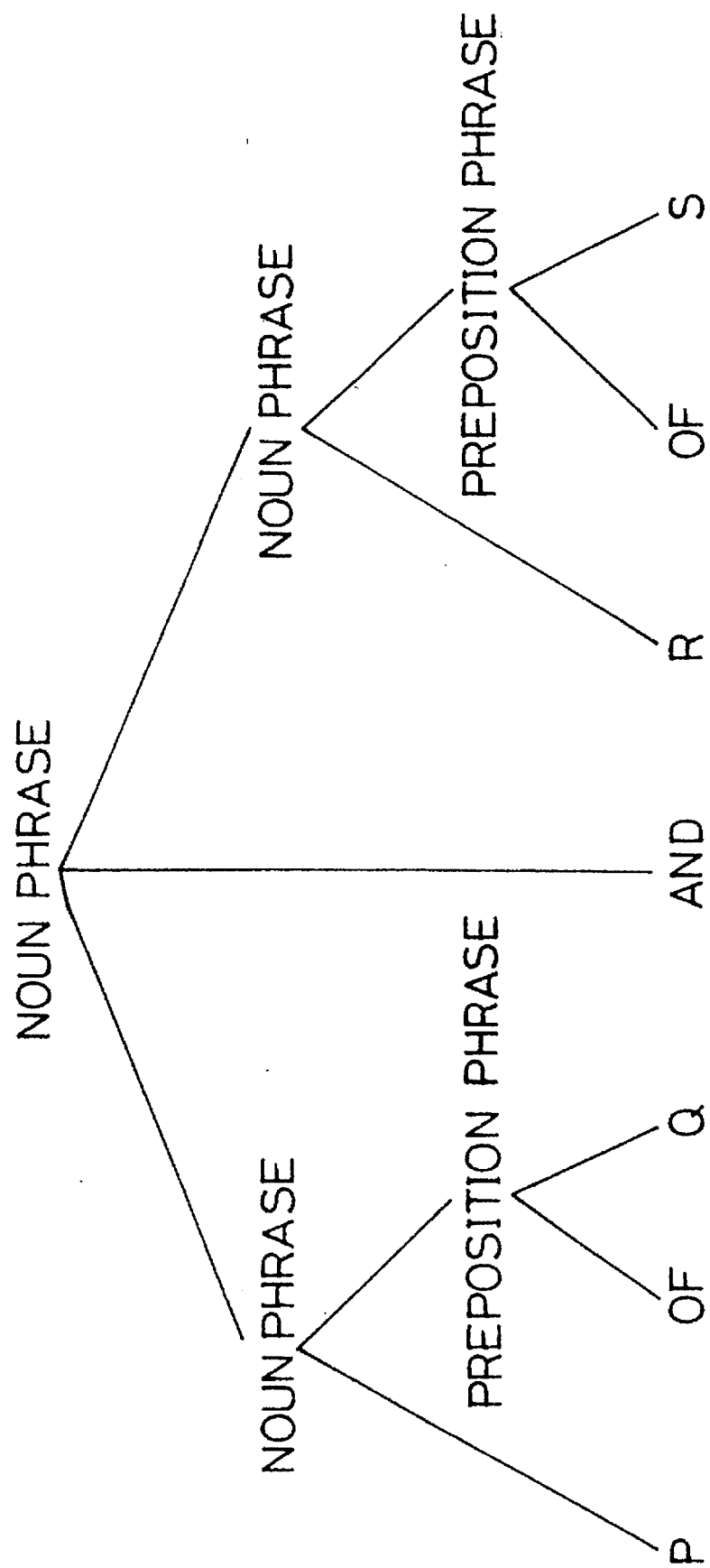
FIG. 20 is a view showing a parsing tree standing for a priority interpretation rule which may apply to the translation machine shown in FIG. 1 and another parsing tree competing therewith.

In many cases, therefore, the correct parsing tree standing for the partial clause 4 should be analyzed not as shown in FIGS. 18 and 19 but as shown in FIG. 20. However, this analysis does not always hold true to such a partial clause as "P of Q and R on S (partial clause 5)".

Further, consider the following English partial clause "T for U or V for W (partial clause 6). Like the partial clause 4, T, U, V and W each stand for an actual English word or an English word train. Assuming that T and V are a noun or a noun phrase, it is experientially known that the correct translation of the partial clause 6 is not such that "U or V" for "W" and "T" for "U or V" or "T" for "U or V" and the overall "T for U or V" for "W" but such that "T" for "U" or "V" for "W".

Figure 21:
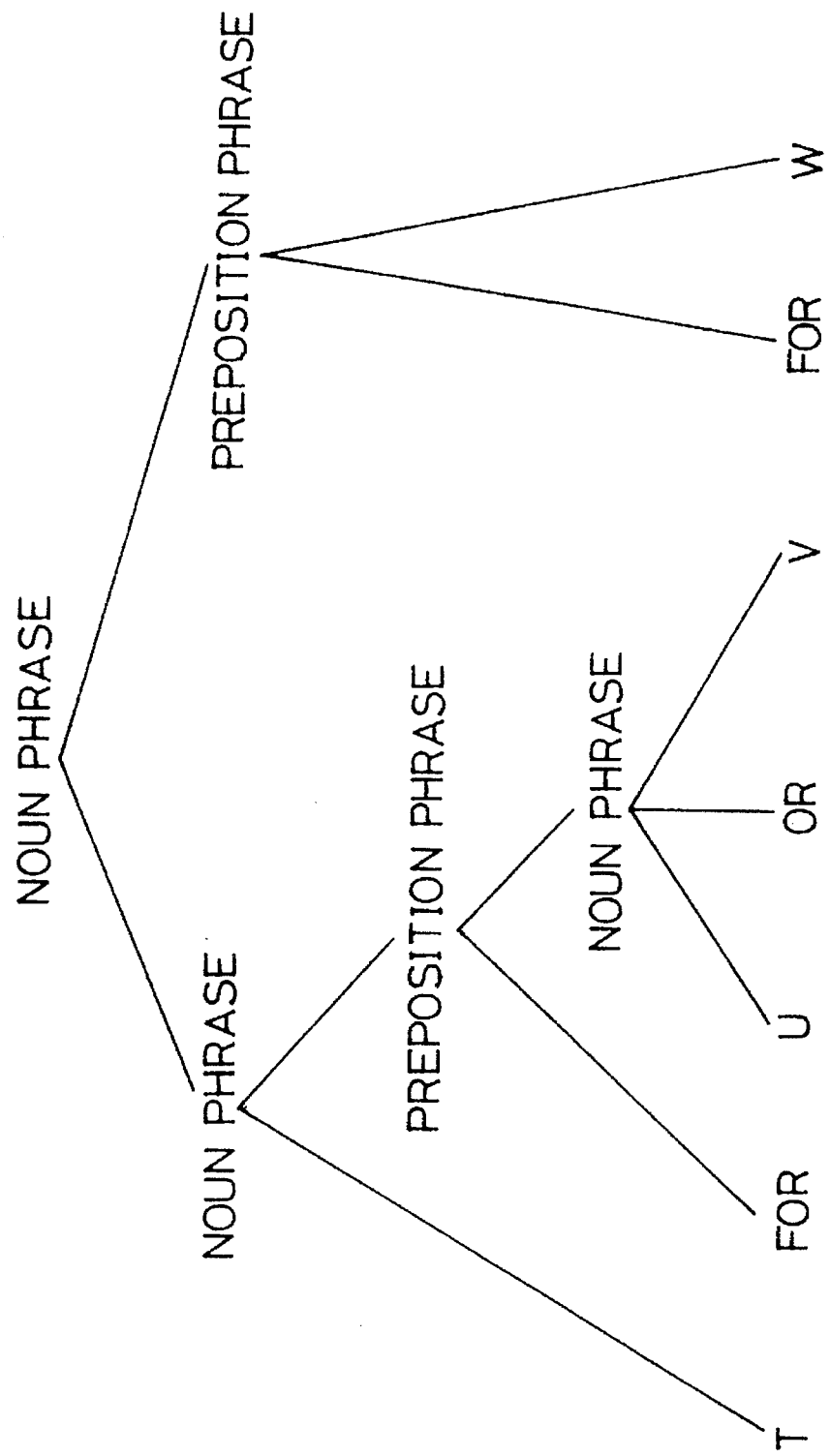
FIG. 21 is a view showing a parsing tree standing for a priority interpretation rule which may apply to the translation machine shown in FIG. 1 and another parsing tree competing therewith.
Figure 22:
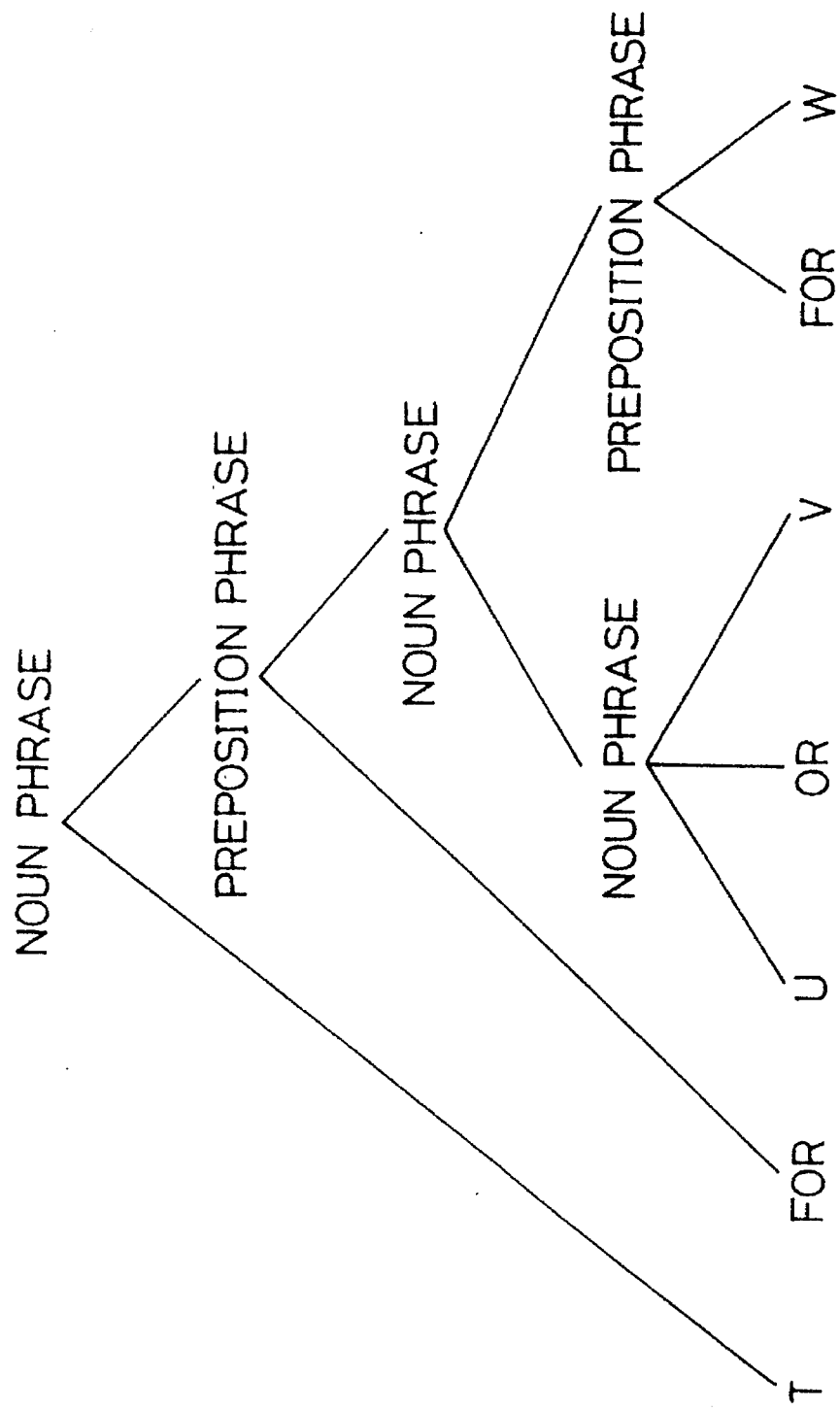
FIG. 22 is a view showing a parsing tree standing for a priority interpretation rule which may apply to the translation machine shown in FIG. 1 and another parsing tree competing therewith.
Figure 23:
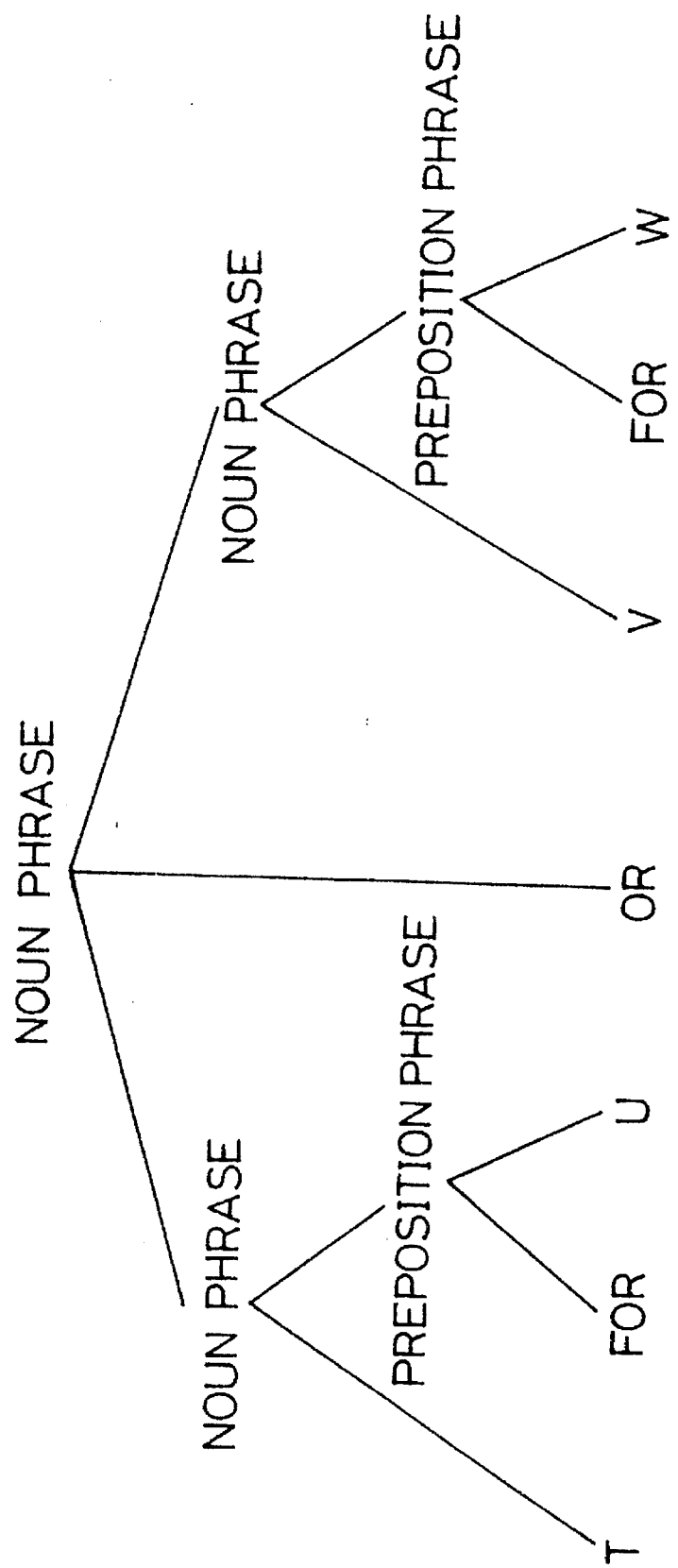
FIG. 23 is a view showing a parsing tree standing for a priority interpretation rule which may apply to the translation machine shown in FIG. 1 and another parsing tree competing therewith.

In many cases, the correct parsing tree standing for the partial clause 6 should be analyzed not as shown in FIG. 21 or 22 but as shown in FIG. 23. However, in actual, this analysis does not always hold true to such a partial clause as "T for U or V in W (partial clause 7)".

From the experiential rules about the interpretation of the partial clauses 4, 5, 6 and 7 as described above, a more general experiential rule can be extracted. That is, the partial clause having a word range of "Noun Phrase 1, Preposition 1, Phrase 2, Equivalent Conjunction, Noun Phrase 3, Preposition 2, Phrase 4 (partial clause 8)" should be interpreted as follows if the preposition 1 is the same word as the preposition 2. The most possible translation is: the noun phrase 1, the preposition 1 and the phrase 2 are collectively interpreted as one noun phrase A and the noun phrase 3, the preposition 2 and the phrase 4 are collectively interpreted as one noun phrase B, the noun phrase A and the noun phrase B are interpreted to be connected by the equivalent conjunction as one noun phrase.

According to how to write the syntax priority rule according to this embodiment, this experiential rule is formulated. This formulation means the rule (y1) of Table 3.

The rule (y1) uses an asterisk symbol "*" in addition to the indexes and the symbols described above. In the syntax priority rule according to this embodiment, the asterisk symbol "*" means a symbol to be replaced with what kind of terminal symbol or non-terminal symbol. In the partial clause 8 standing for the experiential rule, the phrases 2 and 4 do not have specified index names. The asterisk symbol "*" is used when the experiential rule containing such a word or phrase is formulated as a syntax priority rule.

The rule (y1) needs to meet the condition that the preposition 1 is the same word as the preposition 2 as in the partial clause 8. Hence, in the left hand of the rule, the incidental condition is provided indicating "the fifth element has the same surface layer as the eleventh element".

The syntax priority rule used in this embodiment recognizes a rule that the priority condition (left hand of the rule) is just the form of the parsing tree consisting of a range of terminal symbols and non-terminal symbols and a rule (y1) that the incident priority condition is the surface layer, that is, the information about the characters of the words. The syntax priority rule according to the present invention covers specification of the characters of all the words as a phrase as well as specification of the form of the parsing tree and the information like characters about a key word.

In the incidental condition of the rule (y1), the n-th element (n is a natural number) indicates an n-th end or non-terminal symbol or an asterisk symbol "*" sequentially counted From the left hand (a plus symbol and a parenthesis are ignored when counting the indexes) in the part except the "incidental condition" in the left hand of the rule, that is, the form of the parsing tree. Hence, in the rule (y1), the fifth and the eleventh elements mean the "preposition".

Next, the description will be oriented to the meaning of the right hand of the syntax priority rule indicated in Table 3 and a syntax priority interpreting method using the syntax priority rule.

In calculating the priority of the parsing tree, one non-terminal symbol in the parsing tree has one score. This is referred to as a "basic score" of each non-terminal symbol. In this embodiment, the basic score is one. In actuality, however, if there is provided a translation machine which gives a score to the non-terminal symbol or the grammatical rule of Table 2 for improving the translating accuracy, these scores may be considered as a basic score.

In the parsing tree having no spot where the syntax priority rule may apply as shown in Table 3, the priority of the overall parsing tree (referred to as a "general priority before correction" of the overall parsing tree) is a sum of the basic scores of all the non-terminal symbols contained in the parsing tree.

That is, if the basic score for one non-terminal symbol is one, the general priority before correction of the overall parsing tree is equivalent to the number of the non-terminal symbols included in the parsing tree. When comparing the priority of one parsing tree with that of another tree, the comparison uses a value given by dividing the general priority before correction included in the parsing tree by the number of non-terminal symbols.

The value is referred to as a "general priority after correction". The fitness of the syntax does not essentially depend on the complication and the scale of the form of the syntax. This treatment is executed for eliminating the influence of the factors such as the complication and the scale from the general priority.

As a result, one score is always given to the general priority after correction of the parsing tree having no spot where the syntax priority rule may not apply.

Next, the description will be oriented to the parsing tree having a spot where one of the syntax priority rules listed in Table 3 may apply.

Assume that a syntactic analyzing rule may apply to a node A in the parsing tree. The non-terminal symbol of the node A coincides with the non-terminal symbol located at the top of the partial parsing tree indicated in the left hand of the applicable syntactic analyzing rule. "Non-terminal symbol located at the top of the partial parsing tree" indicates the highest non-terminal symbol as shown in FIG. 14 or 16 or the non-terminal symbol in the leftmost side of the description of the rule shown in Table 3.

In this case, the sum of the basic scores of all the non-terminal symbols located at the node A or a lower spot than the node A is multiplied by a value of "priority magnification" written in the right hand of the applicable syntactic analyzing rule. The multiplied value is considered as a sum of the basic scores of all the non-terminal symbols located at the node A or a lower spot than the node A. This value is referred to as a "partial general priority with the node A as a vertex". The partial general priority has values "before correction" and "after correction". The value "before correction" is a value given by multiplying a sum of the basic scores by the value in the right hand of the syntax priority rule and the value "after correction" is a value given by dividing the value "before correction" by the number of the non-terminal symbols.

With this operation, finally, the general priority after correction of the overall sentence can be obtained. About the sentence from which two or more parsing trees are derived, by comparing the general priorities after correction among the parsing tree, it is possible to define the most fitting parsing tree.

As shown in FIG. 11a to 11k, the partial clause 3 of the original sentence 2 is allowed to be interpreted into eleven ways. From these interpreted results, the interpretations 1 and 7 are taken as examples. The method for calculating the general priority of the overall parsing tree by using the priority interpretations 1 and 7 shown in FIGS. 11a and 11g will be described below.

The parsing tree of the interpretation 1 does not have any spot where the syntax priority rules of Table 3 may apply. The parsing tree of the interpretation 7 has a spot where the syntax priority rule (y1) of Table 3 may apply. The parsing trees except the interpretations 1 and 7 do not have any spot where the syntax priority rules of Table 3 may apply. That is, as mentioned above, the general priority after correction of the parsing trees defined by the interpretations except the interpretations 1 and 7 has the same value as that of the interpretation 1. Hence, the description about the calculating process except the interpretations 1 and 7 is left out.

As shown in FIG. 10, the parsing tree of the original sentence 2 has two parts, that is, a part to be interpreted in some ways and a part to be interpreted in one way. In this embodiment, the comparison of the priority if the tree is interpreted into some ways uses the general priority of the overall sentence, that is, the general priority after correction calculated at the node where the non-terminal symbol "sentence" is written in FIG. 10. If possible, however, it is possible to use for comparison the partial general priority after correction calculated at the vertex of the partial parsing tree of the part to be interpreted into some ways (partial clause 3), that is, the node where the non-terminal symbol "verb phrase" is written in FIG. 10.

Figure 25:
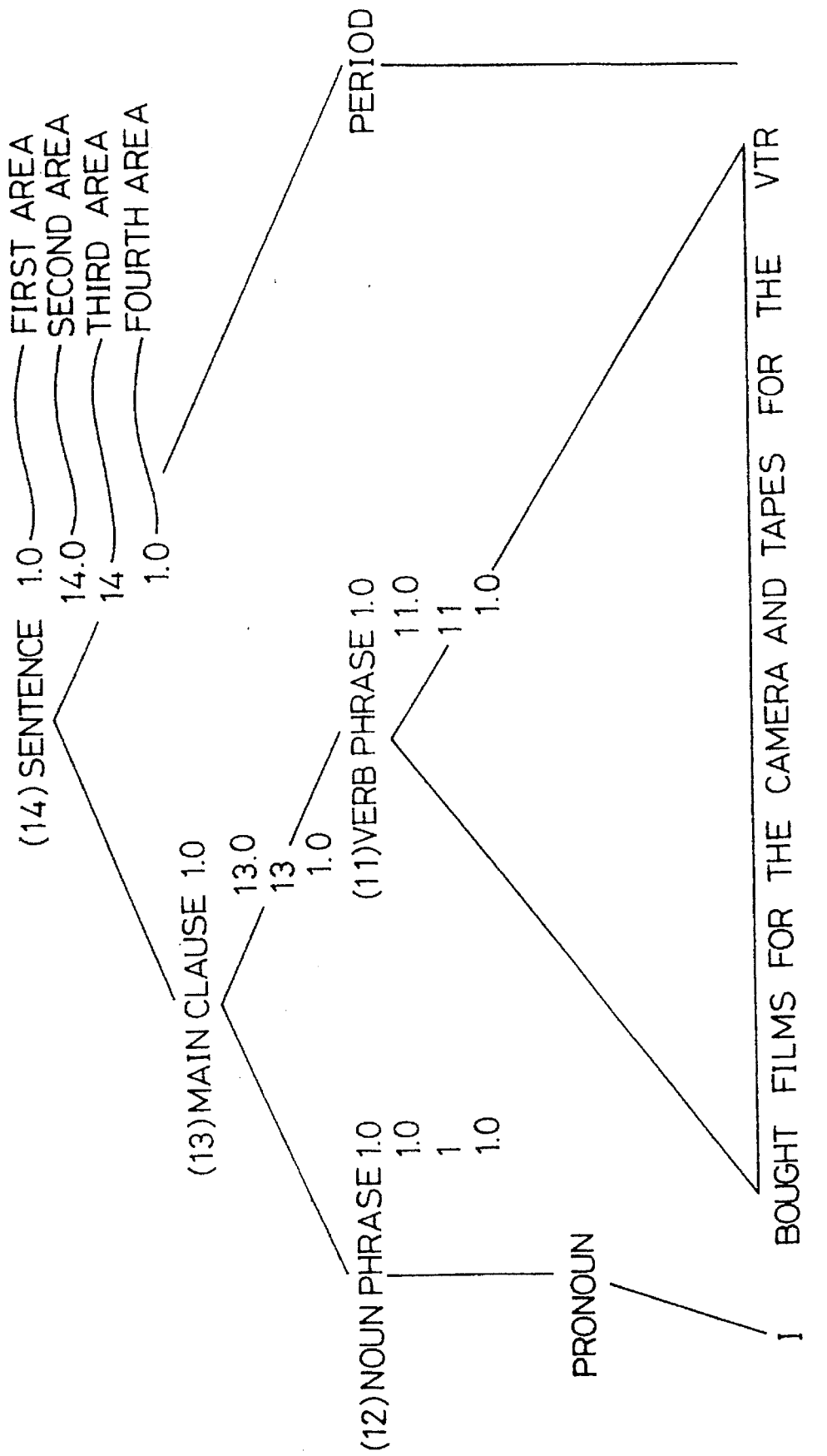
FIG. 25 is an explanatory view showing a process for calculating a priority value in the translation machine shown FIG. 1.

Next, the description will be oriented to the process for calculating the priority for the interpretation 1 shown in FIG. 11a as referring to FIGS. 24 and 25.

The technique for analyzing the syntax is divided into a top-down type for building the parsing tree from the vertex to the end and a bottom-up type for building it from the end to the vertex. Likewise, it is considered that the calculating method may be divided into the top-down type and the bottom-up type. This embodiment will be described on the basis of the bottom-up type calculating method.

The actual data of the parsing tree for the interpretation 1 in the translation machine of this embodiment is stored in the buffer C shown in FIG. 4 in the form shown in FIG. 11A, the detail of which is shown in FIG. 24. At first, the process at the node (1) of the non-terminal symbol "noun phrase" shown in FIG. 24 will be described later.

The partial parsing tree with the node (1) as the vertex covers the word "films". In the range of the partial parsing tree, only the node (1) is provided. Since the node (1) itself has one basic score, the sum of the basic scores of all the non-terminal symbols located at a node (1) or a lower place than the node (1) (upper place in FIG. 24) is one score. Since no syntax priority rule applicable to the node (1) is provided, the priority magnification is 1.0.

In the column standing for the node (1) in FIG. 24, four numerical values of 1.0, 1.0, 1 and 1.0 are described in addition to the name of the node and the non-terminal symbol name noun phrase In the form of storing the parsing tree data in this embodiment, at a place for storing a node with a non-terminal symbol, an area is provided for storing such four numerical values.

The numerical value "1.0" of the first area is a priority magnification given by applying the syntax priority rule to the node. As mentioned above, since no syntax priority rule applicable to the node (1) is provided, the numerical value 1.0 which does not change the multiplicand if multiplied is stored in the first area. Next, since the sum of the basic scores of all the non-terminal symbols at the node (1) or a lower location than the node (1) (upper in FIG. 24) is one score, this sum is multiplied by the priority magnification 1.0 for obtaining the numerical value 1.0. This is the partial general priority before correction with the node (1) as a vertex as mentioned above. This numerical value is stored in the second area. The third area stores the number of all the non-terminal symbols located at the node (1) or a lower location than the node (1) (upper in FIG. 24). Since the node (1) has just one non-terminal symbol, a value of 1 is stored in the third area. The fourth area stores a numerical value given by dividing the numerical value of the second area by the numerical value of the third area. This is the partial general priority after correction with the node (1) as a vertex as mentioned above. This is a numerical value of 1.0.

The four numerical values are stored in the corresponding areas of the node (1) as described above.

The method for calculating each of the four numerical values for the nodes (2), (3) and (4) shown in FIG. 24 will be easily understood from the above calculating method for the node (1) and hence is not described herein.

Next, the description will be oriented to the process for the non-terminal symbol "noun phrase" at the node (5) shown in FIG. 24.

The partial parsing tree with the node (5) as a vertex covers the word train "the camera". In the range of the partial parsing tree, the non-terminal symbols exist at the nodes (2) and (5). The sum of the basic scores contained at the node (2) or a lower location than the node (2) in the partial parsing tree is stored in the second region of the storage area for the node (2). This is the partial general priority 1.0 before correction with the node (2) as a vertex. The node (5) has its own one basic score. Hence, the sum of the basic scores of all the non-terminal symbols at the node (5) or a lower location than the node (5) is 2.0. Since no syntax priority rule applicable to the node (5) is provided, the priority magnification is 1.0, which is stored in the first region of the storage area for the node (5). The value of 2.0 is multiplied by the priority magnification 1.0 for obtaining the partial general priority 2.0 with the node (5) as a vertex. The value of 2.0 is stored in the second region of the storage area for the node (5). In succession, the number of all the non-terminal symbols located at the node (5) or a lower place than the node (5) (upper in FIG. 24) is counted. At a time, the number of the non-terminal symbols at the node (2) or a lower place than the node (2) (upper in FIG. 24) is stored in the third region of the storage area for the node (2). Hence, the number of the non-terminal symbols at a lower place than the node (2) (upper in FIG. 24) is not required to be counted. The numerical value 1 stored in the third region of the storage area for the node (2) is used. As a result, the number of the non-terminal symbols at the node (5) or a lower place than the node (5) (upper in FIG. 24) is derived as 2. The value of 2 is stored in the third region of the storage area for the node (5). Further, the value of the second region for the node (5) is divided by the numerical value in the third area for obtaining the partial general priority after correction with the node (5) as a vertex. This value of 1.0 is stored in the fourth region of the storage area for the node (5).

Likewise, for each of the nodes (6), (7), (8), (9), (10) and (11), there are derived four numerical values including the priority magnification given by applying the syntax priority rule to the node, the partial general priority before correction with the node as a vertex, the number of all the non-terminal symbols located at the node or a lower place than the node (upper in FIG. 24), and the partial general priority after correction with the node as a vertex. The four numerical values are stored in the corresponding storage area for each of the nodes in the buffer C.

The sequence of deriving the four values is not limited to the sequence of the node (6), the node (7), the node (8), the node (9), the node (10) and the node (11). With the aforementioned operation, in the fourth region of the storage area for the node (11), there is stored the partial general priority after correction with the node (11) as a vertex, that is, the priority 1.0 for the partial clause 3.

Further, as shown in FIG. 25, the four numerical values are derived for the nodes (12), (13), and (14).

As a result, in the fourth region of the storage area for the node (14), the syntax priority 1.0 of the overall original sentence 2 (given if the partial clause 3 is interpreted like the interpretation 1 of FIG. 11a) is obtained.

Figure 26:
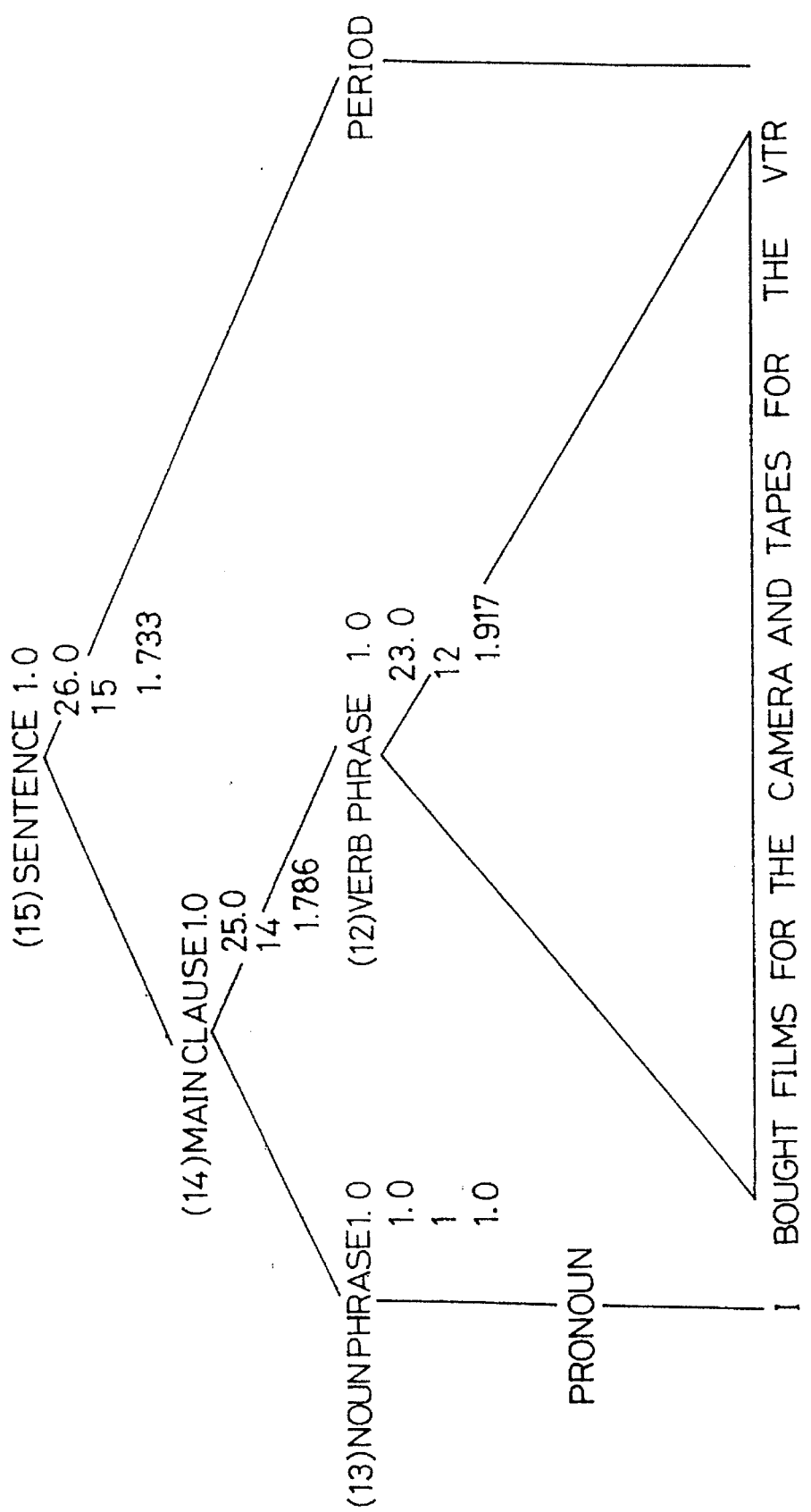
FIG. 26 is an explanatory view showing a process for calculating a priority value in the translation machine shown in FIG. 1.
Figure 27:
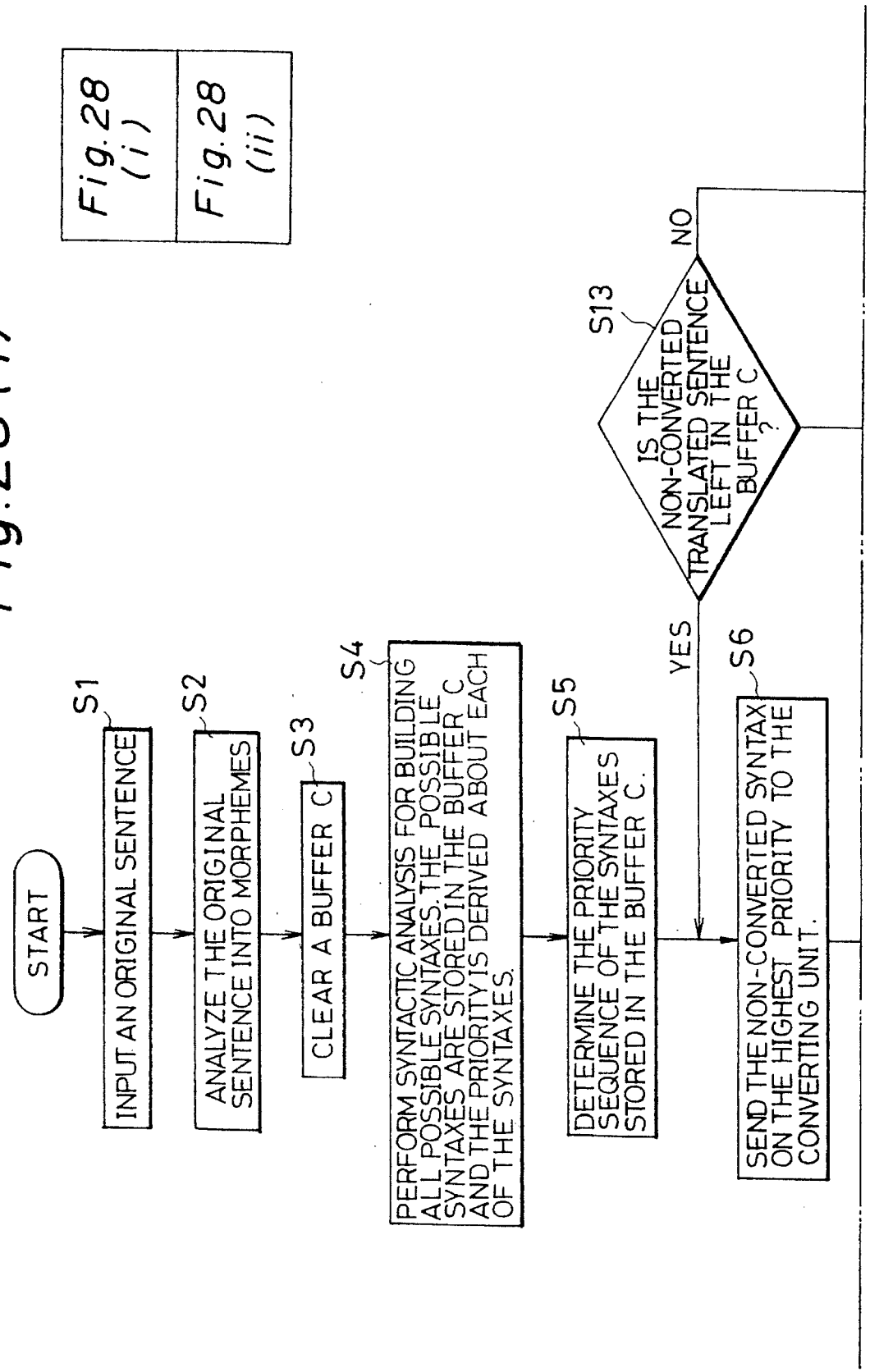
FIG. 27 is an explanatory view showing a process for calculating a priority value in the translation machine shown in FIG. 1.

Next, the description will be oriented to the process for calculating a priority given in the case of the interpretation 7 indicated in FIG. 11g as referring to FIGS. 26 and 27.

FIG. 27 shows in detail the actual data of the parsing tree in the case of the interpretation 7 in the translation machine according to this embodiment.

The method for calculating the four numerical values for each of the nodes (1), (2), (3), (4), (5), (6), (7), (8), (9) and (10) is the same as the method referred in FIGS. 24 and 25. It will be easily understood from the method for interpreting the priority in the case of the interpretation 1 of FIG. 11a and hence is not described herein.

Next, the description will be oriented to the process in the node (11) having the non-terminal symbol "noun phrase" shown in FIG. 26.

The partial parsing tree with the node (11) as a vertex covers the word train "films for the camera and tapes for the VTR". In the range of the partial parsing tree, the non-terminal symbols are provided in the node (11) itself, the node (1), the node (2), the node (3), the node (4), the node (5), the node (6), the node (7), the node (8), the node (9), and the node (10). Of these non-terminal symbols, the nodes (1), (2), (5) and (7) exist inside of the partial parsing tree with the node (9) as a vertex. Further, the nodes (3), (4), (6) and (8) exist inside of the partial parsing tree with the node (10) as a vertex.

The sum of the basic scores contained in the partial parsing tree located at the node (9) or a lower place than the node (9) is considered as the partial general priority 5.0 before correction with the node (9) as a vertex stored in the second region. Likewise, the sum of the basic scores contained in the partial parsing tree located at the node (10) or a lower place than the node (10) is considered as the partial general priority 5.0 before correction with the node (10) as a vertex stored in the second region of the storage area for the node (10).

Since the node (11) has its own one basic score, the sum of the basic scores of all the non-terminal symbols at the node (11) or a lower place than the node (11) (upper in FIG. 26) is 11.0. Further, since the syntax priority rule (y1) of Table 3 is applicable to the node (11), the priority magnification is 2.0 described in the right hand of the rule (y1). The value of 2.0 is stored in the first region of the storage area for the node (11).

Next, the total 11.0 of the basic scores of all the non-terminal symbols at the node (11) or a lower place than the node (11) (upper in FIG. 28) is multiplied by the priority magnification 2.0 for obtaining the partial general priority before correction with the node (11) as a vertex, 22.0. The value of 22.0 is stored in the second region of the storage area for the node (11).

In succession, the number of all the non-terminal symbols located at the node (11) or a lower place than the node (11) (upper in FIG. 26) is counted. At a time, the number of the non-terminal symbols located at the node (9) and a lower place than the node (9) (upper in FIG. 26) is stored in the third region of the storage area for the node (9). Hence, the number of the non-terminal symbols located at the node (9) or a lower place than the node (9) (upper in FIG. 26) is not required to be counted. The value of 5 is used as the number.

Likewise, it is not necessary to count the number of the non-terminal symbols located at the node (10) or a lower place than the node (10) (upper in FIG. 26). As the number, the value of 5 stored in the third region of the storage area for the node (10) is used. Hence, the number of the non-terminal symbols located at the node (11) or a lower place than the node (11) (upper in FIG. 26) is derived as 11. The value of 11 is stored in the third region of the storage area for the node (11).

Then, the numerical value stored in the second region for the node (11) is divided by the value stored in the third region for obtaining the partial general priority after correction with the node (11) as a vertex. The value of 2.0 is stored in the fourth region for the node (11).

In the interpretation 1 of FIG. 11a described as referring to FIGS. 24 and 25, no node to which the syntax priority rules of Table 3 may apply is provided. Hence, no place exists where the general priority after correction has any value except 1.0. In this respect, the interpretation 7 shown in FIG. 11g described as referring to FIGS. 26 and 27 has a distinguishably different result.

For the node (12) shown in FIG. 26, the similar operation is executed to derive the four numerical values including the priority magnification given by applying the syntax priority rule to the node, the partial priority before correction with the node as a vertex, the number of all the non-terminal symbols located at the node or a lower place than the node (upper in FIG. 28), and the partial general priority after correction with the node as a vertex. Those four numerical values are stored in the corresponding storage regions for the node in the buffer C, respectively.

As a result of executing the above operation, in the fourth region of the storage area for the node (12), the partial general priority after correction with the node (12) as a vertex, that is, the priority of the part corresponding to the partial clause 3 is derived as a value of 1.917. This value is distinguishably different from the value given in the interpretation 1 shown in FIG. 11a. Further, as shown in FIG. 27, in succession, for the nodes (13), (14), and (15), the similar operation is executed to derive the four numerical values. With these resulting values, the syntax priority of the overall original sentence 2 (when the partial clause 3 is interpreted as shown in FIG. 11g) is derived as 1.783, which is stored in the fourth region of the storage area for the node (15).

As described above, for the two interpretations, that is, the interpretation 1 of FIG. 11a and the interpretation 7 of FIG. 11g of some interpretations obtained from the original sentence 2, the syntax priorities (general priorities after correction of the overall sentence) are derived. The interpretation 1 has a value of 1.0, while the interpretation 7 has a value of 1.733. Hence, by comparing the interpretations with 7 in light of the value, the translation machine according to this embodiment operates to put the interpretation 7 on the priority rather than the interpretation 1.

In addition, as mentioned above, the syntax priority (general priority after correction of the overall original sentence 2) about any interpretation except the interpretations 1 and 7 is 1.0.

Figure 28:
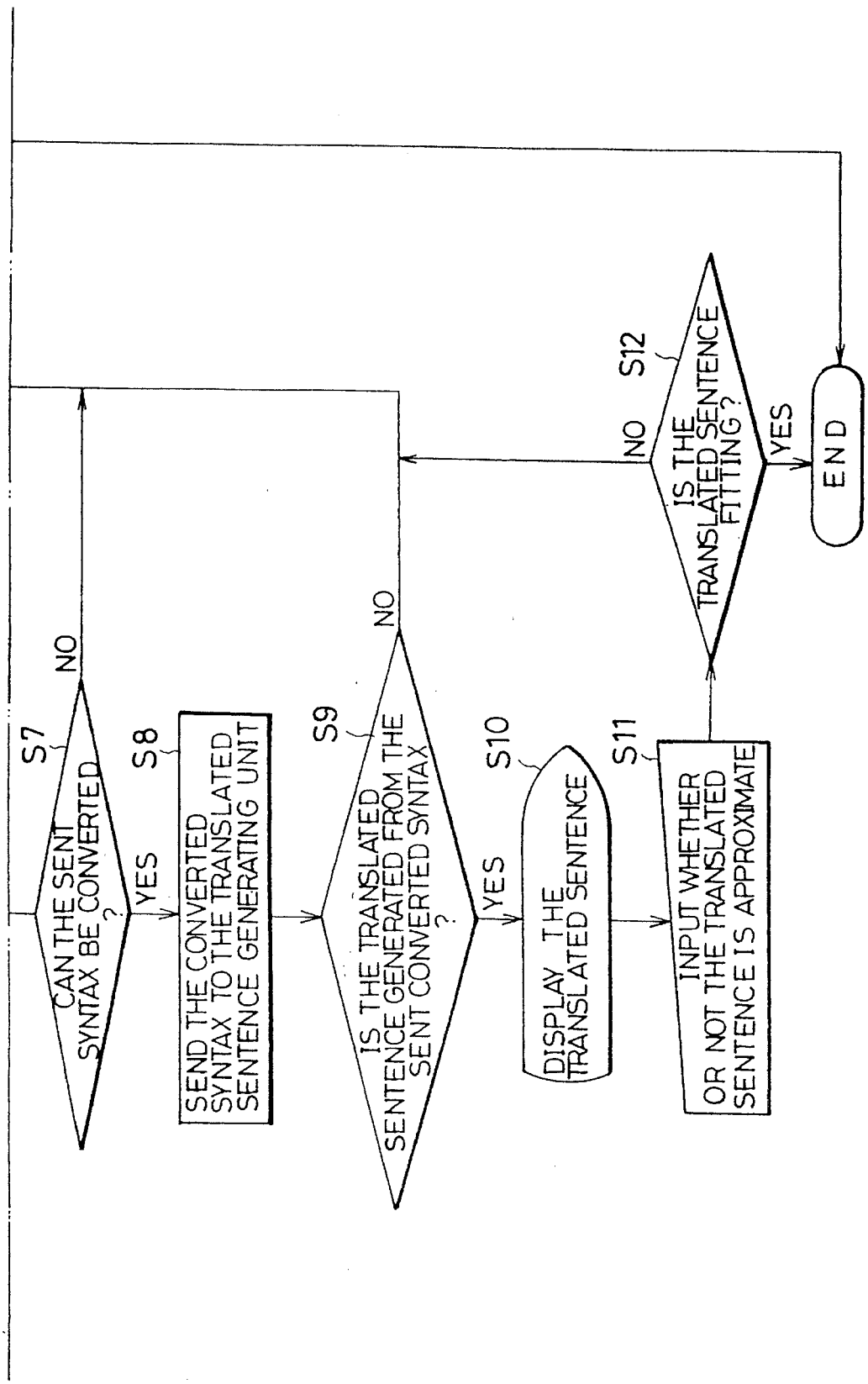
FIG. 28(i) & (ii) is a flowchart for describing a translating process implemented in the translation machine shown in FIG. 1.

Next, the description will be oriented to the operation of the translation machine using the priority interpretation shown in FIG. 1 as referring to the flowchart of FIG. 28.

Figure 3:
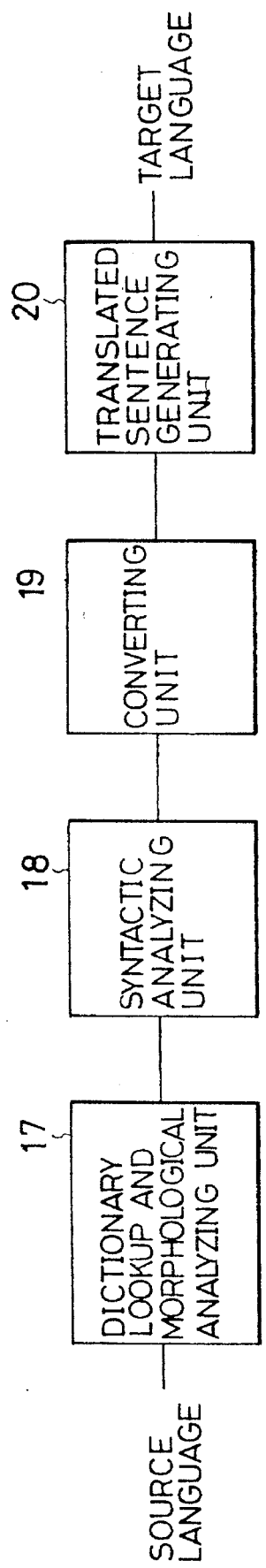
FIG. 3 is a functional diagram showing a translating module provided in the translation machine shown in FIG. 1.

As described above, this embodiment is arranged to implement the process from "morphological analysis" to "syntactic analysis" to "conversion" to "generating of a translated sentence" as shown in FIG. 3, for the purpose of obtaining a translated sentence from an original sentence. The present invention, however, is not limited to the translation machine having such an arrangement but may apply to all the translation machines only if it has the process of "syntax process. For example, the invention may apply to such a translation machine as having a process of "semantic analysis" after the "syntactic analysis".

At first, the inputted sentence "I bought films for the camera and tapes for the VTR." is stored in the buffer A (step S1). The morphological analysis is executed about the content of the buffer A. The processed result is stored in the buffer B (step S2). Then, the buffer C storing the syntax-analyzed result is cleared (step S3).

In succession, the syntactic analysis involving the priority interpretation is executed. From the content of the buffer B, all the possible parsing trees are built (step S4) and are stored in the buffer C (step S4). When new creation of a parsing tree from the content of the buffer B is made impossible, the operation goes from the step S4 to the step S5.

Next, two or more parsing trees stored in the buffer C rank in order, based on their general priorities after correction (step S5). Herein, of the eleven parsing trees as shown in FIGS. 11a to 11k, the interpretation 7 shown in FIG. 11g ranks first. Then, the parsing tree about the interpretation 7 shown in FIG. 11g is sent from the buffer C to the converting unit 19 (see FIG. 3) (step S6).

Next, it is determined whether or not the parsing tree of the interpretation 7 is converted in the converting unit 19 (step S7). If not, the operation goes to a step S13. At this step, it is determined whether or not the parsing trees are left in the buffer C without being sent to the converting unit 10. If it is, the operation returns to the step S6. If it is not, it means that the translation has failed.

If, at the step S7, it is determined that the converted result is obtained, the parsing tree (converted) of the interpretation 7 is sent to the translated sentence generating unit 20 (see FIG. 3) (step S8). Then, it is determined whether or not the parsing tree (converted) of the interpretation 7 gives the corresponding translated sentence in the translated sentence generating unit 20 (step S9).

If not at the step S9, the operation goes to a step S13 at which it is determined whether or not the parsing trees are left in the buffer C without being sent to the converting unit 19. If it is, the operation returns to the step S6. If it is not, it means that the translation has failed.

If, at the step S9, it is determined that the parsing tree (converted) of the interpretation 7 gives the corresponding translated sentence in the translated sentence generating unit 20, the translated result of the interpretation 7 appears on the display device (step S10).

The translated sentence of the original sentence 2 (based on the parsing tree of the interpretation 7) "I bought (films for the camera) and (tapes for the VTR). (translated sentence 4)" appearing on the display device is determined by a user to be approximate or not. The determined result is inputted from the keyboard (step S11). Based on the result, the translated sentence is determined (step S12). If it is approximate, the translation of the original sentence 2 is terminated.

If the user inputs that the translated sentence 9 is not approximate at the step S11, the operation goes from step S12 to the step S13. However, the translated sentence 9 of the original sentence 2 is considered to be approximate if the translation machine keeps the current translating level. In many cases, hence, it is considered that the user may input an indication that the translated sentence 9 is approximate.

The present invention, therefore, makes it possible to enhance the possibility that the first translated sentence about an original sentence given to the user is the most fitting.

In this embodiment, the translation machine uses such a user interface as outputting the possible translated sentences of one original sentence one by one according to the user's operation if two or more possible translated sentences may be generated from the original sentence. The present invention may apply to another type of translation machine. For example, the invention may apply to a translation machine using such a user interface as outputting all the possible translated sentences at a time. In this case, the application of the invention makes it possible to output all the possible translated sentences in sequence along higher syntax ranks. Those sentences on the screen are ranged along their ranks. If two or more translated sentences may be derived from one original sentence, the translation machine according to the invention is arranged to output only one translated sentence with the highest syntax rank.

The present invention may apply to such a translation machine as using a parallel parsing technique in the syntactic analyzing unit. The parallel parsing technique is a technique of building all the possible syntaxes from one inputted source language with one syntactic analyzing operation. After two or more syntactic analyzing solutions are obtained at a time, those solutions are fed to the process after the syntactic analysis one by one. The solutions are fed along the higher syntax ranks.

This operation is implemented in the translation machine according to another embodiment of the invention.

The translation machine according to the present invention is arranged to store information indicating an index about a fitting form of a syntax and build the syntax and derive a fitting value of the syntax by referring to the information. If two or more syntaxes are derived from one sentence, by comparing the fitting values derived about the syntaxes with each other, the priority of each syntax and the priority rank among the competing syntaxes are defined.

In a case that two or more syntaxes are built from one original sentence one by one or at a time, any one of the syntaxes may be determined to be approximate or not independently of the content of the sentence. That is, if the competition takes place among the possible syntaxes, some syntaxes having certain forms may be experientially determined only from the purely grammatical information without using the other information (like meaning information).

The translation machine according to the present invention, therefore, operates to obtain the two or more possible syntax solutions as a result of analyzing the syntax of the original sentence one by one or at one time and ranking these syntax solutions according to the fitness derived from the form of each syntax. If the translation machine uses such a user interface type, the machine may easily output the best of the two or more translated sentences to be theoretically generated by the translation machine. If the translation machine uses such a user interface type as outputting two or more translated sentences for one original sentence, the machine may easily output a better translated sentence at an earlier stage.

In turn, the description will be oriented to a translation machine according to a second embodiment of the present invention.

The translation machine according to the second embodiment has the substantially same arrangement as the foregoing translation machine according to the first embodiment. Hence, about the arrangement, see the description about the arrangement of the foregoing translation machine. Later, the translating process executed in the translation machine according to the second embodiment will be described. In the description, the components of the translation machine have the same numbers as those of the first embodiment, which are used therefor. The specific terms such as an terminal symbol, a non-terminal symbol, and a syntax priority used in the second embodiment have the same definitions as those used in the first embodiment. Further, the grammatical rules used in the second embodiment are the same as those used in the first embodiment. Concretely, see the Table 2 described above.

Now, consider that the inputted original sentence is "I bought films for the camera and tapes for the VTR" (the original sentence 2).

Figure 29:
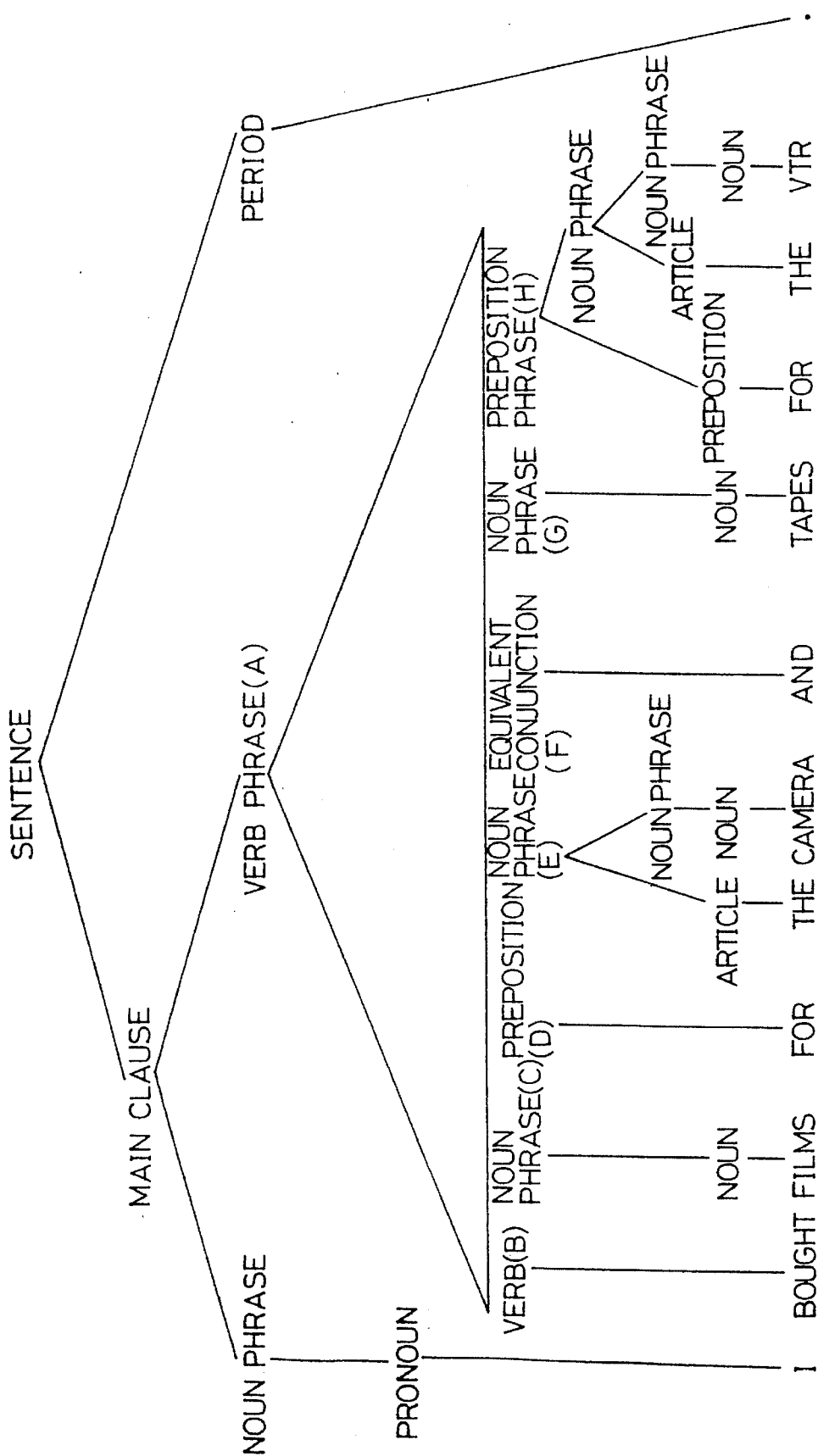
FIG. 29 is a view showing a parsing tree derived by a translation machine according to a second embodiment of the present invention.

The morphological analysis is executed for this original sentence and then the syntactic analysis is also executed according to the grammatical rules listed in the Table 2. The resulting parsing tree becomes that as shown in FIG. 29. In the original sentence 2, the clause of "bought films for the camera and tapes for the VTR" is not allowed to be defined in one way only based on the grammatical rules in the Table 2. The triangle shown in FIG. 29 indicates the clause to be analyzed into two or more ways. The actual parsing trees from that clause are shown in FIGS. 30 to 37. In addition, the parsing trees obtained from that clause and the grammatical rules listed in the Table 2 may have more forms rather than those shown in FIGS. 30 to 37. By considering that the nodes (A) to (H) of each of the partial analyzing trees shown in FIGS. 30 to 37 are connected to the nodes (A) to (H) of the parsing tree shown in FIG. 29, it is possible to obtain a complete parsing tree corresponding to the overall original sentence 2. The buffer C119 (see FIG. 39) enables to store all of these parsing trees at one time.

The translation machine according to this embodiment provides a syntax priority learning function of ranking the forms of the parsing trees based on the translated result selected by the user. When executing the syntactic analysis with the syntax priority interpretation, the syntax priority rules listed in the following Table 4 are used in addition to the grammatical rules listed in the Table 2.

TABLE 4

(y1) Verb Phrase (Verb + Noun Phrase (Noun Phrase + Preposition Phrase (Preposition + Noun Phrase (Noun Phrase + Equivalent Conjunction + Noun Phrase))) + Preposition Phrase): Verb Phrase (Verb + Noun Phrase (Noun Phrase (Noun Phrase + Preposition Phrase (Preposition + Noun Phrase)) + Equivalent Conjunction + Noun Phrase (Noun Phrase + Preposition Phrase)))
    -> 2
(y2)
    -> 1
(y3)
    -> 3

The syntax priority rule is a rule in which if the group of indexes under one non-terminal symbol (this is a non-terminal symbol A) included in the parsing tree meet an incidental condition, a certain priority value is given to the non-terminal symbol (non-terminal symbol A) located at the vertex of the index group.

The translation machine according to this embodiment operates to build two or more parsing trees when translating an original sentence and output the corresponding translated sentences to those trees. A user selects one of the translated sentences. The priority parsing tree is the tree on which the selected translated sentence is generated. At this time, the syntax priority rules are generated by the translation machine and are stored in the priority storage means provided in the translation machine. The actual syntax priority rule generated at this time is the structure of a different part between the priority parsing tree and the other parsing trees. The overall priority parsing tree is not included as a rule. That is, for the original sentence 2, any one of the partial parsing trees shown in FIGS. 30 to 37 is made to be a syntax priority rule.

Each syntax priority rule has a type indicated by (y1). In the rule (y1) of the Table 4, the part before the arrow, that is, Verb Phrase (Verb + Noun Phrase (Noun Phrase + Preposition Phrase (Preposition + Noun Phrase (Noun Phrase +

Equivalent Conjunction + Noun Phrase))) + Preposition Phrase): Verb Phrase (Verb + Noun Phrase (Noun Phrase (Noun Phrase + Preposition Phrase (Preposition + Noun Phrase)) + Equivalent Conjunction + Noun Phrase (Noun Phrase + Preposition Phrase)))

is the left hand of the rule. The part after the arrow, that is, 2 is the right hand of the rule.

Now, the meaning of the left hand of the syntax priority rule will be described. The left hand of the rule (y1) of the Table 4 is composed of two parts delimited by a symbol ":". Each part delimited by the symbol ":" represents a non-terminal symbol included in the parsing tree and a form of a partial analyzing tree made of some non-terminal or terminal symbols under the non-terminal symbol. The symbols such as parentheses "("and")" and a plus symbol "+" used in the rules function in the similar manner to those used in the first embodiment. Hence, for these symbols, refer to the description about the Table 3 and FIGS. 12 to 14.

Figure 30:
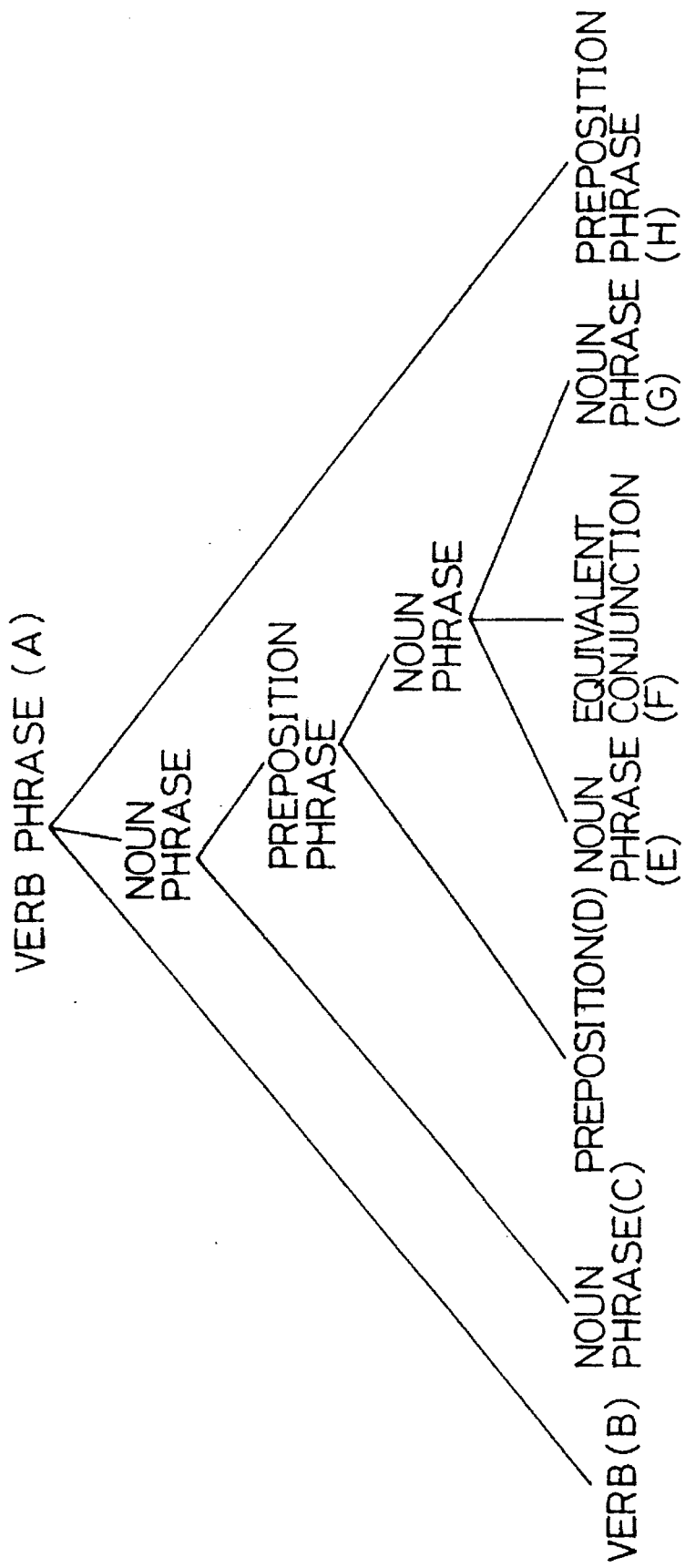
FIG. 30 is a view showing a transformation of the parsing tree shown in FIG. 29.
Figure 31:
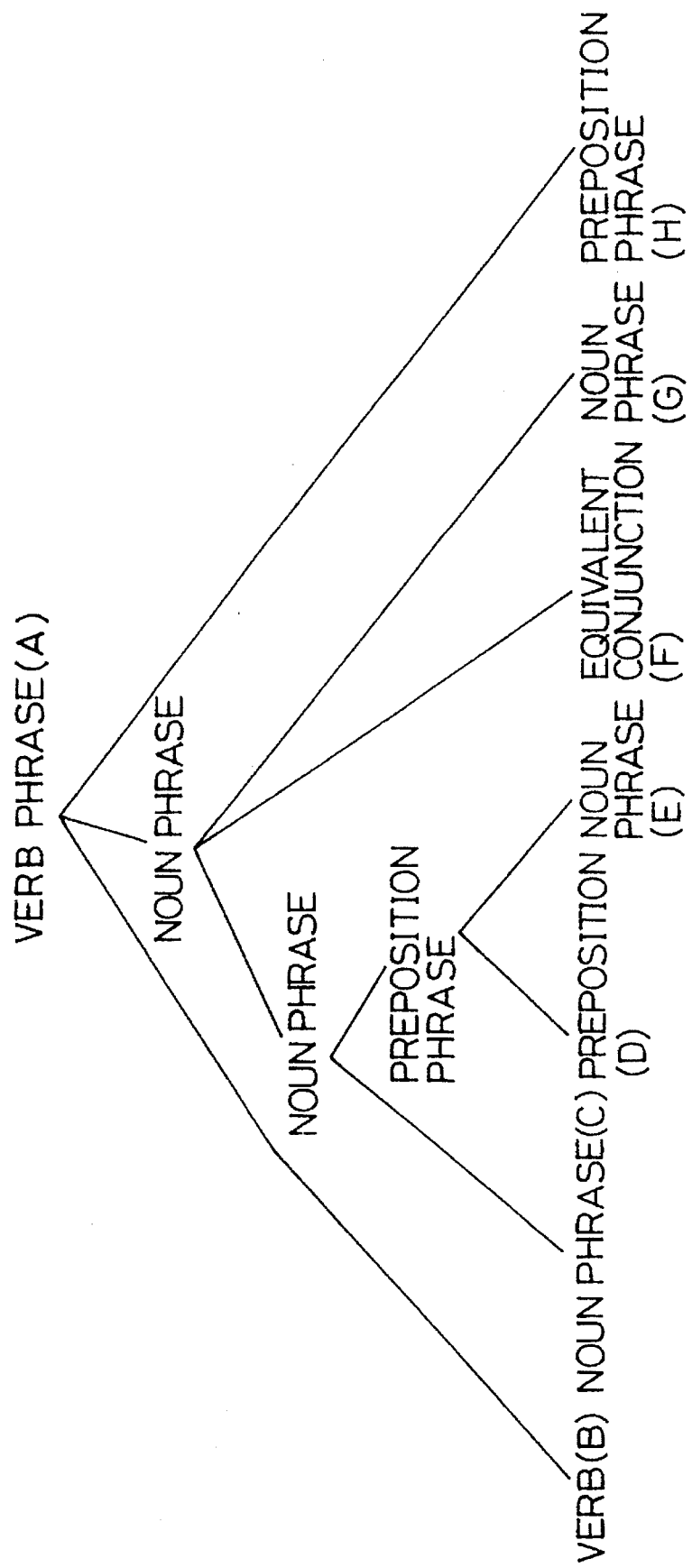
FIG. 31 is a view showing another transformation of the parsing tree shown in FIG. 29.
Figure 32:
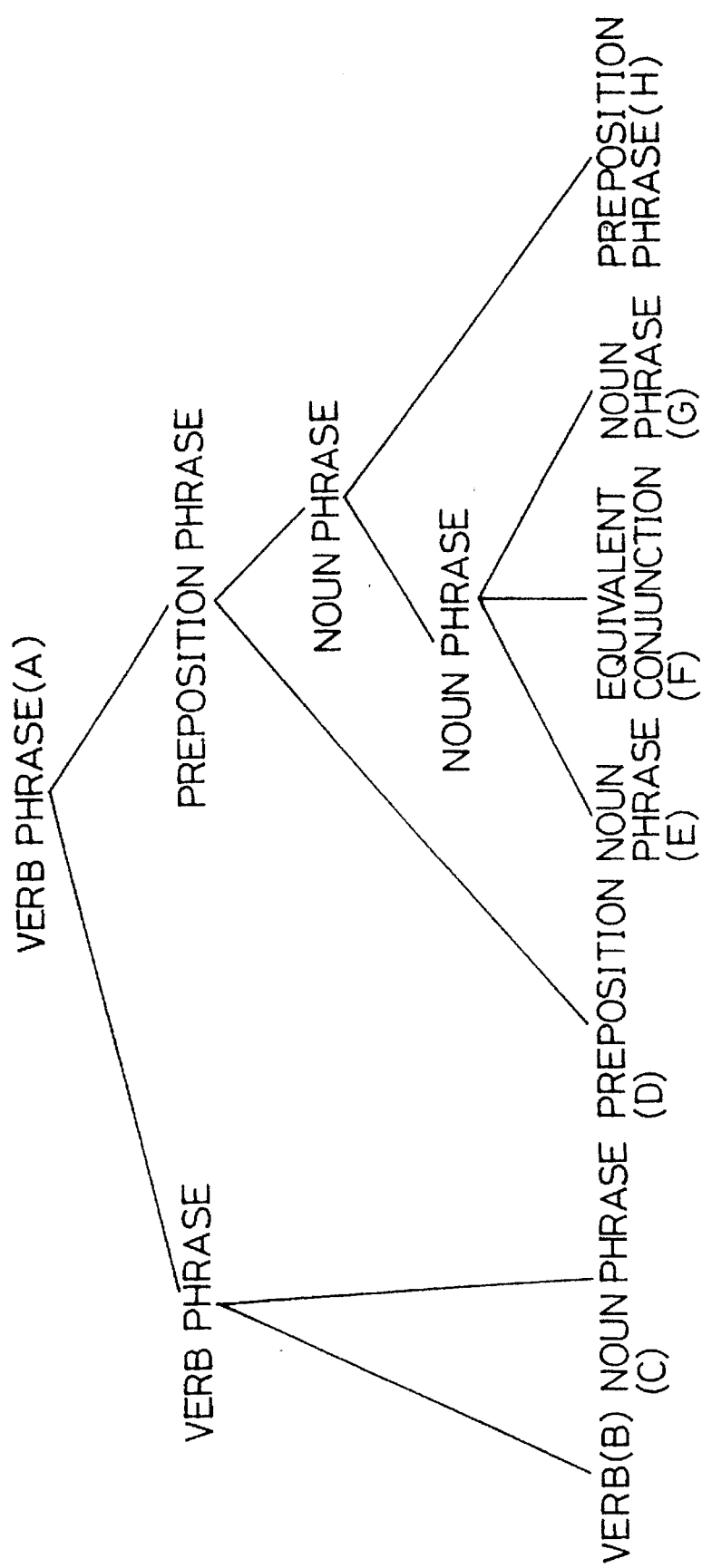
FIG. 32 is a view showing another transformation of the parsing tree shown in FIG. 29.
Figure 33:
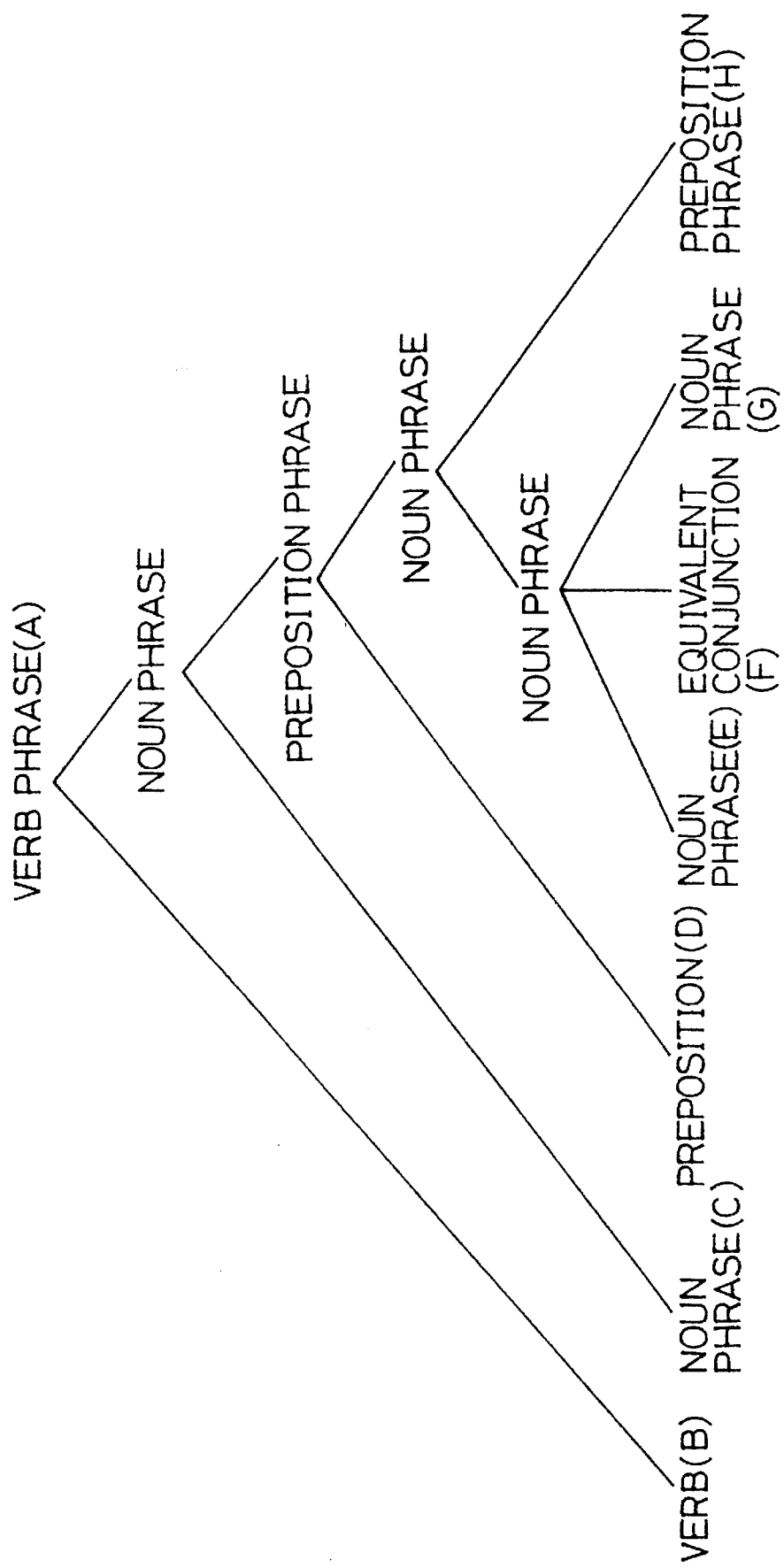
FIG. 33 is a view showing another transformation of the parsing tree shown in FIG. 29.
Figure 34:
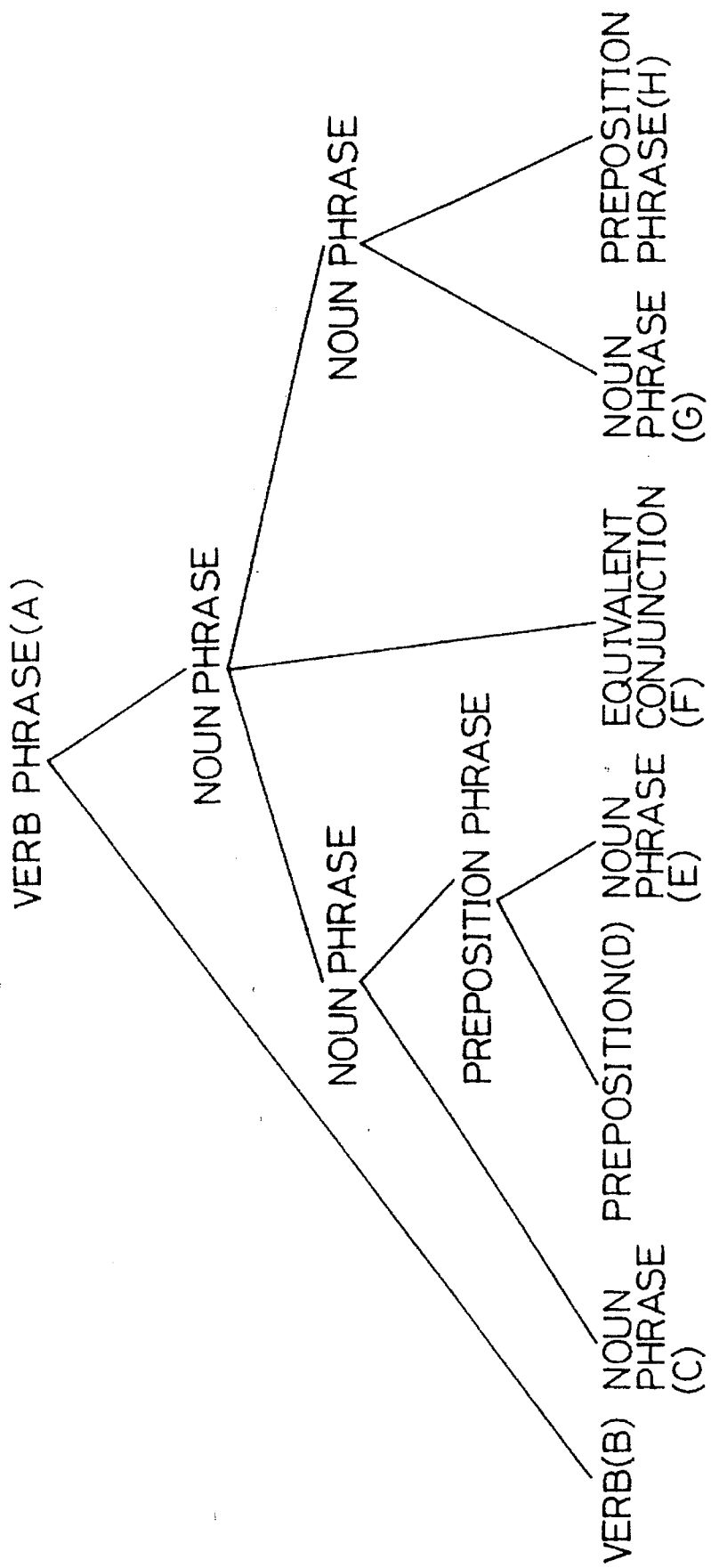
FIG. 34 is a view showing another transformation of the parsing tree shown in FIG. 29.

By referring to the meanings of the symbols, it will be understood that the first part delimited by ":" in the left hand of the rule (y1) of the Table 4, Verb Phrase (Verb + Noun Phrase (Noun Phrase + Preposition Phrase (Preposition + Noun Phrase (Noun Phrase + Equivalent Conjunction + Noun Phrase))) + Preposition Phrase), takes the form of the parsing tree as shown in FIG. 30. Further, the second part of the left hand of the rule (y1), Verb Phrase (Verb + Noun Phrase (Noun Phrase (Noun Phrase + Preposition Phrase (Preposition + Noun Phrase)) + Equivalent Conjunction + Noun Phrase (Noun Phrase + Preposition Phrase))), may take the form of the parsing tree as shown in FIG. 34.

The left hand of the rule (y1) of the Table 4 is composed of two parts delimited by the symbol ":". The number of the parts composing the left hand is not limited to two. In the left hand of the syntax priority rule, the partial parsing trees competing with each other may be located at the same part of the overall parsing tree of the sentence. And, the right hand of the syntax priority rule stands for which is the parsing tree with the highest rank of the partial parsing trees ranged in the left hand. Hence, the number of the parsing trees located in the heft hand of one rune is not limited. It may be one or more.

Then, the description will be oriented to the operation of the translation machine using the syntax priority learning function as referring to FIGS. 38a and 38b. In this embodiment, one translated sentence is allowed to be outputted for one original sentence. By the user's operation, another translated sentence may be outputted one by one.

Figure 39:
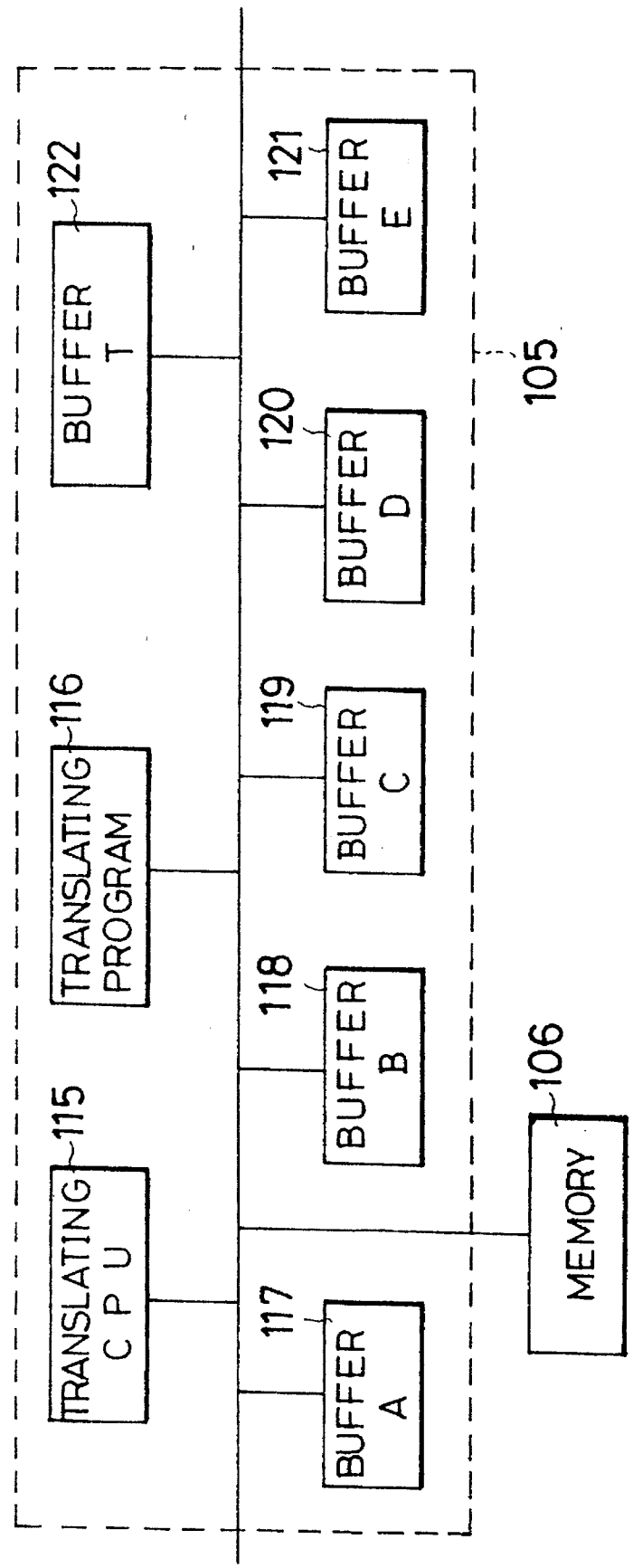
FIG. 39 is a block diagram showing a translating module included in the translation machine according to the second embodiment.

The operation flows in the arrangement of the translating module shown in FIG. 39.

At a step S1, the original sentence of "I bought films for the camera and tapes for the VTR." is stored in the buffer A117 (see FIG. 39). Next, at a step S2, the content of the buffer A117 is subject to the morphological analysis and the analyzed result is stored in the buffer B118. At a step S3, the buffer C119 for storing the syntax-analyzed result is cleared. At a next step S4, the buffer T122 of FIG. 39 is cleared. The buffer T is a temporary buffer required for implementing this embodiment.

Proceeding to a step S5, a point Pc is cleared. The pointer means is a variable to be set for pointing to a certain specific location on the memory or the buffer. Then, at the step S6, the variable F1 for the flag is set to zero (0).

At a step S7, the syntactic analysis is executed. The syntactic analysis makes it possible to build all the parsing trees from the content of the buffer B118 and is stored in the buffer C119. When these parsing trees are derived from the original sentence 2, the parsing trees composed by combining the tree shown in FIG. 29 with each of the trees shown in FIGS. 30 to 37 are stored in the buffer C119. If the new parsing tree is no longer generated from the content of the buffer B118, the operation goes from the step S7 to the step S8.

At the step S8, about each of the parsing trees stored in the buffer C119, if the flag variable Fc () accompanied with the parsing tree is zero (0), the memory 106 is retrieved for determining if the matching syntax priority rule exists in the memory 106 of FIG. 39.

In the description of this embodiment, the term "matching" between a parsing tree T1 and another syntax priority rule R1 means that the "priority" parsing tree indicated in the left hand of R1 (referred to as TR1) is the same as T1, T1 is larger than TR1 and the part of the TR1 has the same structure as the overall T1. However, it does not mean that the TR1 is larger than T1 and the part of T1 has the same structure as the overall TR1.

Further, the flag variable Fc () means an area for storing the data of the parsing tree itself and an area for holding state information about whether or not each of the parsing trees has been selected. That is, each area is referred to as the flag variable Fc () accompanied with the parsing tree. Fc () may take three values of 0, 1, 2 depending on the state. Hereafter, the flag variable Fc () accompanied with one of the parsing trees, T1, stored in the buffer C119, is referred to as Fc (T1).

At the step S3, when the buffer C119 is cleared, all the flags Fc () are made zero. Hence, when the operation reaches the step s8 for the first time until the original sentence is inputted, the flags Fc () about all the parsing trees existing in the buffer C119 are made zero.

Hence, at the step s8, matching of all the parsing trees existing in the buffer C119 to the syntax priority rules is executed.

Figure 40:
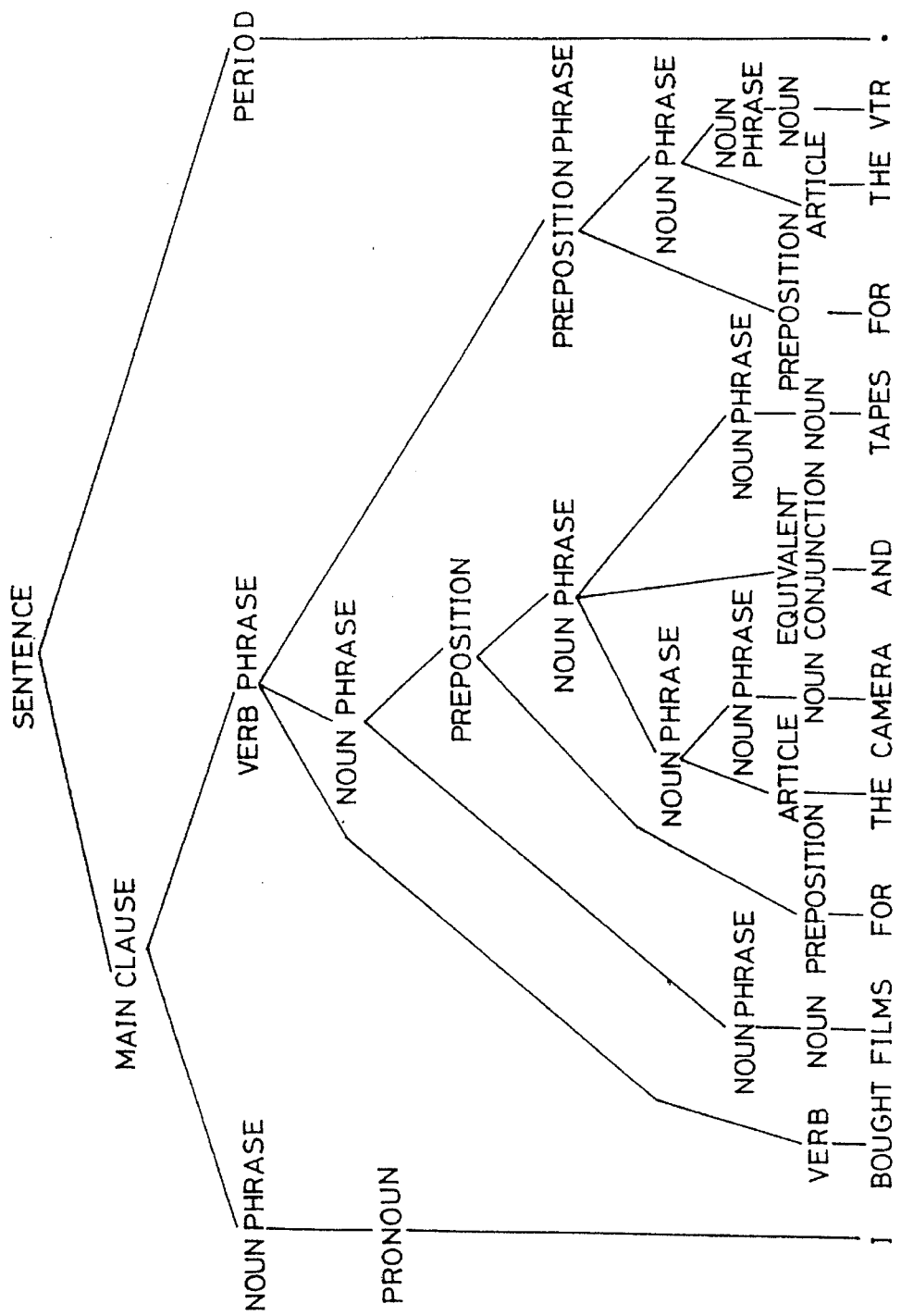
FIG. 40 is a view showing an overall parsing tree derived by the translation machine according to the second embodiment.

Now, assume that the syntax priority rules matching to the parsing trees stored in the buffer C119 do not exist in the memory 106. Then, the operation goes from the step s8 to s10. At the step s10, one of the parsing trees stored in the buffer C is selected if it has a flag Fc () of zero and is pointed by the pointer Pc. Since the flags Fc () about all the parsing trees existing in the buffer C119 are made zero, all the parsing trees are to be selected. The method for selecting one of the trees is any other method except the syntax priority interpretation. Concretely, any one of the methods referred in the known technique or a combination of two or more methods may be considered. At this time, assume that the parsing tree formed as shown in FIG. 40 is selected. This is referred to as a parsing tree Ta.

At a step S10, the pointer Pc points to the parsing tree Ta. At a next step S11, the flag Fc (Ta) accompanied with the parsing tree Ta is set as 1. If the flag Fc () is 1 or more, it means that the parsing tree corresponding to this flag Fc () is sent to the converting unit or later in the processing flow.

Then, at a step s12, the parsing tree Ta is sent to the converting unit 19 (see FIG. 3). The term "send" used in the description of this embodiment is used for the information. Hence, the information does not disappear after it is sent from the buffer or the like. For example, in this case, the parsing tree Ta existing in the buffer C119 is sent to the converting unit. In actual, after being sent, the parsing tree Ta is kept stored in the buffer C119 until the buffer is cleared.

The parsing tree Ta is converted in the converting unit 19 (see FIG. 3). The term "convert" used in the description of this embodiment is used for the information. In actual, hence, after being converted, the information before conversion is left as a principle.

Proceeding to a step S13, it is determined if the parsing tree Ta is converted into the proper tree in the converting unit 19, if no proper converting result is obtained, the operation goes from the steps sis to s24. At the step s24, it is determined whether or not the parsing trees stored in the buffer C119 have the accompanied flags Fc () set as 0. If any, the operation returns to the step s8. If no, it means that the translation has failed. In this case, at the step s12, the converted result of the parsing tree Ta is obtained in the converting unit. Hence, the operation goes from the step s13 to a step 14, at which the parsing tree Ta (after converted) is sent to the translated sentence generating unit 20 in FIG. 3.

At a step S15, it is determined if the generated result of the parsing tree Ta is obtained in the translated sentence generating unit 20. If no proper generated result is obtained, the operation goes from the steps s15 to s24. At the step s24, it is determined whether or not the parsing trees stored in the buffer C119 have the accompanied flags Fc () set as 0. If any, the operation returns to the step s8. If no, it means that the translation has failed. In this case, at the step s15, the generated result of the parsing tree Ta is obtained in the translated sentence generating unit 20. Hence, the operation goes from the step s15 to a step s16, at which the flag Fc (Ta) is set to 2. If the flag Fc () is set to 2, it means that the translation machine determines the parsing tree corresponding to this flag Fc () may be the basis of the grammatically generated sentence.

Then, at a step s17, the translated result of the parsing tree Ta is displayed on the display device 13 (see FIG. 1).

The user determines whether or not the translated sentence of the original sentence 2 based on the parsing tree Ta displayed on the display device 13 is proper. The translated sentence is interpreted as follows;

"I bought films (for the camera and tapes), for the VTR. (translated sentence 4)"

The determined result is inputted from the keyboard at the step s18 (see FIG. 38B). In this case, it is considered that the user determines this translated sentence is not proper.

At the step s18, the determined result is inputted from the keyboard 14 (see FIG. 1). Then, the operation goes from a step s19 to a step s20, at which a value of 1 is set to the flag F1. The flag F1 set as 1 means that though the translated counterpart of the original sentence being processed is outputted once, it is determined to be improper by the user and another candidate of the translated counterpart is required to be outputted.

The operation goes from the step s20 to a step s24. In this case, since the parsing tree with the flag Fc () being set as 0 is left in the buffer C119, the operation returns to the step s8.

Figure 35:
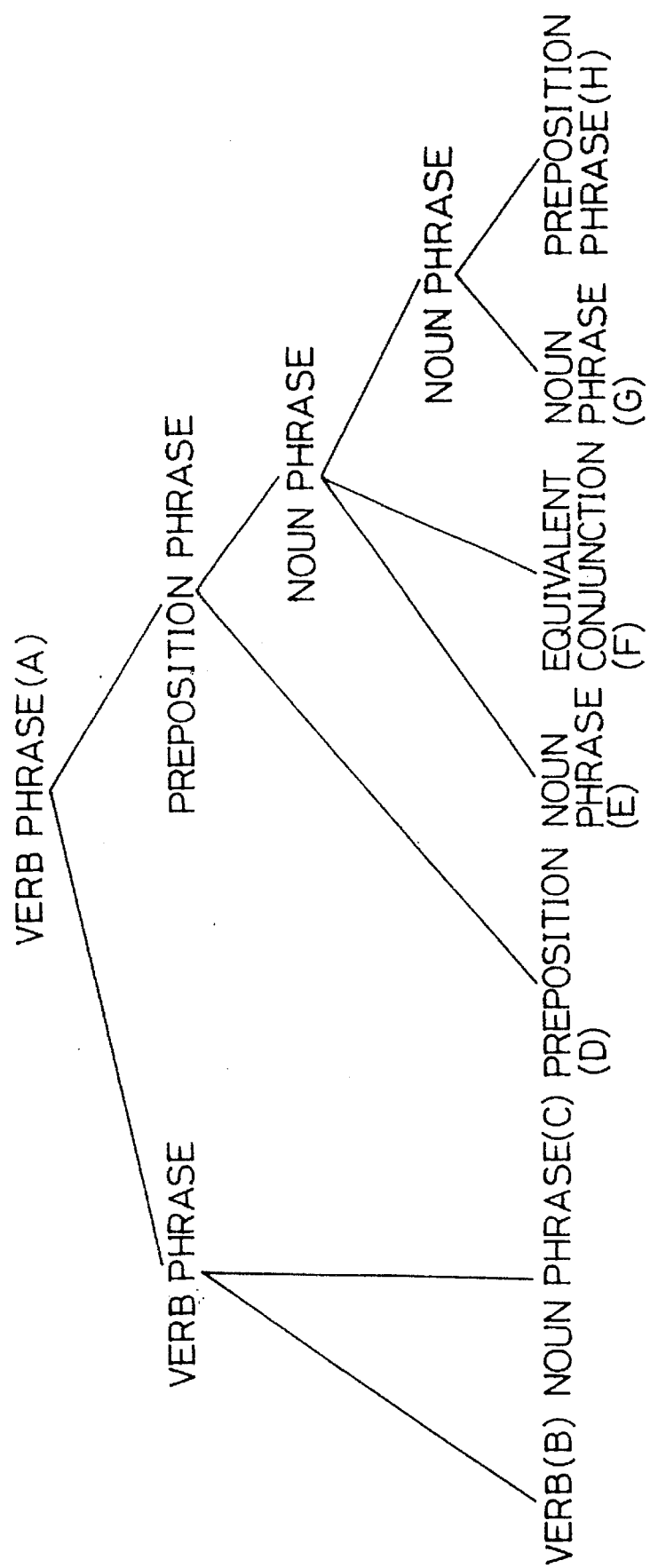
FIG. 35 is a view showing another transformation of the parsing tree shown in FIG. 29.
Figure 36:
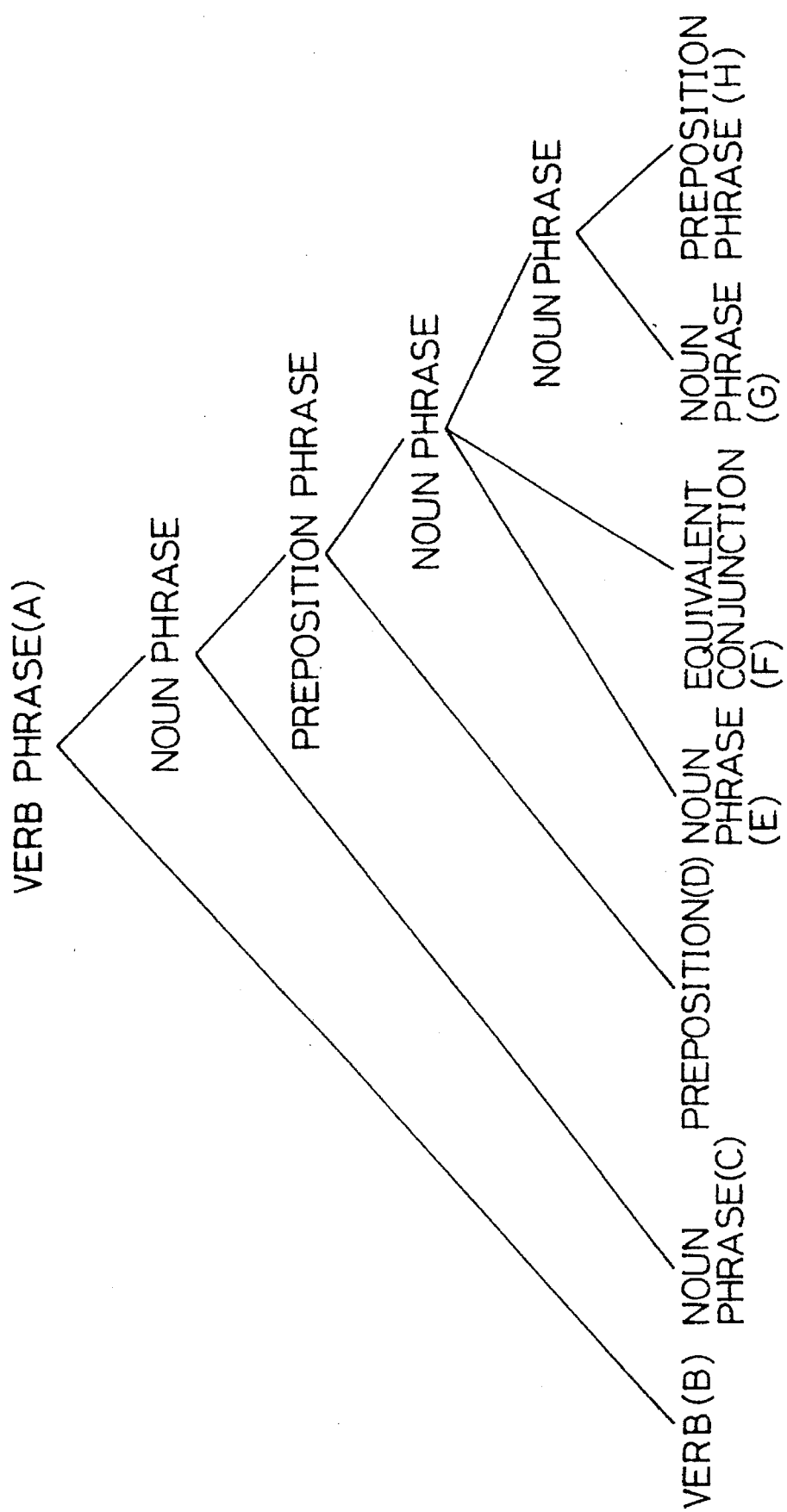
FIG. 36 is a view showing another transformation of the parsing tree shown in FIG. 29.
Figure 37:
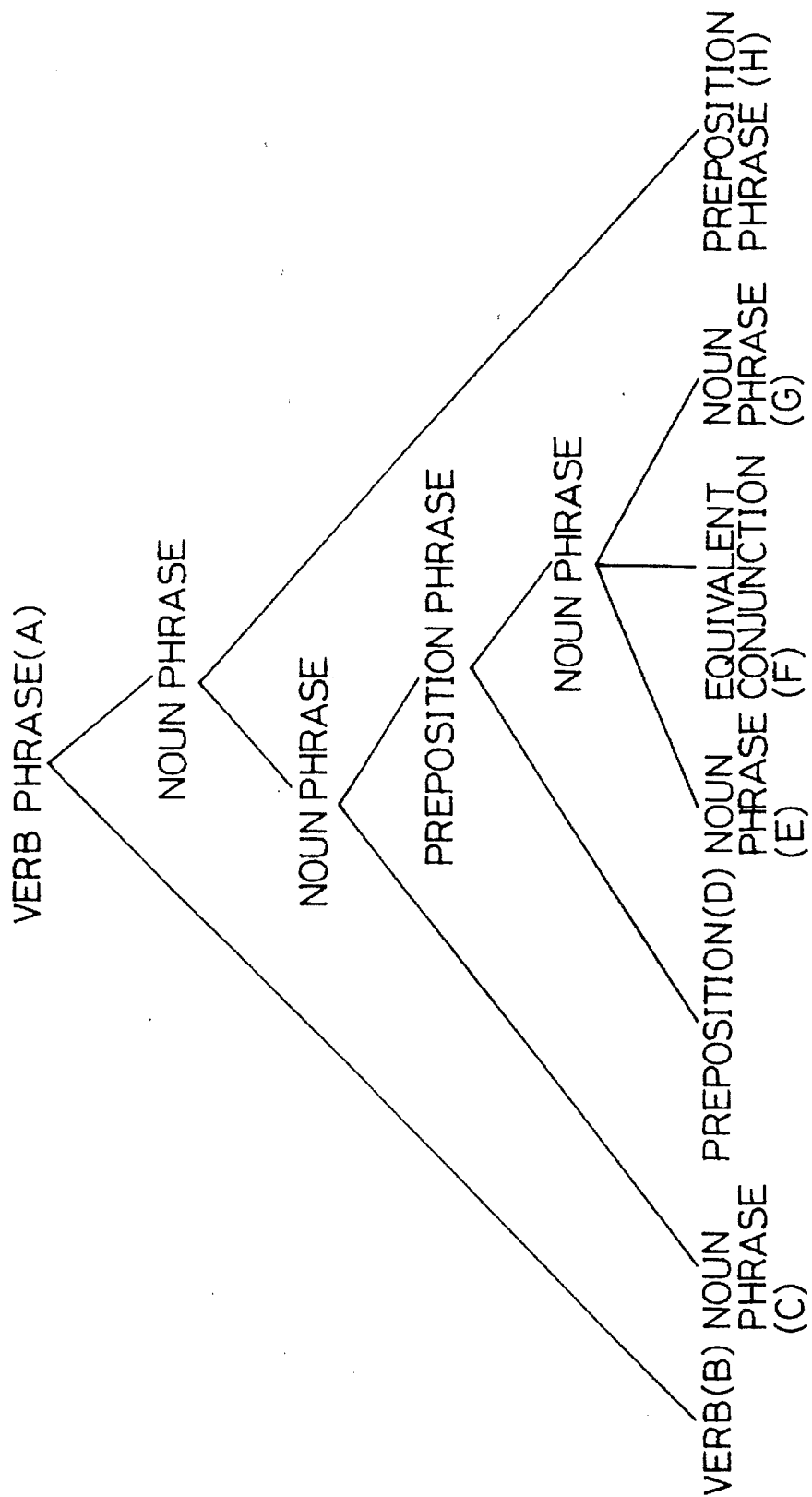
FIG. 37 is a view showing another transformation of the parsing tree shown in FIG. 29.

At the step s8, no syntax priority rule matching to the trees stored in the buffer C119 is provided. Hence, the parsing tree with the flag Fc () being set as 0, concretely, one of the parsing trees stored in the buffer C119 except the tree Ta, is selected by any method except the syntax priority interpretation. Now, assume that the selected tree takes the form as shown in FIG. 35. This tree will be referred to as a parsing tree Te.

As a result of the above operation, at the step s10, the pointer Pc points to the parsing tree Te.

Now, assume that the parsing tree Te is allowed to be converted into the target tree and to be generated into the translated counterpart on the target tree without any problem. Like the case of Ta described above, the operation goes from the steps s10 to s11 to s12 to s13 to s14 to s15 to s16 to s17. Then, the translated sentence on the parsing tree Te is displayed on the display device 13 shown in FIG. 1. This translated sentence is interpreted as follows;

"I bought (films for the camera) and (tapes for the VTR)."

The user determines that this interpretation is proper.

At the step s18, the determined result is inputted from the keyboard 14. Then, the operation goes from the step s19 to a step s21, at which the value of the flag F1 is determined. As described above, if the flag F1 has a value of 1, it means that the translated counterpart outputted from the translation machine is required to be retried by the user. Hence, to allow a proper translated counterpart to be outputted once when translating the sentence having the similar syntactic structure, the syntax priority learning is implemented for this case.

Next, the operation goes to the step s21 to s22, at which the parsing trees with the flag Fc () being set as 2 are compared with each other if they are stored in the buffer C119. In this case, the corresponding trees are Ta and Te. Hence, Ta and Te are compared. The different part is sent to the temporarily buffer T122 shown in FIG. 35. The common part to Ta and Te means the portion explicitly shown in FIG. 29. The different part for Ta is the partial parsing tree shown in FIG. 30 and the different part for Te is the partial parsing tree shown in FIG. 34.

At the next step s28, the syntax priority rule is generated. In this case, the partial parsing trees shown in FIGS. 30 and 34 are competing in the buffer T122 (see FIG. 39) and the parsing tree pointed by the pointer Pc in the buffer C119 is Te on which the tree shown in FIG. 34 is generated. The priority one of the parsing trees shown in the buffer T122 is as shown in FIG. 34. The resulting rule is (y21) listed in Table 4.

This rule is stored in the memory 106 shown in FIG. 39. Then, the translation of the original sentence "I bought films For the camera and tapes for the VTR" is terminated.

Next, the description will be oriented to the translation operation based on the syntax priority learned as mentioned above with reference to FIGS. 33, 38A and 38B and 39. At this time, it is assumed that the memory 106 (see FIG. 39) stores the syntax priority rule ((y1) in Table 4).

At the step s1, the inputted sentence of "She wears a necklace of gold and earrings of silver." is stored in the buffer A117. Then, at the step s2, the content of the buffer A117 is subject to the morphological analysis and the result is stored in the buffer B118. Next, at the step s8, the buffer C119 storing the syntax-analyzed result is cleared. At the next step s4, the buffer T122 is cleared. At the next step s5, the pointer Pc is cleared. Then, at the step s6, the variable F1 for the flag is set as 0.

Figure 42:
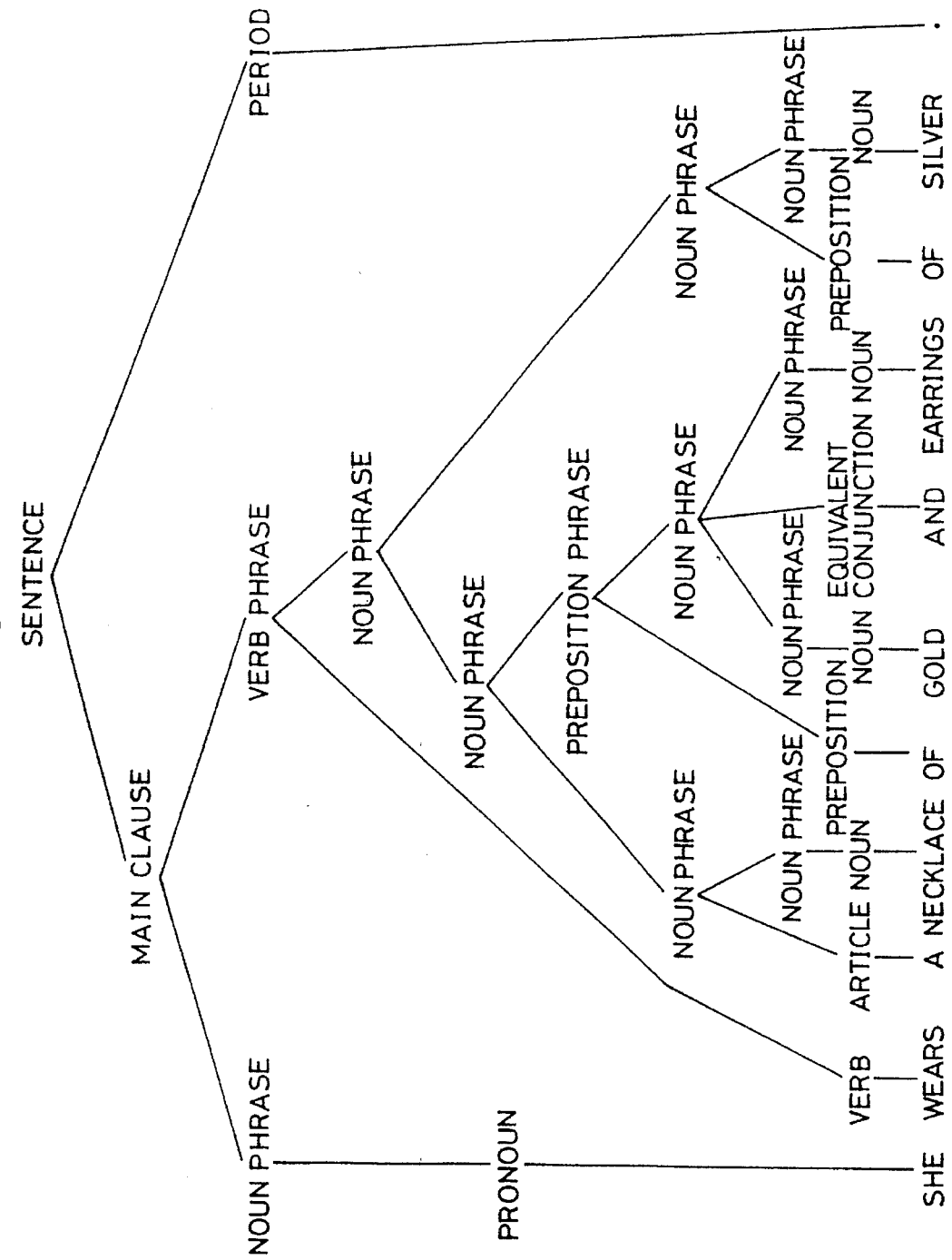
FIG. 42 is a view showing another overall parsing tree derived by the translation machine according to the second embodiment.
Figure 43:
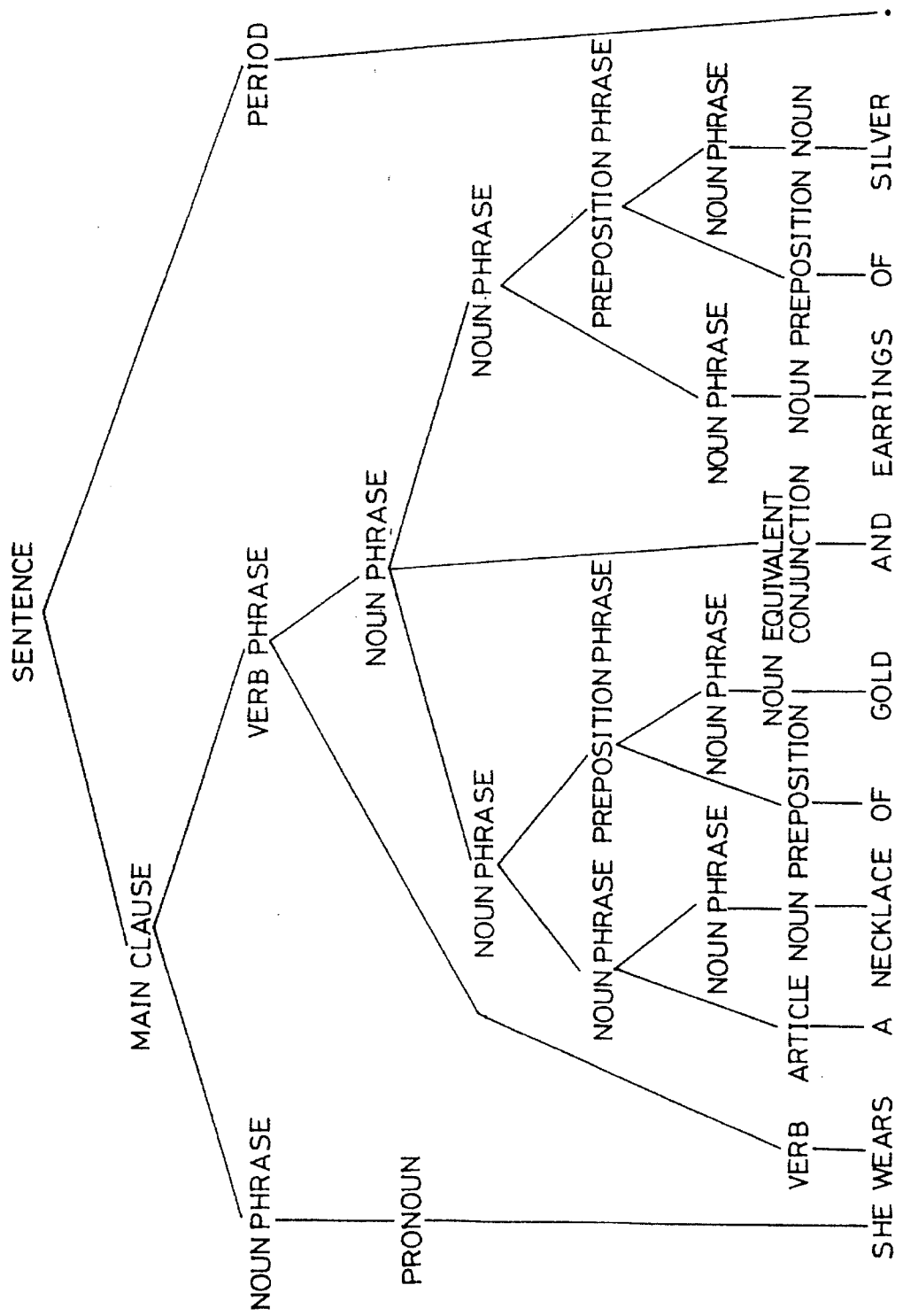
FIG. 43 is a view showing another overall parsing tree derived by the translation machine according to the second embodiment.

At the step s7, the syntactic analysis is executed. As a result, all the possible parsing trees are built from the content of the buffer B118 and is stored in the buffer C119. In this case, the parsing trees as shown in FIG. 42 and 43 are derived from the inputted sentence. The tree shown in FIG. 42 is referred to as Tx and the tree shown in FIG. 43 is referred to as Ty.

Next, when the operation reaches the step s8, since all the parsing trees stored in the buffer C119 have their flags Pc () with a value of 0 being set thereto, the operation is executed to execute the matching of all the possible parsing trees stored in the buffer C119 to the syntax priority rules. In this case, since the syntax priority rule ((y1) in Table 4) is stored in the memory 106, this rule matches to the parsing tree Ty. That is, it will be clearly understood from the comparison between FIGS. 43 and 34 that the parsing tree Ty includes the partial parsing tree formed as shown in FIG. 34 and this partial parsing tree should rank first according to the syntax priority rule indicated by (y1) in Table 4.

Since the matching is achieved, the operation goes from the step s8 to s9, at which the pointer Pc points to the parsing tree Ty. When, therefore, the parsing trees Tx and Ty are competing, the parsing tree Ty ranks first according to the syntax priority rule.

Proceeding to the step s11, the flag Fc (Ty) accompanied with the parsing tree Ty is set as 1.

Now, assume that the parsing tree Ty is allowed to be converted into a proper target tree and to be generated into the translated counterpart on the target tree without any problem. Like the case of Te, the operation goes from the step s11 to s12 to s13 to s14 to s15 to s16 to s17. As a result, the translated counterpart based on the parsing tree Ty is displayed on the display device 13 (see FIG. 1). The translated counterpart is interpreted as;

"She wears (a necklace of gold) and (earrings of silver)."

It is assumed that the user determines this interpretation is proper.

At the step s18, the determined result is inputted from the keyboard 14 (see FIG. 1). Hence, the operation goes from the step s18 to s21, at which the value of the flag F1 is determined. Since the F1 being set as 0 at the step s6 is kept changed, the translation is terminated. This interpretation is defined for the original sentence.

As described above, the syntax priority information is learned on the translated sentence selected by the user when two or more syntaxes are competing about the previous original sentence of "I bought films for the camera and tapes for the VTR". Based on the learned information, the next original sentence of "She wears a necklace of gold and earrings of silver" is properly translated into the target language and then is outputted for the first time, because both of the original sentences have the similar forms. If the syntax priority is not learned, when translating the next original sentence, the parsing tree Tx shown in FIG. 42 may be selected earlier than the parsing tree Ty shown in FIG. 43. By this selection, the translated sentence outputted for the first time is based on the interpretation of:

"I wears a necklace of (gold and earrings) of silver."
This will be determined to be improper by the user.

In the actual translating operation, "Learning a syntax priority" and "translation based on the learned rule" may take place at a time. The operation to be done at this time will be easily presumed from the above description. Hence, the operation is not described herein.

Like the first embodiment, this embodiment concerns with the translation machine which needs to execute the process from "morphological analysis" to "syntactic analysis" to "conversion" to "translated sentence generation" as shown in FIG. 3. The translation machine to which the present invention may apply is not limited to that needing to do the process. The present invention may apply to any translation machine containing the process of "syntactic analysis", which includes the translation machine arranged to do "semantic analysis" after the "syntactic analysis", for example.

The second embodiment may take the following transformations, any of which is essentially included in the scope of the present invention.

The foregoing description about the translation machine according to the second embodiment is expanded on such an arrangement as outputting two or more translated sentences from one original sentence one by one. In actuality, however, the present invention may apply to another kind of translation machine. For example, the invention may apply to the translation machine arranged to output all the translated sentences at one time, which are ranged on the display along their higher ranks.

According to the present invention, the syntax priority rules generated in learning have the following types.

(1) Only the priority partial parsing tree is indicated. For example, only the tree shown in FIG. 34 is indicated. This rule is shown in (y11) of Table 5.

TABLE 5

(y11) Verb Phrase (Verb + Noun Phrase (Noun Phrase (Noun Phrase + Preposition Phrase (Preposition + Noun Phrase)) + Equivalent Conjunction + Noun Phrase (Noun Phrase + Preposition Phrase)))
(y12)
Verb Phrase (Verb + Noun Phrase (Noun Phrase + Preposition Phrase (Preposition + Noun Phrase (Noun Phrase + Equivalent Conjunction + Noun Phrase))) + Preposition Phrase):
Verb Phrase (Verb + Noun Phrase (Noun Phrase (Noun Phrase + Preposition Phrase (Preposition + Noun Phrase)) + Equivalent Conjunction + Noun Phrase) + Preposition Phrase):
Verb Phrase (Verb Phrase (Verb + Noun Phrase) + Preposition Phrase (Preposition + Noun Phrase (Noun Phrase (Noun Phrase + Equivalent Conjunction + Noun Phrase) + Preposition Phrase))): Verb Phrase (Verb + Noun Phrase (Noun Phrase + Preposition Phrase (Preposition + Noun Phrase (Noun Phrase (Noun Phrase + Equivalent Conjunction + Noun Phrase) + Preposition Phrase)))): Verb Phrase (Verb + Noun Phrase (Noun Phrase (Noun Phrase + Preposition Phrase (Preposition + Noun Phrase)) + Equivalent Conjunction + Noun Phrase (Noun Phrase + Preposition Phrase))): Verb Phrase (Verb Phrase (Verb + Noun Phrase) + Preposition Phrase (Preposition + Noun Phrase (Noun Phrase + Equivalent Conjunction + Noun Phrase (Noun Phrase + Preposition Phrase)))): Verb Phrase (Verb + Noun Phrase (Noun Phrase + Preposition Phrase (Preposition + Noun Phrase (Noun Phrase + Equivalent Conjunction + Noun Phrase (Noun Phrase + Preposition Phrase)))))): Verb Phrase (Verb + Noun Phrase (Noun Phrase (Noun Phrase + Preposition Phrase (Preposition + Noun Phrase (Noun Phrase + Equivalent Conjunction + Noun Phrase))) + Preposition Phrase))
—>5

(2) The priority partial parsing tree and the partial parsing tree(s) explicitly rejected by the user are indicated. The priority tree is selectively indicated. For example, the trees shown in FIGS. 30 and 34 are indicated and the tree shown in FIG. 34 is selectively indicated. Such a rule is listed in (y1) of Table 4.

(3) All the different partial syntax trees competing in the buffer C119 are indicated. The priority tree is selectively indicated. For example, all the trees shown in FIGS. 30 to 37 are indicated and the tree shown in FIG. 34 is selectively indicated. Such a rule is listed in (y12) of Table 5.

Further, the syntax priority rules may be interpreted as follows.

(1) When the competition of the syntaxes takes place, if the parsing tree matches to the partial parsing tree recognized as "ranking first" in the rule, all the trees except it competing in the buffer C119 are equally treated as "not ranking first".

If the generated syntax priority rule may take the types (2) and (3), the description about the parsing trees except the ranking-first tree is meaningless. The types (2) and (3) taken as a rule are redundant.

(2) When the competition of the syntaxes takes place, the priority parsing tree is the tree matching to the partial parsing tree determined to rank first according to the rule. About the parsing trees competing in the buffer C119 except the priority tree, the parsing tree not described in the rule is determined to rank second. The tree ranking last is a parsing tree matching to the partial parsing trees except the partial parsing tree "ranking first" according to the rule (which are explicitly rejected by the user as described in the type (2) of the syntax priority rule).

In addition, this method is meaningful if the generated syntax priority rules are (2) and (3).

The method described in the embodiment of the invention uses the type (2) of the syntax priority rule and the interpretation of the syntax priority rule uses the type (1). As mentioned above, the rules are redundant and the learning is partially wasteful. However, such a type selection is advantageous in that it is not required to change the type of the syntax priority rule and the learning method if the interpretation of the syntax priority rule is changed into the type (2).

According to the aforementioned method, the syntax priority rule is determined on the binary result of "to rank first or not". However, if the syntax priority rule may the interpretation of the type (2), the ternary result is made possible.

Further, it is possible to define a numerical value of the priority strength for indicating "a rank stage" in addition to "to rank first or not" and to define the rank stage of the parsing trees according to the syntax priority rules. This results in making it possible to do the high-level interpretation, that is, determine which of the parsing trees to rank first if the priority syntaxes are competing in the buffer.

Such syntax priority rules are listed in Table 6.

TABLE 6

(y21) Noun Phrase (Noun Phrase (Noun Phrase + Preposition Phrase (Preposition + Noun Phrase)) + Equivalent Conjunction + Noun Phrase (Noun Phrase + Preposition Phrase))—> 2.0
(y22) Noun Phrase (Noun Phrase + Preposition Phrase (Preposition + Noun Phrase (Noun Phrase + Equivalent Conjunction + Noun Phrase (Noun Phrase + Preposition Phrase)))) —> 1.2
(y23) Noun Phrase (Noun Phrase + Preposition Phrase (Preposition + Noun Phrase (Noun Phrase (Noun Phrase + Equivalent Conjunction + Noun Phrase) + Preposition Phrase))) —> 0.5

In the syntax priority rules listed in the Table 6, the numerical value indicated in the right hand of __> is a magnification value. If it is larger than 1, the syntax takes precedence. As the value is made larger, more precedence is taken for the syntax. Further, as in the syntax priority rule indicated by (y23) of Table 6, if the numerical value is smaller than 1, the syntax does not take precedence. The precedence is lowered compared with no syntax priority rule.

To distinguish the syntax priority rules listed in the Table 4 from the rules listed in the Table 5, the magnification values are represented by adding a decimal point if they are integers as listed in (y21) of Table 6.

According to this embodiment of the invention, the syntax priority is learned when the user selects the translated sentence outputted from the translation machine for the second time or later without selecting the sentence outputted for the first time. This is because the user's change of the translated sentence output ted for the first time from the translation machine means the user's dissatisfaction to the syntax priority rules of the translation machine. Hence, the user inevitably has a larger desire for learning the syntax priority.

However, this invention is not limited to this embodiment. If the translated sentence outputted for the first time from the translation machine is selected by the user, the syntax on which the translated sentence is generated is allowed to be learned. Further, each time the user selects the translated sentence, the user may select whether or not the syntax priority about the sentence is to be learned.

Further, this embodiment has been described to generate all the syntax priority rules through the effect of learning when the user uses the translation machine. However, the translation machine according to the invention may prepare the ready-made syntax priority rules stored in the memory 106 shown in FIG. 39. If the syntax priority rules having their scores are prepared in the translation machine, these scores are allowed to be changed by the learning operation. Or, those ready-made syntax priority rules are completely ignored or changed to give a precedence to another parsing tree through the effect of learning.

The syntax priority rule listed in (y31) of Table 7 involves an incident condition "the fifth element is equal to the eleventh element in the surface layer" in the left hand.

TABLE 7

(y31) Noun Phrase (Noun Phrase (Noun Phrase + Preposition
Phrase (Preposition + Noun Phrase)) + Equivalent
Conjunction + Noun Phrase (Noun Phrase + Preposition
Phrase (Preposition + Noun Phrase)))
Incidental Condition: The fifth element is equal to the
eleventh element in the surface layer.
—> 1

In addition to the syntax priority rules taking only the forms of the parsing tree composed of the terminal symbol and the non-terminal symbol ranged in sequence, the information except them (surface layer, that is, word characters) is allowed to be included in the rules. This is also a transformation of the second embodiment.

In the incidental condition of the rule (y31) of the Table 7, the n-th element (n is a natural number) indicates an n-th end or non-terminal symbol sequentially counted from the left hand in the part except the "incidental condition" in the left hand of the rule, that is, the form of the parsing tree. Herein, a plus symbol and a parenthesis are ignored when counting the indexes. Hence, in the rule (y31), the fifth and the eleventh elements means the "preposition".

To obtain such a syntax priority rule through the effect of learning, at the learning time, it is considered that the translation machine prompts the user to select the syntax. For example, as indicated by the rule (y31) of Table 7, assume that the coincide between the surface layers of the words is included in the syntax priority rule. In such a condition as making it possible to learn it, that is, in such a condition as coinciding the surface layer (characters) located at the non-terminal symbol at an end of the partial parsing tree to be learned with the surface layer (characters) located at the non-terminal symbol at another end of the same partial analyzing tree, to learn the rule for putting priority on that partial parsing tree, the translation machine asks the user of whether or not the coincide between the surface layers is included in the rule and waits for a response from the user. If the user inputs the response indicating inclusion of the coincide between the surface layers in the rule, the rule as indicated in the rule (y31) of the Table 7 is generated. Otherwise, the rule to be generated does not include the condition about the surface layer as mentioned above.

The learning method described about the embodiment of the invention is arranged to recognize as the syntax priority rule to be learned the partial parsing tree of the different part except the common part to the parsing trees competing with each other. The method for defining the parsing tree to be built in the syntax priority rule is not limited to this method.

For example, the user specifies a certain portion in the original sentence. The translation machine operates to learn the partial parsing tree corresponding to the specific portion. Or, the syntactic analyzing tree itself is shown to the user in the form as shown in FIG. 40 or another form so that the user may specify the portion to be learned.

in turn, the description will be oriented to a translation machine according to a third embodiment of the present invention.

Like the first and the second embodiments, the third embodiment is also arranged to execute the process of "morpheme analysis" to "syntactic analysis" to "conversion" to "translated sentence generation" as shown in FIG. 3 about the first embodiment. Further, the concept of the arrangement is the basically same as that shown in FIG. 4.

In addition, the "semantic analysis" stage may be included after the "syntactic analysis".

Figure 44:
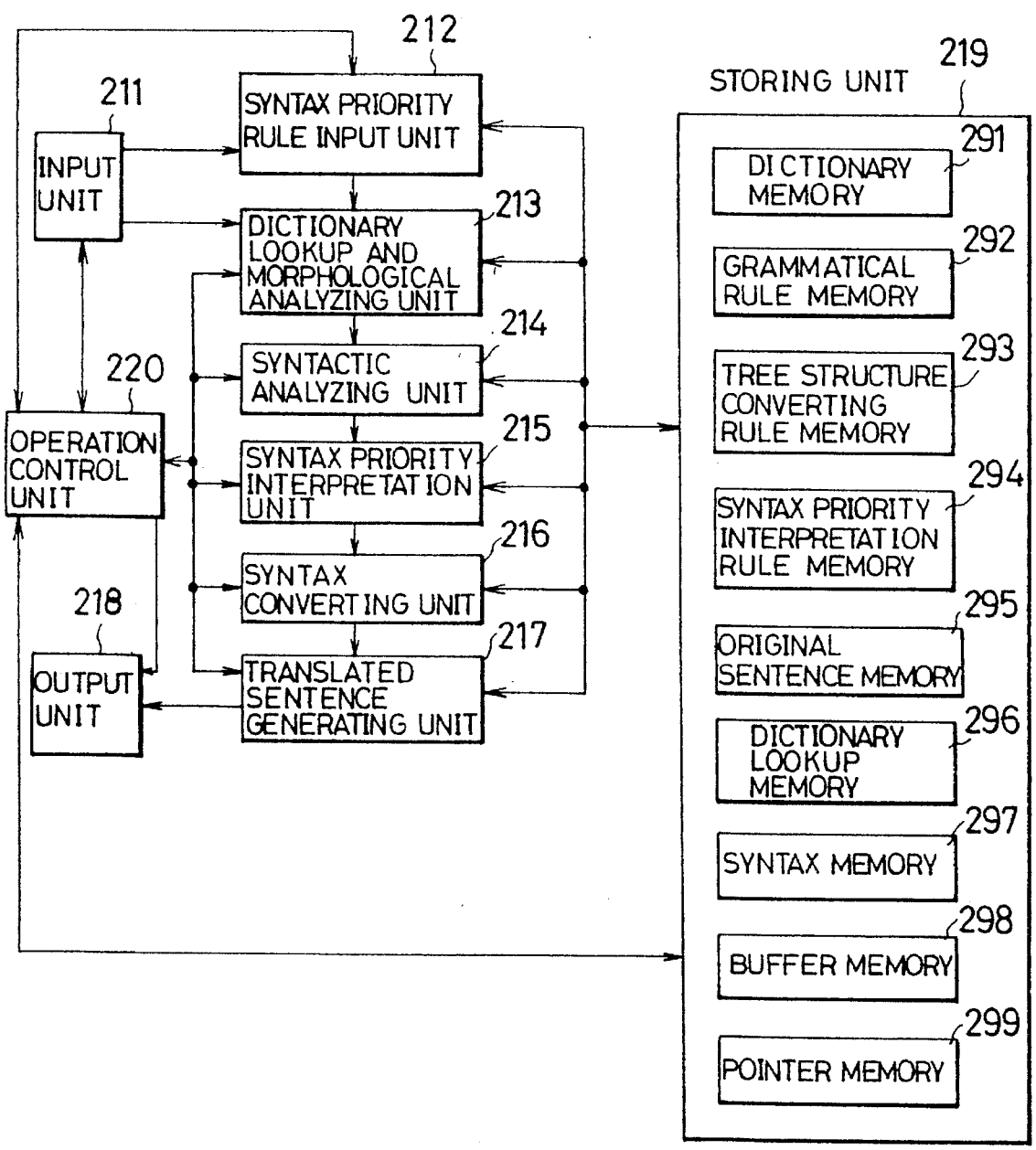
FIG. 44 is a block diagram showing a concrete arrangement of a translation machine according to a third embodiment of the present invention.

FIG. 44 is a block diagram showing the concrete arrangement of the translation machine according to the third embodiment. It includes the syntax priority interpretation on the assumption that the source language is English and the target language is Japanese, like the first and the second embodiments. The used example sentence is the same as the first and the second embodiments.

As shown in FIG. 44, the translation machine is arranged to have an input unit 211, a syntax priority rule input unit 212 connected to the input unit 211, a dictionary consulting and morphological analyzing unit 213 connected to the input unit 211 and the syntax priority rule input unit 212, a syntactic analyzing unit 214 connected to the dictionary consulting and morphological analyzing unit 213, a syntax priority interpretation unit 215 connected to the syntactic analyzing unit 214, a syntax converting unit 216 connected to the syntax priority interpretation unit 215, a translated sentence generating unit 217 connected to the syntax converting unit 216, an output unit 218 connected to the translated sentence generating unit 217, a storing unit 219 commonly connected to the syntax priority rule input unit 212, the dictionary consulting and morphological analyzing unit 213, the syntactic analyzing unit 214, the syntax priority interpretation unit 215, the syntax converting unit 216 and the translated sentence generating unit 217, and an operation control unit 220 commonly connected to all the above units.

The storing unit 219 is arranged to have a dictionary memory 291, a grammatical rule memory 292, a tree structure converting rule memory 293, a syntax priority interpretation rule memory 294, an original sentence memory 295, a dictionary consulting memory 296, a syntax memory 297, a buffer memory 298, and a pointer memory 299.

In a case that the fitness information about the syntax itself is utilized and two or more syntaxes are allowed to be built from one original sentence one by one or at one time, whether or not any of the syntaxes is fitting may be defined independently of the content of the sentence. The translation machine according to the third embodiment enables to execute this determination, output only one translated counterpart for one original sentence at one time and output another translated counterpart by the user's operation of the input unit.

In this embodiment, "fitness of the syntax itself" is referred to as "syntax priority" and selection of a fit syntax based on the syntax priority is referred to as "interpretation of syntax priority" or simply "priority interpretation". The syntax priority rule may be inputted to the translation machine at any time if it is operative whether or not the translation is done. To input the rule, the user defines the corresponding operation through the input unit. With this operation, the control operation unit 220 determines that the shift of the operating state to the state of inputting the syntax priority rule is indicated. Hence, the unit 220 operates to shift the state to the rule inputting state. When inputting the rule, the syntax priority rule input unit 212 is used. The syntax priority rule is stored in the syntax priority interpretation rule memory 294.

Next, the description will be oriented to the operation of the translation machine shown in FIG. 44 as referring to FIGS. 45a and 45b.

At first, like the first and the second embodiments, an original sentence of "I bought films for the camera and tapes for the VTR." is inputted through the input unit 211 and is stored in the original sentence memory 295 (step P1). The original sentence memory 295 corresponds to the buffer A shown in FIG. 4 included in the first embodiment. Next, the dictionary consulting and morphological analyzing unit 218 serves to perform the morphological analysis about the content of the original sentence memory 295 (buffer A in FIG. 4) by referring the dictionary memory 291. The analyzed result is stored in the dictionary consulting memory 296 (step P2). The dictionary consulting memory 296 corresponds to the buffer B shown in FIG. 4.

Then, the syntax memory 297 (buffer C in FIG. 4) storing the result of syntactic analysis is cleared (step P3). In succession, the pointer Pc is cleared (step P4). The pointer is a variable for indicating a specific location on the memory or buffer.

In addition, each of the memories located in the storing unit 219 shown in FIG. 44 is not separated into fixed groups. Those memories occupy their areas of the storing unit 219 depending on the input data state. Which area of the storing unit 219 corresponds to any of the memories is managed by the operation control unit 220 shown in FIG. 44.

Figure 46:
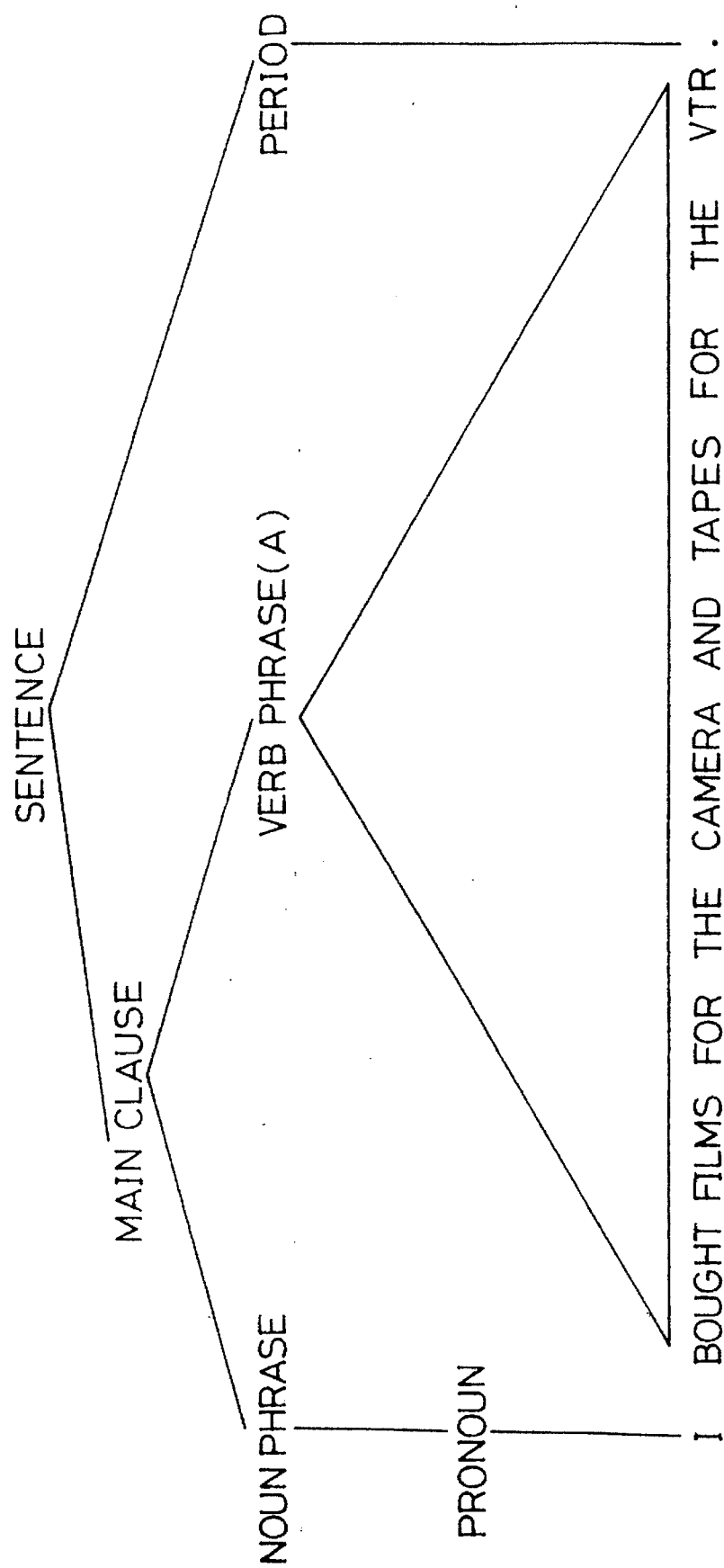
FIG. 46 is an explanatory view showing an example of a parsing tree used in the translation machine shown in FIG. 44.

The syntactic analyzing unit 214 serves to execute the syntactic analysis about the original sentence as referring to the grammatical rule memory 292. As a result, all the possible parsing trees are allowed to be built from the content of the dictionary consulting memory 296 (buffer B in FIG. 4) and then are stored in the syntax memory 297 (buffer C in FIG. 4) (step P5). When these parsing trees are derived from the original sentence 2, the parsing trees composed by combining the tree shown in FIG. 46 with each of the trees shown in FIGS. 49 to 55 are stored in the original sentence memory 295 (buffer A). When a new parsing tree is not further built from the content of the dictionary consulting memory 296 (buffer B in FIG. 4), the operation goes from the steps P5 to P6.

If the flag variable Fc is set as 0 about each of the parsing trees stored in the syntax memory 297 (buffer C in FIG. 4), the syntax priority interpretation unit 215 serves to retrieve the syntax priority interpretation rule memory 294 for whether or not the matching syntax priority rule exists in the syntax priority interpretation rule memory 294 (step P6).

In the description of this embodiment, the term "matching" between a parsing tree T1 and another syntax priority rule R1 means that the "priority" parsing tree indicated in the left hand of R1 (referred to as TR1) is the same as T1, T1 is larger than TR1 and the part of the TR1 has the same structure as the overall T1. However, it does not mean that the TR1 is larger than T1 and the part of T1 has the same structure as the overall TR1.

Further, the syntax memory 297 has an area for holding state information about whether or not each of the parsing trees has been selected, in addition to an area for storing the data of the parsing tree itself. That is, each area is referred to as the flag variable Fc () accompanied with the parsing tree. The flag variable Fc () may take two values of 0, 1 depending on the state. Hereafter, the flag variable Fc () accompanied with one of the parsing trees, T1, stored in the syntax memory 297 (buffer C in FIG. 4), is referred to as Fc (T1).

As described above, when, at the step P3, the syntax memory 297 is cleared, all the flags Fc are cleared as zero. When the operation reaches the step P6 after the original sentence is inputted, about all the parsing trees existing in the syntax memory 297 (buffer C in FIG. 4), their flags Fc are cleared as zero.

this case, the matching between all the parsing trees stored in the syntax memory 297 (buffer C in FIG. 4) and the syntax priority rules is carried out. The syntax priority rule listed in Table 8 is inputted by the user and is stored in the syntax priority interpretation rule memory 294.

TABLE 8

(y1) Noun Phrase (Noun Phrase (Noun Phrase + Preposition Phrase (Preposition + *)) + Equivalent Conjunction + Noun Phrase (Noun Phrase + Preposition Phrase (Preposition + *)))
Incidental Condition: The fifth element is equal to the eleventh element in light of the surface layer.
—> 1
(y2) Verb Phrase (Verb + Noun Phrase (Noun Phrase + Preposition Phrase (Preposition + Noun Phrase (Noun Phrase + Equivalent Conjunction + Noun Phrase))) + Preposition Phrase): Verb Phrase (Verb + Noun Phrase (Noun Phrase + Preposition Phrase (Preposition + Noun Phrase)) + Equivalent Conjunction + Noun Phrase (Noun Phrase + Preposition Phrase)))
—> 2

Figure 41:
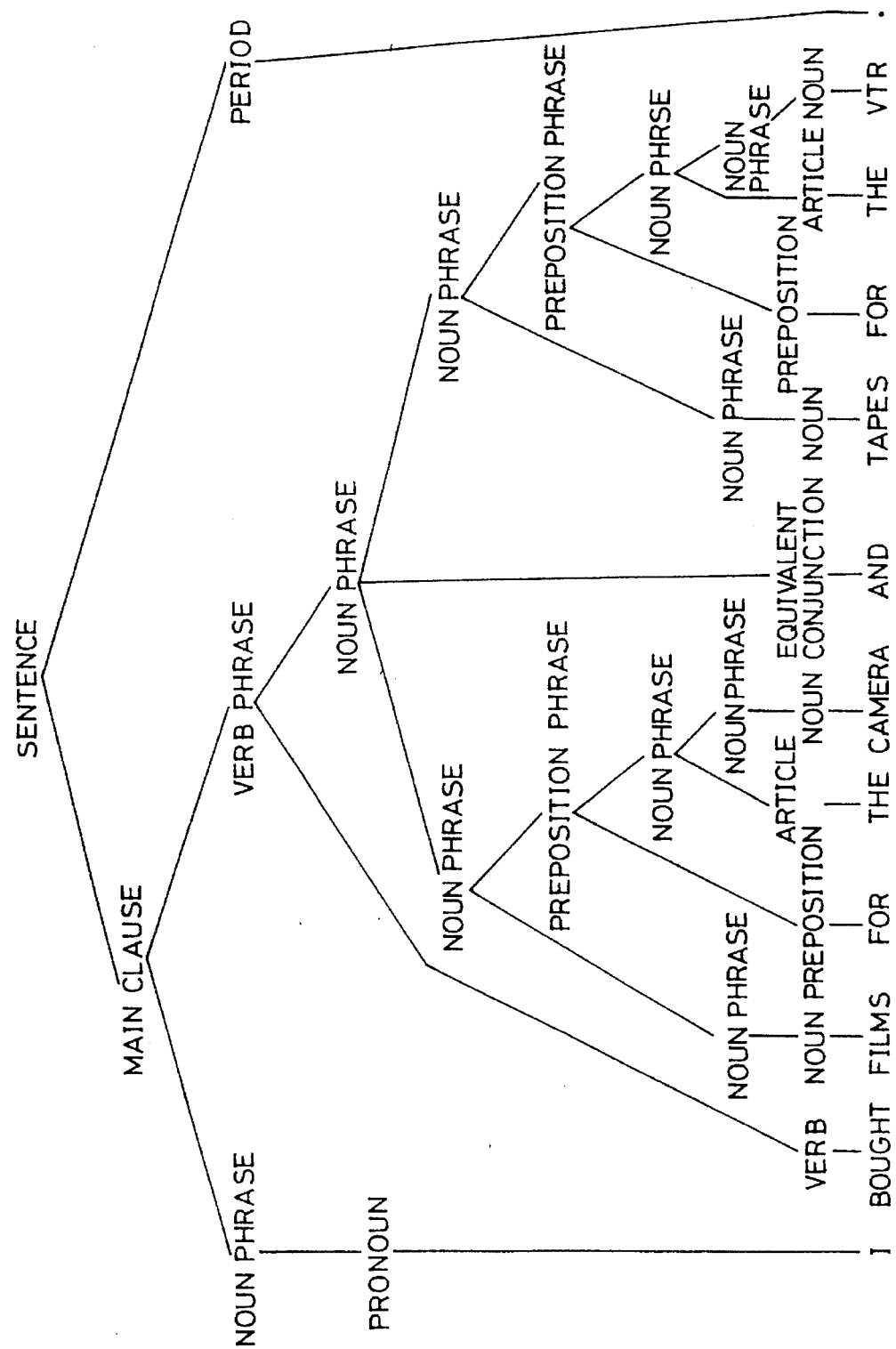
FIG. 41 is a view showing another overall parsing tree derived by the translation machine according to the second embodiment.

Of all the parsing trees stored in the syntax memory 297 (buffer C in FIG. 4), only the parsing tree as shown in FIG. 41 about the second embodiment matches to the rule (y1) listed in the Table 8. This parsing tree is obtained by synthesizing the partial parsing trees shown in FIGS. 46 and 47 and will be referred to as the parsing tree Te.

Figure 47:
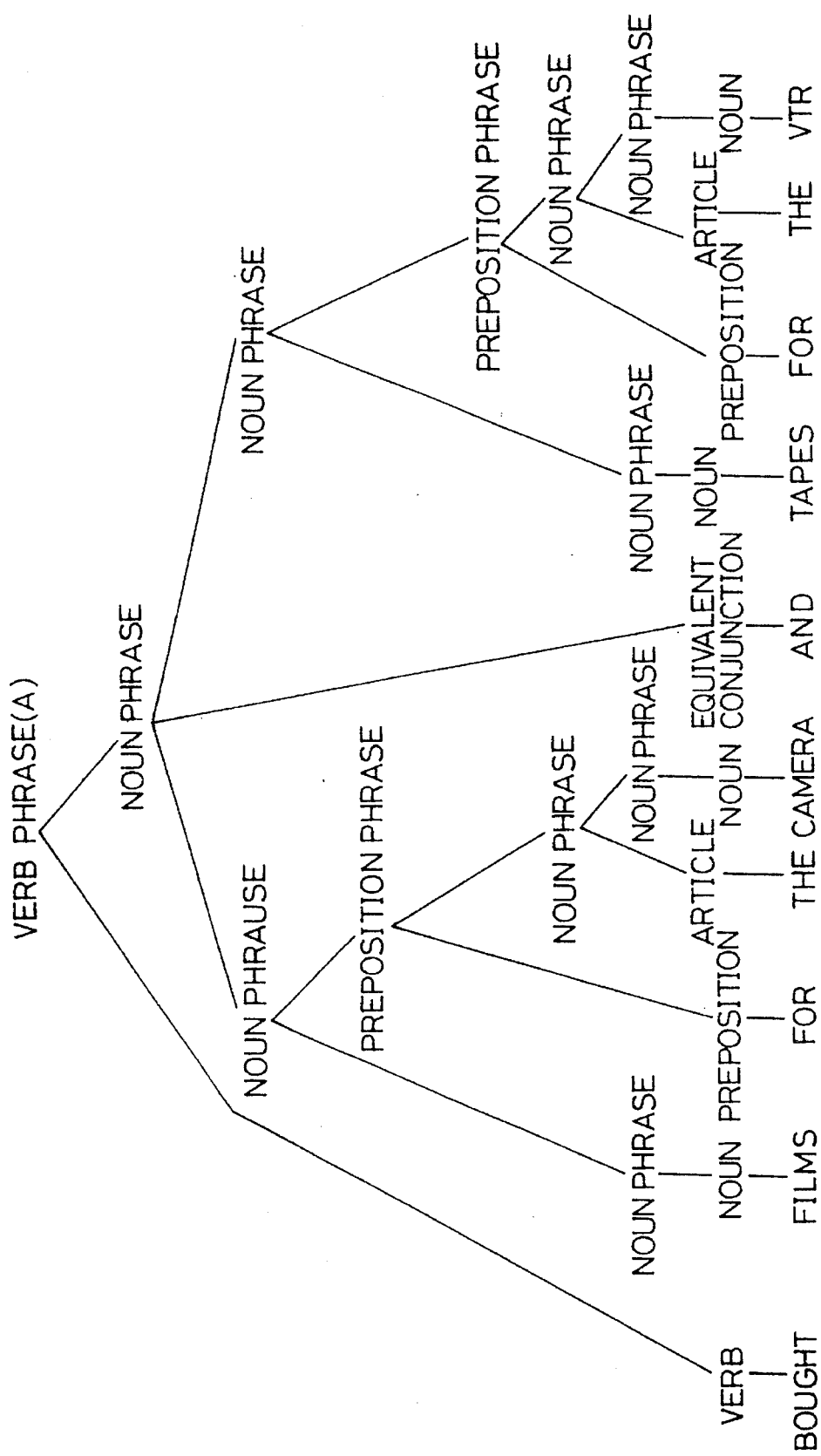
FIG. 47 is an explanatory view showing one part of the parsing tree to be translated into two or more ways by the translation machine shown in FIG. 44.
Figure 48:
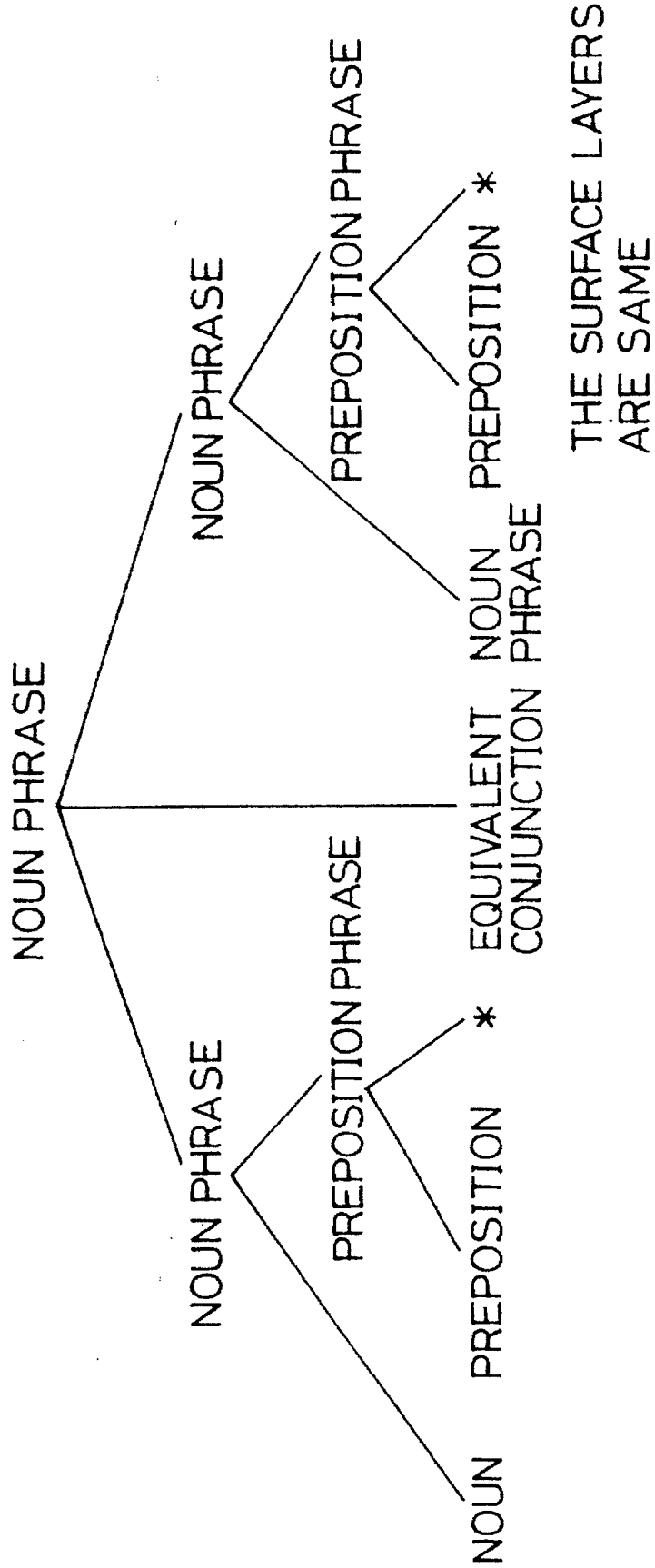
FIG. 48 is an explanatory view showing a form of a priority interpretation rule used in the translation machine shown in FIG. 44.
Figure 49:
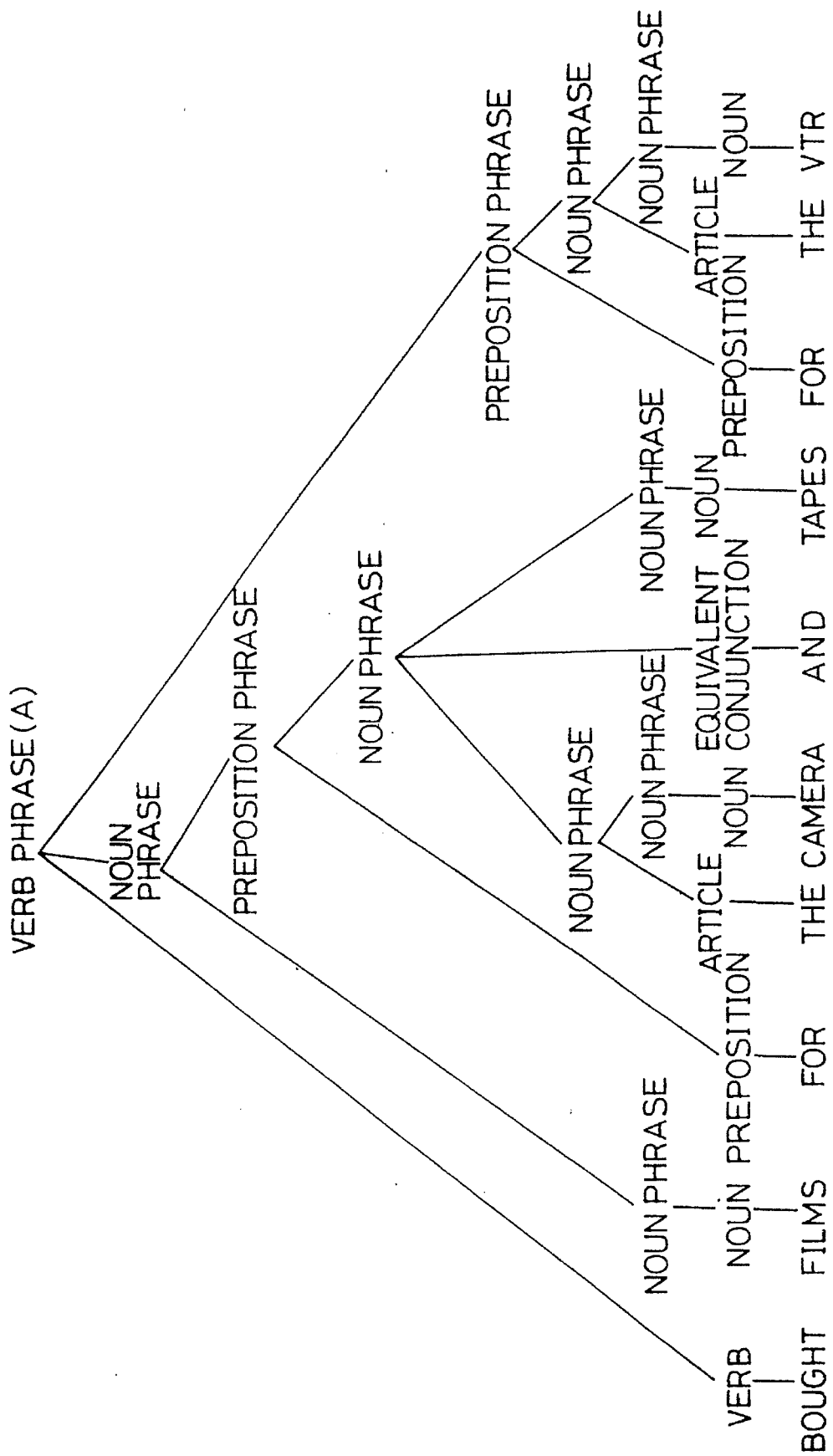
FIG. 49 is an explanatory view showing another part of the parsing tree to be translated into two or more ways by the translation machine shown in FIG. 44.
Figure 50:
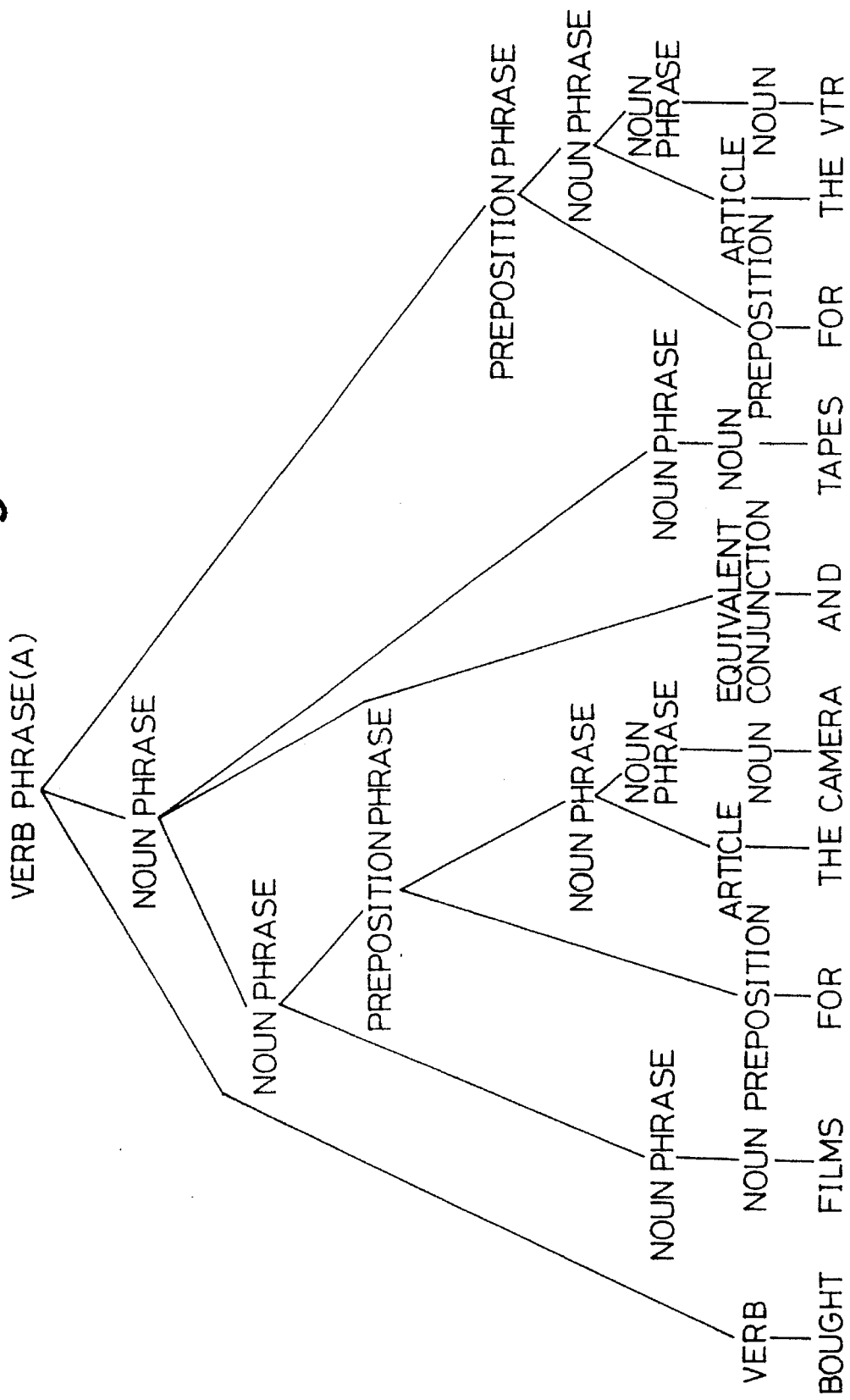
FIG. 50 is an explanatory view showing another part of the parsing tree to be translated into two or more ways.
Figure 51:
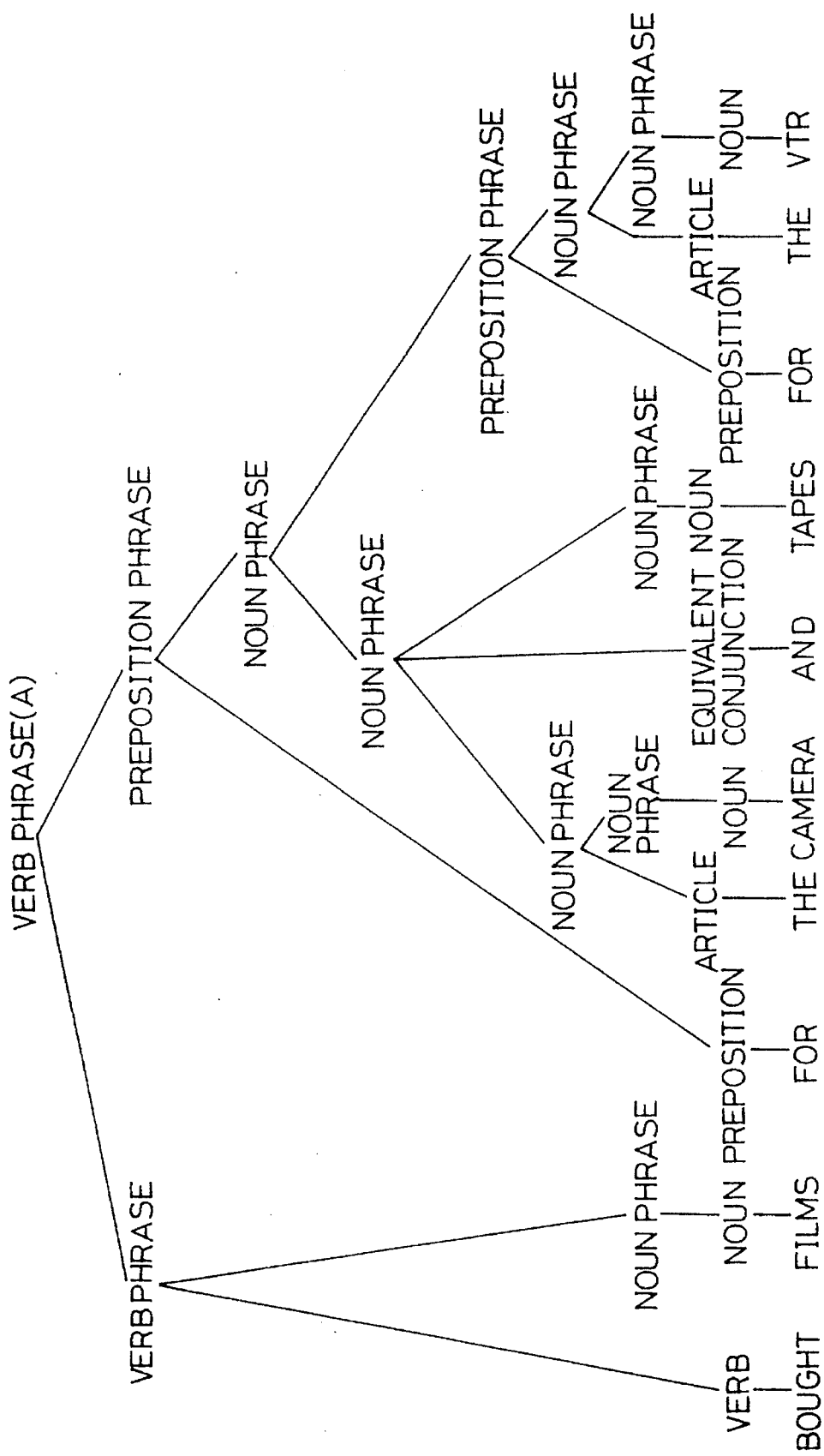
FIG. 51 is an explanatory view showing another part of the parsing tree to be translated into two or more ways.
Figure 52:
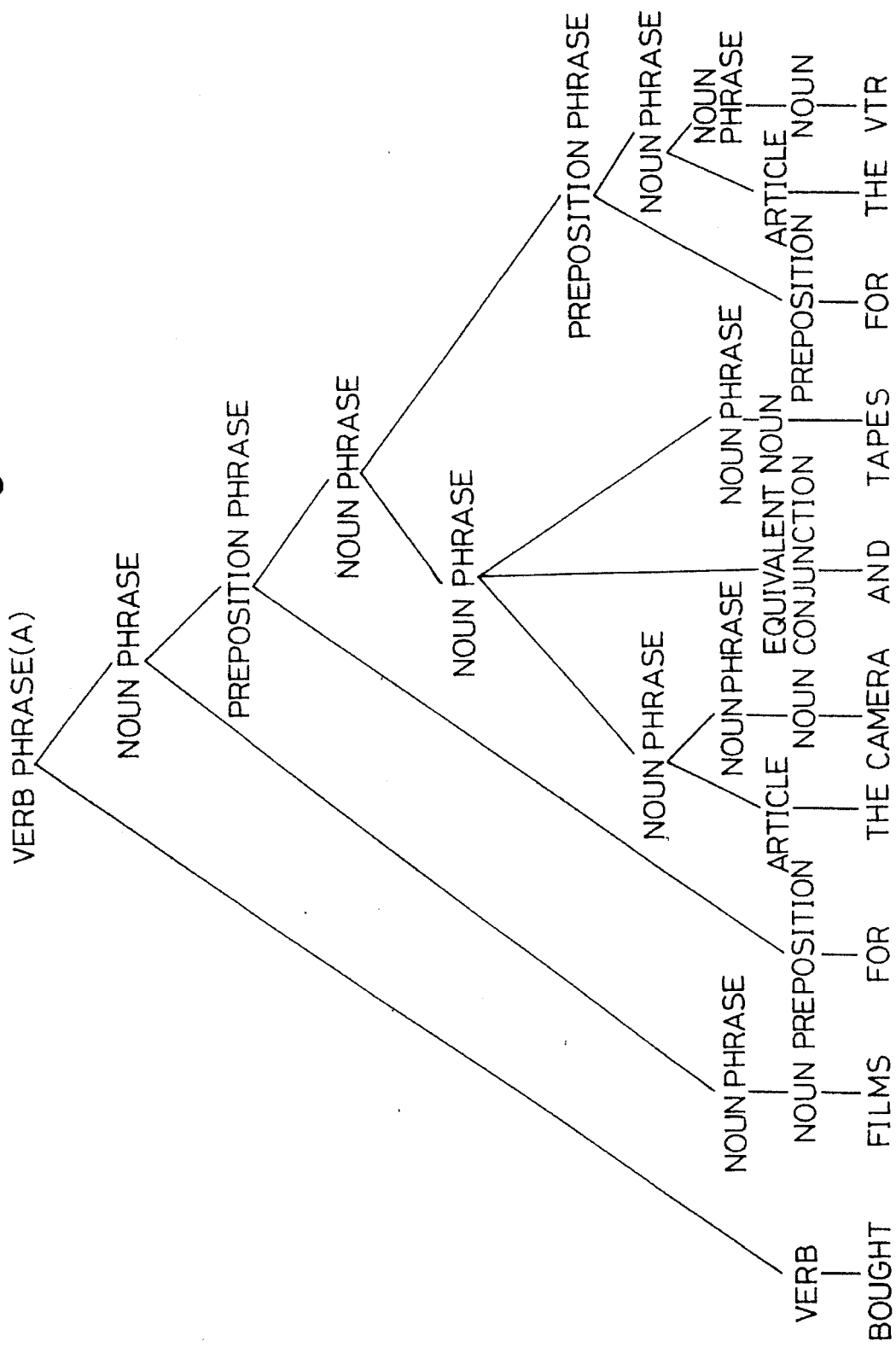
FIG. 52 is an explanatory view showing another part of the parsing tree to be translated into two or more ways.
Figure 53:
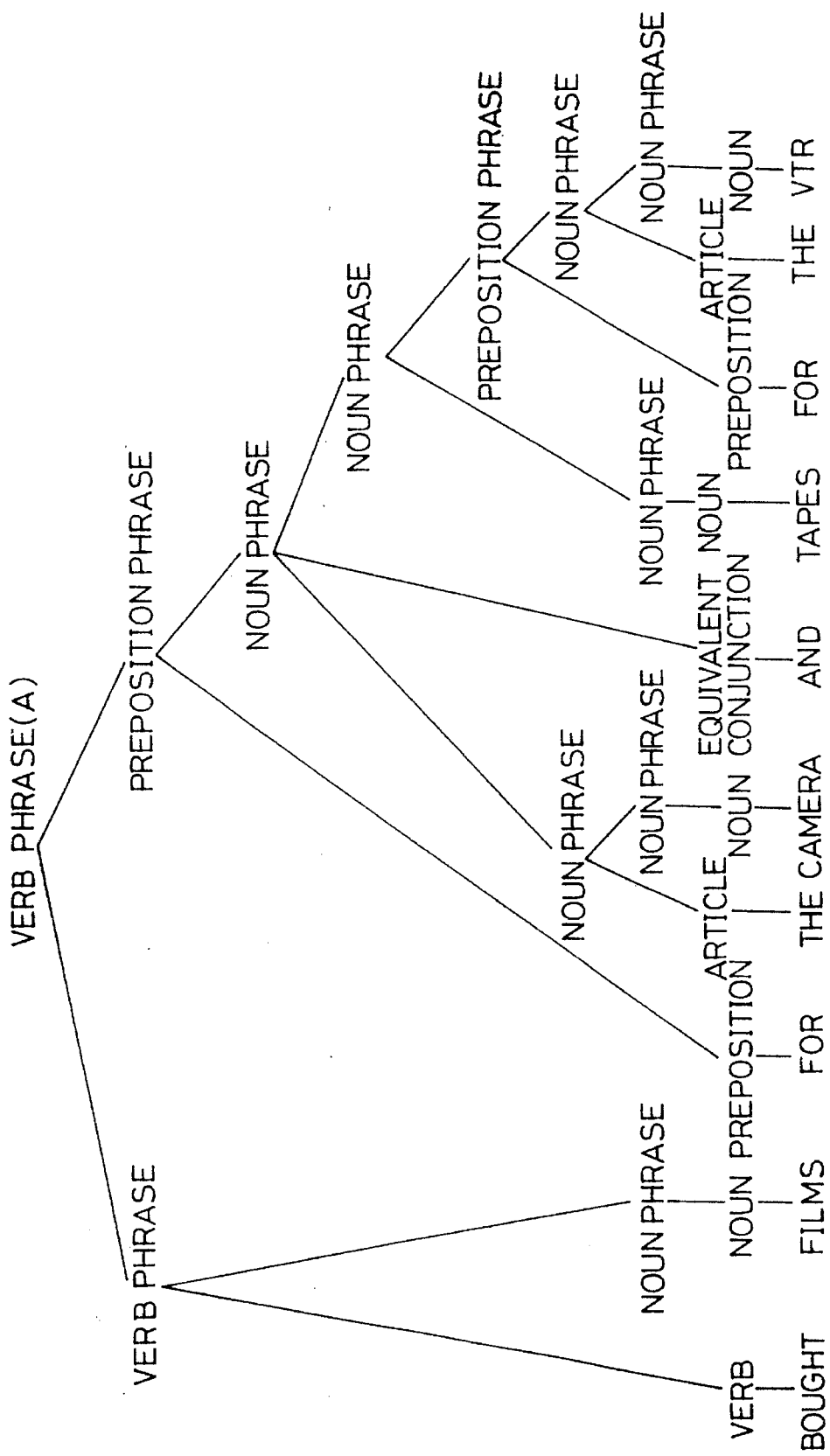
FIG. 53 is an explanatory view showing another part of the parsing tree to be translated into two or more ways.
Figure 54:
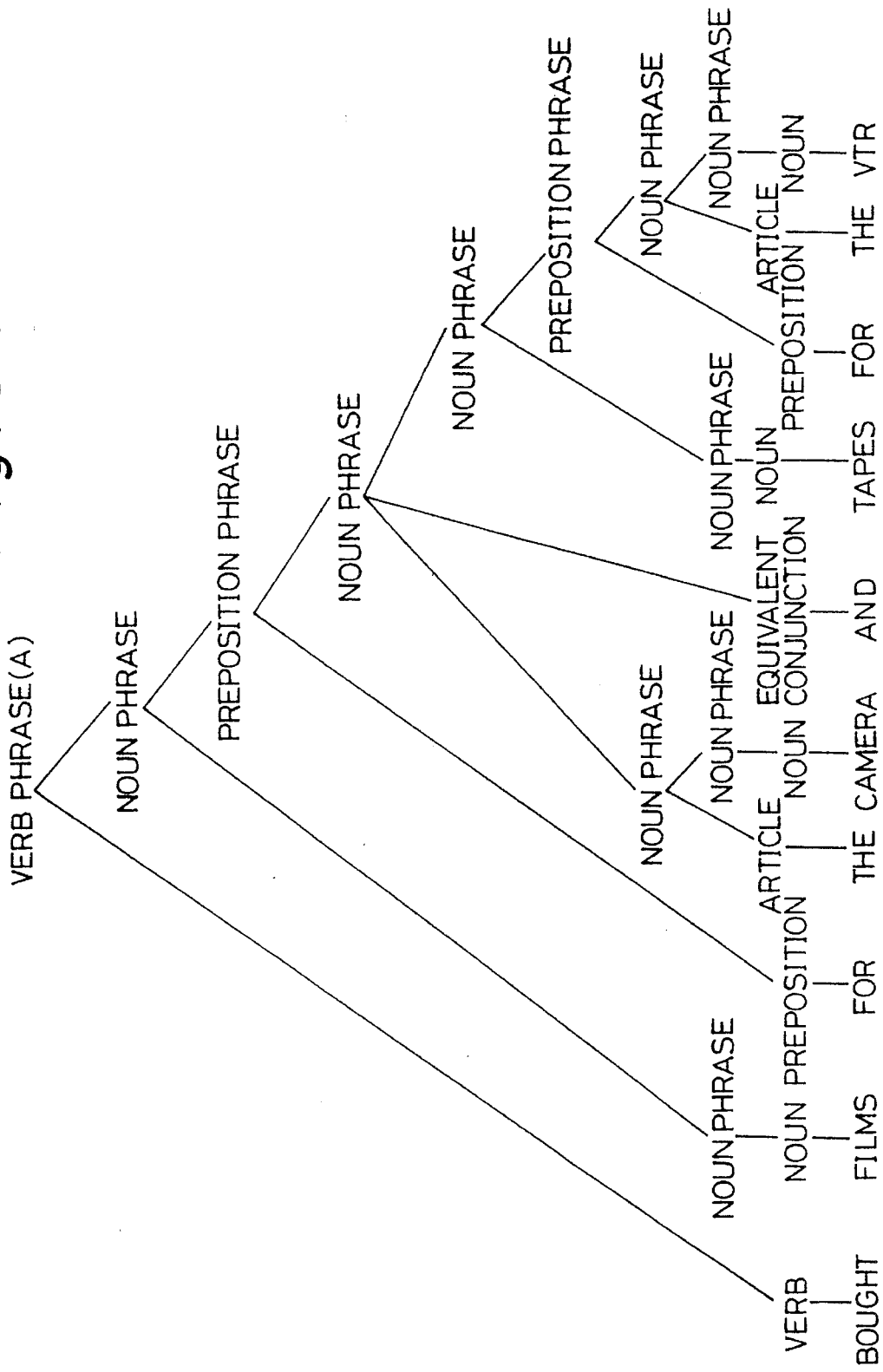
FIG. 54 is an explanatory view showing another part of the parsing tree to be translated into two or more ways.
Figure 55:
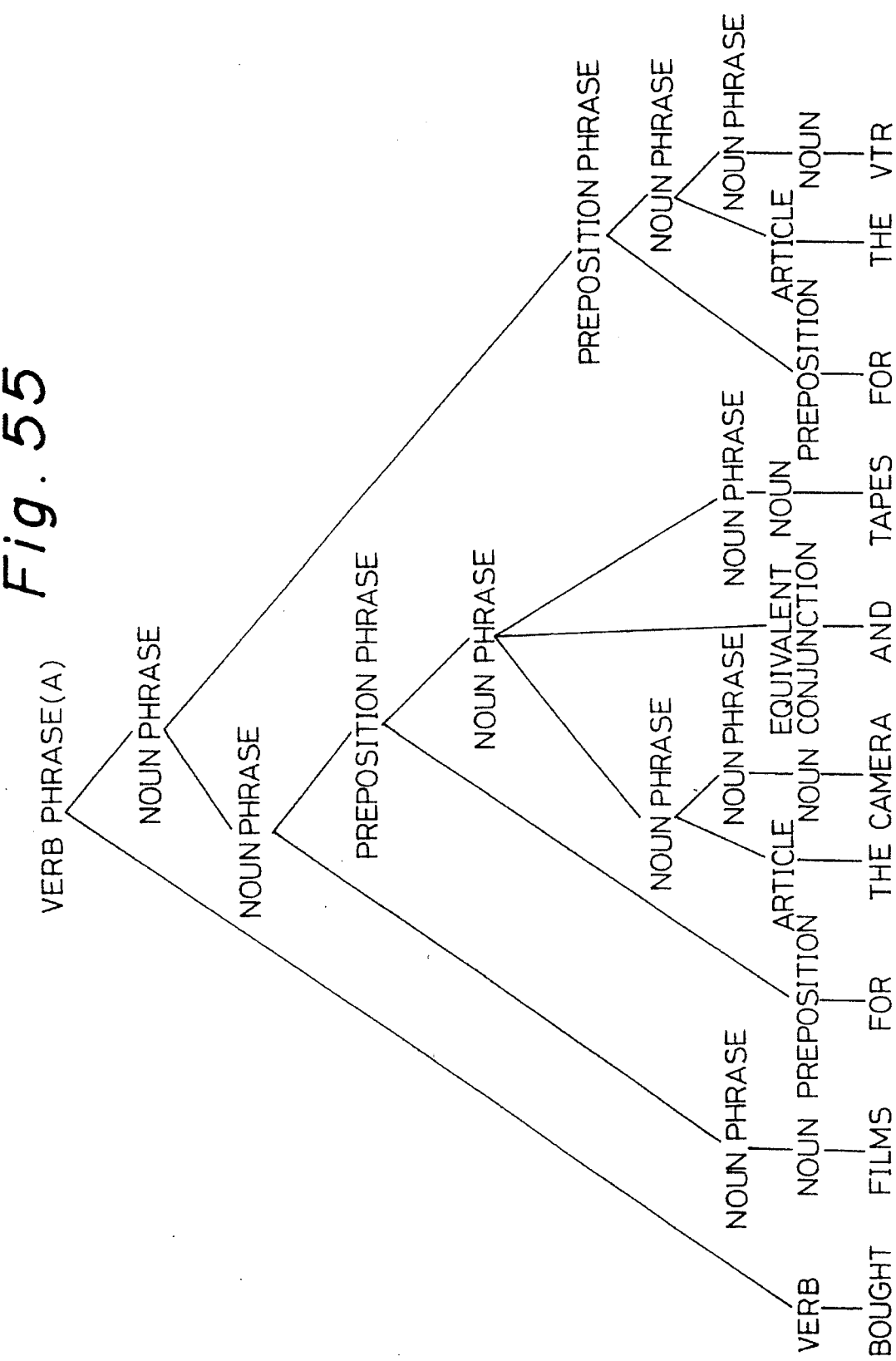
FIG. 55 is an explanatory view showing another part of the parsing tree to be translated into two or more ways.

It will be clearly understood from the comparison between FIG. 48 and FIG. 47 or 41 (about the second embodiment) that the parsing tree Te matches to the rule (y1) listed in the Table 8. Hence, as a result of matching at the step P6, the pointer Pc points to the parsing tree Te (step P7). When, therefore, the parsing tree Te and another tree Ty are competing with each other, the syntax priority rule allows the parsing tree Te to take precedence of the tree Ty.

Next, a value of 1 is set to the flag Fc (Te) accompanied with the parsing tree Te (step P9). The flag Fc with a value of 1 or more being set thereto means that the parsing tree for the flag Fc has been sent to the syntax converting unit 216, which corresponds to the converting stage or later as shown in FIG. 3.

The parsing tree Te is sent to the syntax converting unit 216 (step P10). The syntax converting unit corresponds to the converting unit 19 in FIG. 3. The term "send" in the description of this embodiment is used for the information. Hence, the information does not disappear after it is sent from the buffer or the like. For example, in this case, the parsing tree Ta existing in the syntax memory 297 (buffer C in FIG. 4) is sent to the syntax converting unit 216. In actual, after being sent, the parsing tree Ta is kept stored in the syntax memory 297 (buffer C in FIG. 4) until the memory is cleared.

The syntax converting unit 216 serves to convert the parsing tree Te as referring to the content of the tree structure converting rule memory 293. The term "conversion" in the description of this embodiment is used for information like the term "send" After a certain piece of information is converted, therefore, the piece of information is, in principle, kept unchanged.

Then, it is determined whether or not the parsing tree Te is converted into a proper counterpart in the syntax converting unit 216 (step P11). If not, the operation goes from the step P11 to the step P17, at which it is determined whether or not the parsing trees accompanied with the flags Fc being set as 0 are left in the syntax memory 297 (memory C in FIG. 4) (step P17). If, at the step P17, no such a tree is left in the memory 297, it is determined that the translation of this sentence fails. If, at the step P17, yes, the operation returns to the step At the step P10, the syntax converting unit 216 serves to convert the parsing tree Ta into the counterpart. Then, the operation goes from the step P11 to the step P12, at which the parsing tree Te (converted) is sent to the translated sentence generating unit 217, which corresponds to the unit 20 shown in FIG. 3.

At a step P13, it is determined whether or not a translated counterpart is derived from the parsing tree Te (converted) in the translated sentence generating unit 217. If not, the operation goes to the step P13 to the step P17, at which it is determined whether or not the parsing trees accompanied with the flag Fc being set as 0 are left in the syntax memory 297 (buffer C in FIG. 4). If yes, the operation returns to the step P6. If no, it is determined that the translation of this sentence fails.

At the step P13, the translated sentence generating unit 217 serves to generate the translated sentence from the parsing tree Te (converted). Then, the operation goes from the step P13 to the step P14, at which the translated result of the parsing tree Te is outputted to the output unit 218.

The translated counterpart "I bought (films for the camera) and (tapes for the VTR)." (using parsing tree Te) outputted from the output unit 218 is determined to be proper by the user. The user inputs the determined result from the input unit 211 at a step P15.

If, at the step P15, the user inputs an indication that the result is not proper, the operation returns from the next step P16 to the step P17. In actual, however, from a viewpoint of the present machine translating level, in many cases, the translated counterpart is considered to be proper. Hence, the user normally inputs the indication that the translated sentence is proper. According to the determination at the step P15, the translation of this sentence is terminated.

As described above, since the syntax priority rules inputted by the user are stored in the memory, when two or more syntaxes are competing in translating the original sentence, the translated counterpart based on the proper syntax is allowed to be outputted for the first time. If such rules are not stored, when translating the original sentence, a different tree from the tree Te as shown in FIG. 41 about the second embodiment may be selected. In this case, the translated counterpart outputted for the first time is another one "I bought films (for the camera and tapes), for the VTR." which is determined to be improper by the user.

In turn, the description has to be oriented to the basic concept of the translation machine according to the third embodiment, the grammatical rules used in the machine, and the terms and meaning about the syntax priority rules. However, the description about them is substantially same as that according to the first embodiment. Hence, refer to the description about FIGS. 1 to 10 according to the first embodiment. For reference, how the original sentence of "I bought films for the camera and tapes for the VTR" is analyzed will be shown in FIGS. 47 and 49 to 55, refer these figures as being compared with the description about FIGS. 1 to 10 of the first embodiment for more deeply understanding the syntactic analysis based on the syntax priority rules.

It is, therefore, natural that the description jumps to a transformation of the third embodiment which treats the syntax priority rules in a different way from that of the first or the second embodiment.

The syntax priority rules to be treated in this embodiment are as follows.

(A) Only the priority partial parsing tree is indicated. It means only the parsing tree shown in FIG. 47 is shown. This rule indicates the rule (y1) listed in the Table 8.

(B) The priority partial parsing tree and some other trees competing with it are indicated. The priority partial parsing tree is flagged. About the foregoing third embodiment, some parsing trees such as trees shown in FIGS. 47 and 48 are indicated. The parsing tree shown in FIG. 47 is indicated as ranking first. Such a rule is indicated in (y1) of the table 8.

Further, the method for interpreting the syntax priority rules may be as follows.

(C) When competition of the syntaxes takes place, the parsing tree matching to the partial parsing tree "ranking first" determined according to the rule is determined to take precedence of any other trees. The other trees competing in the buffer C (see FIG. 4) are equally treated as "not taking precedence".

In this case, if the generated syntax priority rule takes the type of (B), the description about any tree except the "priority" partial parsing tree is not useful. That is, the rule type (B) is redundant. However, this type (B) is advantageous in that no change of the form of the syntax priority rule is required if the interpretation of the syntax priority rule is changed into the type (D) to be described later. Conversely, the type (A) is disadvantageous in that the form of the syntax priority rule is required if the interpretation is changed from the type (C) to the type (D).

(D) When the competition of the syntaxes takes place, the parsing tree matching to the "priority" partial parsing tree is determined to rank first. About the other parsing trees competing in the buffer C (see FIG. 4), the parsing tree not described in the rules is determined to rank next. Further, the partial parsing trees matching to the parsing tree described in the rule except the "priority" tree are determined to rank last. This method is meaningful when the syntax rule takes the type (B).

The third embodiment takes the type (A) as the syntax priority rule and the type (C) as the interpretation of the syntax priority rule.

Next, the description will be oriented to another transformation of this embodiment about quantizing the syntax priority rules.

With the foregoing method, the binary result of "to give a tree the precedence or not" is determined according to the syntax priority rules. The interpretation type (D) of the rules makes it possible to take the ternary result. On the other hand, a more high-level ranking interpretation may take a method for defining a priority level of "which rank the syntax is" with a numerical value, taking a difference of the priority level according to the rules, and taking precedence of any of the syntaxes competing with each other along their higher ranks. The syntax priority rules for such a method are listed in the Table 9.

TABLE 9

(y11) Noun Phrase (Noun Phrase (Noun Phrase + Preposition
Phrase (Preposition + Noun Phrase)) + Equivalent
Conjunction + Noun Phrase (Noun Phrase + Preposition TABLE 9-continued Phrase))
—> 2.0
(y12) Noun Phrase (Noun Phrase + Preposition Phrase
(Preposition + Noun Phrase (Noun Phrase + Equivalent
Conjunction + Noun Phrase (Noun Phrase + Preposition
Phrase))))
—> 1.2
(y13) Noun Phrase (Noun Phrase + Preposition Phrase
(Preposition + Noun Phrase (Noun Phrase (Noun Phrase +
Equivalent Conjunction - Noun Phrase + Preposition Phrase)))
—> 0.5

In the syntax priority rules listed in the Table 9, the numerical value indicated in the right hand of —_> is a magnification value. If it is larger than 1, the syntax takes precedence. As the value is made larger, more precedence is taken for the syntax. Further, as in the syntax priority rule indicated by (y13) of Table 9, if the numerical value is smaller than 1, the syntax does not take precedence.

To distinguish the syntax priority rules listed in the Table 8 from the rules listed in the Table 9, the magnification values are represented by adding a decimal point if they are integers as listed in (y1) of Table 9.

Next, the description will be oriented to a transformation of the embodiment which has another form of representation of the syntax priority rules.

In the third embodiment, the syntax priority rules are represented as character trains as listed in the Tables 8 and 9. This representation may not be used when inputting the syntax priority rules and displaying the rules on the display device. For example, to represent the rule, the form of the parsing tree shown in FIG. 48 is shown as it is. Or, when the user inputs the rule, such a tree may be graphically depicted on the display with the input unit fitted for the graphic depiction.

Next, the description will be oriented to a transformation of this embodiment which prepares the ready-made syntax priority rules.

As described above, all the syntax priority rules in the translation machine are inputted by the user. The translation machine may provide the syntax priority rules given by the manufacturer before the user inputs the rules. The syntax priority rules are stored in the syntax priority interpretation rule memory 294 (see FIG. 44). If the syntax priority rules with the corresponding scores are prepared in the translation machine, the user may change these scores. Or, in any case, the user may change the ready-made rules so that all the ready-made rules may be ignored or a completely different tree may be selected.

If the user desires to change the ready-made rules, it is possible to employ the method for keeping those rules unchanged. For example, the ready-made rules are stored in one memory and the changed rules are stored in another memory. Or, both of them are stored in the corresponding regions of one memory so that both of them may be combined as one for reference.

Further, the translation machine may be arranged to have a function of automatically generating the syntax priority rule in the translating process. In this case, if the translation machine makes it possible to modify the rule, this machine belongs to the invention.

According to the third embodiment, therefore, as a syntax-analyzed result, two or more syntaxes are outputted one by one or at one time. Then, which of the syntaxes are the most approximate is determined according to the rules given by the user. With this operation, the user having a sufficient grammatical knowledge may reflect his or her knowledge on the machine translation so that a better translated sentence may be more easily outputted in the precedence order.

Many widely different embodiments of the present invention may be constructed without departing from the spirit and scope of the present invention. It should be understood that the present invention is not limited to the specific embodiments described in the specification, except as defined in the appended claims.

What is claimed is:

1. A translation machine for translating an original sentence of a source language into a translated sentence of a target language, comprising:

storing means for storing a syntax priority rule of said source language, including partial structures of said source language, numerical values each indicating a priority of one of said partial structures, and incidental conditions of each of said partial structures;

a translation module for translating said original sentence into a plurality of sentences of said target language having different syntactic structures, respectively, said translation module including structure deriving means for deriving a plurality of syntactic structures of said original sentence based on said partial structures and said incidental condition, and priority deriving means for deriving priority magnitudes of said plurality of syntactic structures respectively, based on said numerical values; and control means for performing a control to output one of said plurality of sentences of said target language as said translated sentence, in accordance with said priority magnitudes.

2. A translation machine according to claim 1, wherein said translation module further includes first analyzing means for analyzing said original sentence morphologically by means of a dictionary.

3. A translation machine according to claim 2, wherein said translation module further includes second analyzing means for analyzing said original sentence syntactically and selecting a plurality of parsing trees of said original sentence each corresponding to one of said syntactic structures by means of said dictionary and grammatical rules based on a result of said first analyzing means.

4. A translation machine according to claim 3, wherein said translation module further includes converting means for converting each of said parsing trees of said original sentence into equivalent parsing trees of said target language, respectively, by means of a tree structure conversion rules.

5. A translation machine according to claim 4, wherein said translation module further includes sentence generating means for generating each of said plurality of sentences of said target language by adding a proper particle or a proper auxiliary verb to a result of said converting means, respectively.

6. A translation machine for translating an original sentence of a source language into a translated sentence of a target language, comprising:

morphological analyzing unit for dividing an inputted sentence into morphemes by means of a dictionary and obtaining parts of speech of said morphemes;

syntactic analyzing unit for analyzing the syntax of said morphemes divided by said morphological analyzing unit and for outputting a corresponding syntactic structure of said inputted sentence by means of said dictionary and grammatical rules;

converting unit for converting said syntactic structure of said inputted sentence into a syntactic structure of said target language; and translated sentence generating unit for generating said translated sentence based on said syntactic structure of said target language obtained by said converting unit, wherein said translation machine further comprises:

obtaining means for obtaining a plurality of syntactic structures of said inputted sentence, when said syntactic analyzing unit analyses said inputted sentence corresponding to a plurality of syntactic structures;

syntax storing means for storing said syntactic structures obtained by said obtaining means, selecting means for selecting one of said syntactic structures stored in said syntax storing means through input means operated by a user;

priority rule generating means for generating a priority rule of syntactic structures of said source language of one sentence or a part thereof based on results of said selecting means;

priority storing means for storing said priority rule generated by said priority rule generating means and an index indicating a selection data of said selecting means;

evaluating means for assigning an evaluating value to each of said syntactic structures based on said priority rule stored in said priority storing means; and control means for controlling said evaluating means, said converting unit and said translated sentence generating unit to output a translated sentence corresponding to one of said syntactic structures of said inputted sentence, based on said evaluating value.

7. A translation machine according to claim 6, wherein said syntax priority rules are based on a priority of a plurality of partial parsing trees.

8. A translation machine according to claim 7, wherein said priority storing means stores rejection data of each of said parsing trees, and said syntax priority rules are based on a priority of said parsing trees and said rejection data.

9. A translation machine according to claim 7, wherein said storing means stores rejection/selection data of each of said parsing trees, and said syntax priority rules are based on a priority of said parsing trees and said rejection/selection data.

* * * * *